United States Patent [19]

Neuwirth et al.

[11] Patent Number: 5,096,532
[45] Date of Patent: Mar. 17, 1992

[54] ULTRASONIC ROTARY HORN

[75] Inventors: Joseph G. Neuwirth, Cumming, Ga.; Thomas D. Ehlert, Neenah; Norman R. Stegelmann, Appleton, both of Wis.

[73] Assignee: Kimberly-Clark Corporation, Neenah, Wis.

[21] Appl. No.: 525,523

[22] Filed: May 18, 1990

Related U.S. Application Data

[63] Continuation-in-part of Ser. No. 463,069, Jan. 10, 1990, abandoned, which is a continuation of Ser. No. 121,821, Nov. 17, 1987, abandoned.

[51] Int. Cl.⁵ .............................................. B29C 65/08
[52] U.S. Cl. ............................ 156/580.1; 156/73.1; 228/1.1
[58] Field of Search ............... 156/580.1, 580.2, 73.1; 228/1.1

[56] References Cited

U.S. PATENT DOCUMENTS

| | | | |
|---|---|---|---|
| Re. 33,063 | 9/1989 | Obeda | 156/73.1 |
| 3,017,792 | 1/1962 | Elmore | 78/82 |
| 3,096,672 | 7/1963 | Jones | 80/60 |
| 3,217,957 | 11/1965 | Jarvie | 228/1.1 |
| 3,224,915 | 12/1965 | Balamuth | 156/73.1 |
| 3,272,682 | 9/1966 | Balamuth | 156/580.1 |
| 3,292,838 | 12/1966 | Farley | 228/1.1 |
| 3,455,015 | 7/1969 | Daniels | 29/470.1 |
| 3,550,419 | 12/1970 | Fox | 72/199 |
| 3,562,041 | 2/1971 | Robertson | 156/73.1 |

(List continued on next page.)

FOREIGN PATENT DOCUMENTS

| | | |
|---|---|---|
| 260888 | 5/1963 | Australia . |
| 0313425 | 4/1989 | European Pat. Off. . |
| 2259203 | 6/1974 | Fed. Rep. of Germany . |
| 3147255 | 6/1983 | Fed. Rep. of Germany . |
| 1459687 | 11/1966 | France . |
| 42-22222 | 10/1967 | Japan . |
| 51-69578 | 6/1976 | Japan . |
| 58-42049 | 3/1983 | Japan . |
| 178656 | 3/1966 | U.S.S.R. . |
| 272020 | 8/1970 | U.S.S.R. . |
| 277524 | 11/1970 | U.S.S.R. . |
| 524699 | 10/1976 | U.S.S.R. . |
| 670406 | 6/1979 | U.S.S.R. . |
| 785051 | 12/1980 | U.S.S.R. . |
| 1018971 | 2/1966 | United Kingdom . |

OTHER PUBLICATIONS

"Experimental Study of the Vibrations of Solid, Isotropic, Elastic Cylinders", G. W. McMahon, J. Acoust. Soc. Am., 36,85 (1964).

Primary Examiner—Michael Wityshyn
Attorney, Agent, or Firm—William E. Maycock

[57] ABSTRACT

An ultrasonic rotary horn intended to be excited at a frequency of from about 18 to about 60 kHz, which horn is a shaped, solid metal object having a rotational axis and a radial surface terminated by a first end and a second end. The diameter of the horn can vary from about 4 cm to about 19 cm. The width of the horn at the radial surface is in the range of from about 0.6 cm to about 13 cm. The thickness of the horn at its rotational axis is from about 0.6 cm to about 15 cm and is independent of the width of the horn at the radial surface. The horn has a mass in the range of from about 0.06 kg to about 30 kg. The diameter, width, and thickness values are selected for a desired frequency so that the horn, upon being excited by ultrasonic energy at such frequency which is input at the rotational axis at, and substantially perpendicular to, one or both ends, is adapted to resonate in a manner such that:

(1) the excited end moves substantially in phase with the movement of the source of excitation;
(2) the opposing end, whether or not it is actively excited, moves substantially out of phase with the movement of the excited end;
(3) said radial work-contacting surface also moves substantially out of phase with the movement of the excited end; and
(4) said horn exhibits a single nodal point at its geometric center.

28 Claims, 32 Drawing Sheets

U.S. PATENTS DOCUMENTS

| | | | |
|---|---|---|---|
| 3,575,752 | 4/1971 | Carpenter | 156/73.2 |
| 3,620,061 | 11/1971 | Cuningham | 72/199 |
| 3,623,926 | 11/1971 | Sager | 156/73.1 |
| 3,677,861 | 7/1972 | Knauf | 156/73.2 |
| 3,678,720 | 7/1972 | Dickey | 72/160 |
| 3,733,238 | 5/1973 | Long | 156/580.2 |
| 3,844,869 | 10/1974 | Rust, Jr. | 156/358 |
| 3,908,808 | 9/1975 | Busker | 100/35 |
| 3,939,033 | 2/1976 | Grgach | 156/515 |
| 3,955,740 | 5/1976 | Shoh | 228/1.1 |
| 3,993,532 | 11/1976 | McDonald | 156/580.2 |
| 4,252,586 | 2/1981 | Scott | 156/73.1 |
| 4,333,791 | 6/1982 | Onishi | 156/580.1 |
| 4,404,052 | 9/1983 | Persson | 156/73.1 |
| 4,473,432 | 9/1984 | Leader | 156/582 |
| 4,659,614 | 4/1987 | Vitale | 428/218 |
| 4,668,316 | 5/1987 | Sager | 156/73.1 |

ULTRASONIC ROTARY HORN

The present application is a continuation-in-part of copending application Ser. No. 07/463,069 filed on Jan. 10, 1990, now abandoned, which in turn is a continuation of application Ser. No. 07/121,821 filed on Nov. 17, 1987, now abandoned.

CROSS-REFERENCES TO RELATED APPLICATIONS

An improved end configuration for a horn of the present invention is described and claimed in copending and commonly assigned application Ser. No. 07/525,507, entitled ULTRASONIC ROTARY HORN HAVING IMPROVED END CONFIGURATION and filed of even date in the name of Joseph G. Neuwirth.

A variation of the horn of the present invention capable of significantly higher gain and radial amplitude per watt of power is described and claimed in copending and commonly assigned application Ser. No. 07/526,073, entitled HIGH EFFICIENCY ULTRASONIC ROTARY HORN and filed of even date in the name of Thomas D. Ehlert.

BACKGROUND OF THE INVENTION

The present invention relates to an ultrasonic rotary horn. More particularly, the present invention relates to an ultrasonic rotary horn having unique characteristics when operated at a frequency in the range of from about 18 to about 60 kHz.

The use of ultrasonic energy to bond and/or cut thermoplastic materials on a continuous basis is well established, with one of the earliest references being British Patent No. 1,018,971 to Bull which issued in 1966. Applications include the continuous seaming or point bonding of roll goods (Canadian Patent No. 1,092,052 to USS Engineers and Consultants, Inc.), the ultrasonic bonding of materials to form a pattern in a multilayer web which subsequently is cut out of the web (U.S. Pat. No. 3,562,041 to Robertson), the sealing of the ends of individual absorbent products (U.S. Pat. No. 3,677,861 to Knauf), the patterned lamination of webs of nonwoven fabric, fiberfill, and woven shell fabric to produce mattress pads and bedspreads (U.S. Pat. No. 3,733,238 to Long et al.), and the simultaneous bonding and cutting of two webs to form gloves (U.S. Pat. No. 3,939,033 to Grgach et al.).

Many applications of ultrasonic energy for the bonding and/or cutting of thermoplastic materials involve ultrasonic horns or tools which are stationary (i.e., non-rotating), in which the direction of application of the horn working surface is coincident with the direction of the applied mechanical vibrations. Such horns most commonly are stepped cylinders or stepped blades. Thus, the working surface of the horn is moved axially against a rigid anvil of suitable design, with the materials to be bonded or cut being positioned between the horn and the anvil.

In an interesting variation of the rigid horn configuration, one reference is known which discloses a horn which does not come in contact with the materials to be bonded. See U.S. Pat. No. 4,668,316 to Sager.

Another configuration, which is more conducive to continuous high-speed bonding operations, is that of a continuous stationary horn and a rotating anvil; see, by way of illustration, U.S. Pat. Nos. 3,562,041, 3,733,238, and 3,939,033, infra, U.S. Pat. Nos. 3,844,869 to Rust, Jr. (apparatus for ultrasonic welding of sheet materials), 3,993,532 to McDonald et al. (ultrasonic sealing pattern roll, i.e., patterned rotating anvil), and 4,659,614 to Vitale (ultrasonically bonded nonwoven fabric through the use of a patterned rotating anvil), and German Published Patent Application No. 2,259,203 to J. H. Benecke GmbH (improvement of physical properties of nonwoven materials by ultrasonic bonding). In this configuration, the materials to be bonded are passed continuously between the horn and the rotating anvil. The linear velocity of the materials typically is equal to the tangential velocity of the working surface of the rotating anvil. See, also, U.S. Pat. No. 3,575,752 to Carpenter in which a rigid anvil is employed immediately before a drive drum.

Although the use of a rotating anvil was a significant improvement in continuous bonding processes involving the application of ultrasonic energy, such use has some inherent limitations which adversely affect line speed and bonding quality. It is, of course, necessary to continuously pass the materials to be bonded between the narrow gap formed by the rotating anvil and the rigid, stationary horn. This often leads to a damming effect at the leading edge of the horn, as well as to possible compression variations due to nonuniformities in material thickness. Hence, there is created a stick-slip condition which strongly influences the efficiency of acoustic energy transfer. This greatly affects the resulting bond quality which in turn limits line speeds. This phenomenon also limits the compressible bulk or thickness of the materials to be bonded.

One approach to diminish the extent of these limitations has been the development of the arcuate profiled horn which gives a progressive convergent-divergent gap. See, for example, U.S. Pat. No. 4,404,052 to Persson et al. Another approach has been to orient a modified stepped-blade horn parallel with and between the sheets to be bonded as shown in U.S. Pat. No. Re. 33,063 to Obeda. It is apparent, however, that as long as a stationary horn is used, the problems associated with movement of the materials to be bonded past the horn cannot be eliminated entirely in view of the fact that intimate contact is necessary for efficient acoustic energy transfer.

The approach which appears to have received the most attention is the use of a rotating (rotary) horn in conjunction with a rotating anvil. Such a configuration is best described as two or more cylindrical surfaces which are in close proximity to each other and rotating in opposite directions with equal tangential velocities. The materials to be bonded pass between the cylindrical surfaces at a linear velocity which is equal to the tangential velocities of such surfaces. Thus, the opportunity for damming and stick-slip is virtually eliminated.

The concept of an ultrasonic rotary horn, typically used in conjunction with a rotating anvil for the bonding of a variety of materials, is, of course, well known. See, by way of illustration, U.S. Pat. Nos. 3,017,792 to Elmore et al. (vibratory device), 3,217,957 to Jarvie et al. (welding apparatus), 3,224,915 to Balamuth et al. (method of joining thermoplastic sheet material by ultrasonic vibrations), 3,272,682 to Balamuth et al. (apparatus for joining thermoplastic sheet material), 3,455,015 to Daniels et al. (ultrasonic welding method and apparatus), 3,623,926 to Sager (method and apparatus for the assembly of thermoplastic members), 3,955,740 to Shoh (vibratory seam welding apparatus), 4,252,586 to Scott (method and apparatus for the manufacture of slide fastener stringer with folded and bonded continuous molded coupling elements), 4,333,791 to Onishi (ultrasonic seam welding apparatus), and 4,473,432 Leader et al. (dot heat stapling); Russian Patent Nos. 178,656 (ultrasonic seam welder), 272,020 (ultrasonic seam welding unit), 277,524 (ultrasonic metal welder), 524,699 (ultrasonic seam welder for plastics), 670,406 (apparatus for ultrasonic seam welding), and 785,051 (equipment for seam welding polymeric materials); Japanese Published Patent Application Nos. 51-69578 (oscillator system for continuous ultrasonic welding of plastic) and 58-42049 (continuous ultrasonic jointing device for photographic papers); French Patent No. 1,459,687 (ultrasonic welding of an aluminum foil onto a glass sheet -see also Japanese Patent No. 42-22222); German Published Patent Application No. 3,147,255 to Licentia Patent-Verwaltungs-GmbH (apparatus for welding solar cell contacts and connectors); and Australian Patent No. 260,888 to Knudsen et al. (ultrasonic welding rollers for use in making a metal container).

Nonbonding applications involving rotary horns also are known, some examples of which are included here for completeness: U.S. Pat. Nos. 3,096,672 to Jones (vibrating roll and method), 3,292,838 to Farley (rotating sonic welder), 3,550,419 to Fox et al. (methods and apparatus for metal rolling), 3,620,061 to Cunningham et al. (design of ultrasonic transducers for use with rolling mill rolls), 3,678,720 to Dickey et al. (roller leveler and method of leveling), and 3,908,808 to Busker (ultrasonic calendaring of paper webs).

One commercially available bonding system employing an ultrasonic rotary horn is known. This system, manufactured by Mecasonic, a French firm (available from Mecasonic-KLN, Inc., Fullerton, Calif.), exploits the so-called Poisson coupling effect. Maximum radial displacement is achieved at a region of minimal longitudinal displacement which is one-quarter wavelength from the free end of a one-wavelength circular shaft that is ultrasonically excited longitudinally, i.e., along its axis, by a piezoelectric crystal assembly. An ultrasonic rotary horn which appears to be essentially the same as the Mecasonic horn is described in Japanese Published Patent Application No. 51-69578, mentioned earlier. See also European Patent Application No. 88402437.3, Publication No. 0 313 425 A1 to Societe Mecasonic, which describes the use of the Mecasonic horn in conjunction with a rotating anvil or support to smooth freshly stitched seams in flexible materials.

The larger diameter or disk portion of the horn is situated at a longitudinal node where the radial displacement of the disk portion is maximum, i.e., at the radial antinode. The entire length of the horn is equal to one wavelength and the shorter distance from the center of the disk portion to the free or nondriven end of the horn is one-quarter wavelength. Upon subjecting the horn to ultrasonic excitation at the driven end, when the source of excitation moves toward the driven end of the horn, the entire horn moves longitudinally away from the source of excitation while the radial surface moves inwardly. When the source of excitation moves away from the driven end, the entire horn moves toward it while the radial surface moves outwardly. While the radial motion is at a maximum at the center of the disk portion, it diminishes rapidly in either direction across the surface of the disk portion with increasing distance from the longitudinal node (radial antinode). In cases where bond strength is at least in part a function of amplitude, this variation in amplitude must result in a variation in bond strength. Hence, the useful width of the disk portion may be reduced to something less than the actual width of 30 mm if a uniform bond strength is desired across the width of the bond zone. Such nonuniformity clearly is undesirable unless the minimum bond strength achieved will withstand the stresses placed upon the bond zone.

Thus, there is a need for an improved ultrasonic rotary horn which can be operated at an excitation frequency of from about 18 to about 60 kHz and which will provide a relatively wide bonding or other processing span with relatively constant amplitude characteristics across the width of the radial surface, and improved performance, as well as other beneficial characteristics.

SUMMARY OF THE INVENTION

It therefore is an object of the present invention to provide an improved ultrasonic rotary horn which can be operated at an excitation frequency of from about 18 to about 60 kHz.

Another object of the present invention is to provide an improved ultrasonic rotary horn having the capability of having an effective radial surface wider than about 2.5 cm.

Yet another object of the present invention is to provide an improved ultrasonic rotary horn having the capability of having an effective radial surface wider than about 2.5 cm, which surface has a relatively constant radial amplitude profile.

A further object of the present invention is to provide an improved ultrasonic rotary horn having the capability of having an effective radial surface wider than about 2.5 cm, with the ratio of the radial amplitude at the radial surface to the longitudinal amplitude applied to the horn having the capability of being at least about one across the width of the radial surface of the horn.

Still another object of the present invention is to provide an improved ultrasonic rotary horn which, upon being excited by ultrasonic energy which is input at, and substantially perpendicular to, one or both ends along the rotational axis of said horn, is adapted to resonate in a manner such that the movement of the excited end and the movement of the opposing end, whether or not it is actively excited, are out of phase; the radial surface of the horn moves out of phase with the movement of the excited end; and the horn exhibits a single nodal point at its geometric center.

These and other objects will be apparent to one having ordinary skill in the art from a consideration of the specification and claims which follow.

Accordingly, the present invention provides, in an ultrasonic rotary horn intended to be excited at a frequency of from about 18 to about 60 kHz, which horn comprises a shaped, solid metal object having a radial surface terminated by a first end and a second end, and a rotational axis, in which each of said ends is defined by a surface and said object is axially symmetrical, the improvement which comprises:

(A) the diameter of said horn is in the range of from about 4 cm to about 19 cm;

(B) the width of said horn at said radial surface is from about 0.6 cm to about 13 cm;

(C) the thickness of said horn at the rotational axis thereof is from about 0.6 cm to about 15 cm and is independent of the width of said horn at said radial surface;

(D) said horn has a mass in the range of from about 0.06 kg to about 30 kg; and (E) said diameter, width, and thickness are selected for a desired frequency so that said horn, upon being excited by ultrasonic energy at such frequency which is input at the rotational axis at, and substantially perpendicular to, one or both ends, is adapted to resonate in a manner such that:

(1) the excited end moves substantially in phase with the movement of the source of excitation;

(2) the opposing end, whether or not it is actively excited, moves substantially out of phase with the movement of the excited end;

(3) said radial work-contacting surface also moves substantially out of phase with the movement of the excited end; and (4) said horn exhibits a single nodal point at its geometric center.

The present invention further provides, in an apparatus for ultrasonically bonding two or more materials together, or otherwise ultrasonically processing a material, which apparatus comprises an ultrasonic rotary horn intended to be excited at a frequency of from about 18 to about 60 kHz, a vibrator means for providing a source of longitudinal mechanical vibration coupled to one or both ends of said horn, optionally through an elongated waveguide, support means for said ultrasonic rotary horn, drive means for rotating said ultrasonic rotary horn, and a rotatable anvil in close proximity to said ultrasonic rotary horn, the improvement which comprises employing as said ultrasonic rotary horn a shaped, solid metal object having a radial surface terminated by a first end and a second end, and a rotational axis, in which each of said ends is defined by a surface and said object is axially symmetrical, in which:

(A) the diameter of said horn is in the range of from about 4 cm to about 19 cm;

(B) the width of said horn at said radial surface is from about 0.6 cm to about 13 cm;

(C) the thickness of said horn at the rotational axis thereof is from about 0.6 cm to about 15 cm and is independent of the width of said horn at said radial surface;

(D) said horn has a mass in the range of from about 0.06 kg to about 30 kg; and (E) said diameter, width, and thickness are selected for a desired frequency so that said horn, upon being excited by ultrasonic energy at such frequency which is input at the rotational axis at, and substantially perpendicular to, one or both ends, is adapted to resonate in a manner such that:

(1) the excited end moves substantially in phase with the movement of the source of excitation;

(2) the opposing end, whether or not it is actively excited, moves substantially out of phase with the movement of the excited end;

(3) said radial work-contacting surface also moves substantially out of phase with the movement of the excited end; and (4) said horn exhibits a single nodal point at its geometric center.

In certain preferred embodiments, said radial surface has a profile as defined hereinafter which is substantially linear, in which case the horn may be described as a right circular cylindrical section. In other preferred embodiments, said radial surface has a profile which is nonlinear, in which case the horn may be described as a frustrum with a curvilinear surface.

In still other preferred embodiments, the ultrasonic rotary horn of the present invention includes hubs on each of the two ends. In other preferred embodiments, the hubs are integral parts of the horn. In other preferred embodiments, the horn includes threaded studs which protrude from the ends or from the hubs, if present. In yet other preferred embodiments, the studs are integral parts of the horn. In still other preferred embodiments, an elongated waveguide is employed which is an integral part of the horn. In further preferred embodiments, the ends of the horn are substantially concave or substantially convex.

The ultrasonic rotary horn of the present invention is particularly useful in continuous bonding and/or cutting processes, such as bonding together two or more layers of thermoplastic materials, e.g., woven and nonwoven fabrics and films; ultrasonically perforating a material; and the like.

DETAILED DESCRIPTION OF THE INVENTION

Figure 1A:
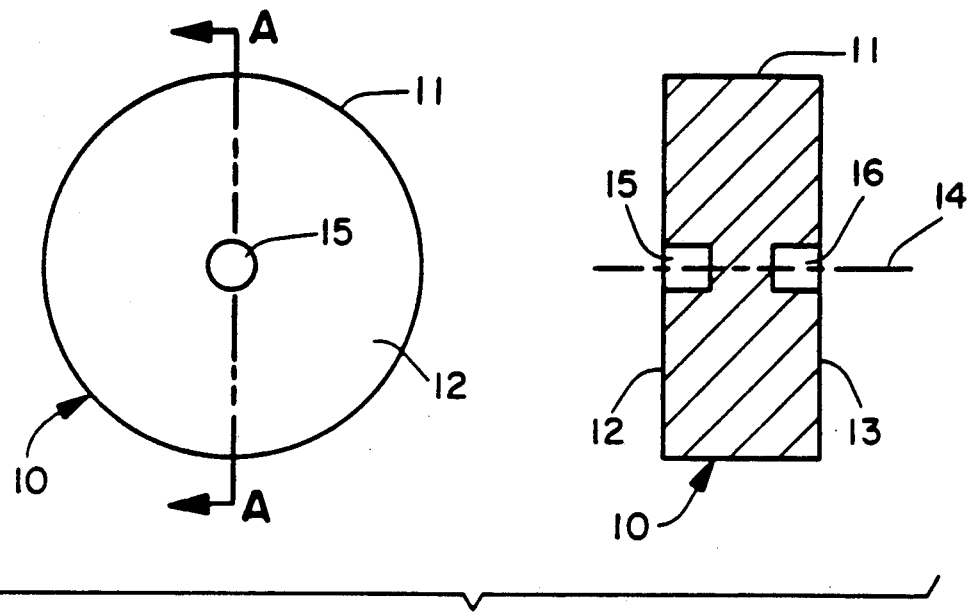
FIGS. 1A-1C, 2A-2C, and 3-14 inclusive, are diagrammatic representations of various embodiments of the ultrasonic rotary horn of the present invention.

As used herein, the terms "bonding" and "welding" are synonymous and simply refer to the substantially permanent joining of at least one layer of a material with another layer of a like or different material. The nature of the materials to be bonded is not known to be critical. However, the present invention is particularly useful in the bonding of two or more layers of materials selected from the group consisting of woven fabrics, nonwoven fabrics, and films which preferably are made at least in part from thermoplastic polymers. As noted earlier, the present invention also is useful in processes involving the ultrasonic perforation of a material.

It should be apparent that adequate bonding can be achieved by a variety of mechanisms. For example, the bond can result from the partial or complete melting in the bonding zone of all of the materials to be bonded. In this case, there is partial or complete fusion in the bonding area of such materials. Alternatively, the bond can result from the partial or complete melting of one of the materials to be bonded, with the partially or completely melted material flowing into or onto adjacent materials which in turn results in a mechanical interlocking of one material with another.

As used herein, the term "fabric" is used broadly herein to mean a sheet or web of a woven or nonwoven material which may be continuous, as in a roll, or discontinuous.

The term "gravest mode" is used herein to mean the most fundamental resonant mode of vibration for a particular geometry under a given set of conditions.

The term "amplitude" is used herein to mean the distance of maximum displacement of a surface upon excitation, or total peak-to-peak excursion. Such displacement or excursion is reported throughout this specification in microns. The term "efficiency" is used herein to mean amplitude per watt of input or excitation power and thus has the units, microns per watt.

The terms "amplitude ratio" and "horn gain" are used interchangeably herein to mean the ratio of the radial amplitude to the longitudinal amplitude. As applied to the ultrasonic rotary horn of the present invention, the radial amplitude is the amplitude of the radial surface of the horn and the longitudinal amplitude is the amplitude of an end. Unless specified otherwise, the longitudinal amplitude refers to the movement of the driven end. Because horn gain is a ratio of values having the same units, it is unitless.

The term "gain" or "booster gain" is used herein to mean the ratio of output longitudinal amplitude to input longitudinal amplitude of a booster. The term "total gain" refers to the combined gain of two boosters employed in combination. All three of these gain terms are, of course, unitless.

"Variance" is a convenient way of mathematically expressing an amplitude profile. It is a calculated value for the radial surface of the horn. Variance is calculated as the difference between the highest amplitude value and the lowest amplitude value divided by the highest value, times 100. Thus, variance is a percentage.

As used herein, the term "width" generally refers to the width of the radial surface or the thickness of the horn at the radial surface. The term "thickness" is used preferentially to refer to the width or thickness of the horn at the center or rotational axis of the horn. However, the terms occasionally are used more generally, but, if so used, the meanings will be clear from the context. Stated differently, unless another, broader meaning is clear from the context, each term will have the meaning specified above.

Turning now to the ultrasonic rotary horn of the present invention, the shaped, solid metal object which comprises the ultrasonic rotary horn of the present invention often is referred to herein as the horn of the present invention or, when permitted by the context, simply as "the horn" or "said horn" or variations thereof.

A driven end is an end at which the cyclic mechanical excitation is applied at the rotational axis, either directly or through a stud, axle, and/or waveguide or booster. The term "other end" means only the remaining end, whether or not that end also is a driven end. Either end may be supported, either by a suitable support means or by a waveguide or booster. Moreover, both ends may be driven ends, in which case the relationships of the ends to each other and to other surfaces still hold true, and the claims are meant to be so interpreted.

It should be apparent that the terms "first end" and "second end" are synonymous with the terms "driven end" and "other end". The first pair of terms refer to the horn structurally, while the second pair refers to the horn functionally. Thus, the horn clearly has but two ends, i.e., a "first end" and a "second end", either or both of which may be a "driven end". If only one end is a driven end, then the second end is an "other end". If both ends are driven ends, the "other end" also is a "driven end".

Upon subjecting the horn of the present invention to ultrasonic mechanical excitation, assuming that there is but a single driven end, when the source of excitation moves toward the driven end of the horn, the driven end moves away from the source of excitation. Thus, the driven end moves inwardly toward the interior of the horn (or toward the other end). The other end, however, also moves inwardly toward the interior of the horn (or toward the driven end or the source of excitation). Although both ends are moving inwardly toward the interior of the horn, they are moving in opposite directions. Thus, the movements of the ends relative to each other are said to be out of phase. The movements of the ends would be in phase if they moved in the same direction, i.e., away from the source of excitation, as the source of excitation moves toward the horn.

Consistent with the foregoing definition of "out of phase", the movements of the ends would be in phase if the ends moved in the same direction, e.g., away from the source of excitation as the source of excitation moves toward the horn. In this case, the driven end would move inwardly or toward the interior of the horn as the other end moves outwardly or away from the horn. The movement of the driven end, of course, always will be in phase with the movement of the source of excitation. Consequently, the movement of the other end always will be out of phase with the source of excitation.

When both ends are driven ends, it should be apparent to those having ordinary skill in the art that the movements of the ends with respect to each other must be synchronized with the movements just described in order to avoid imposing additional stresses within the horn.

As the source of excitation moves toward the horn with the concomitant motion of the driven end inwardly toward the interior of the horn, the movement of the radial surface of the horn of the present invention is outward or away from the rotational axis. This movement of the radial surface relative to the movement of the driven end is defined as out of phase. On the other hand, if the radial surface moved inwardly toward the rotational axis, that movement relative to the inward movement of the driven end would be defined as in phase.

It should be apparent to one having ordinary skill in the art that the above definitions of "out of phase" and "in phase" are arbitrary or subjective. What is important, however, is not the definitions selected, but how the definitions apply to different horns. This will be more evident from the examples where the movements of the radial surfaces and the driven ends are described in more detail.

Because of the movements of the ends and the radial surface of the horn of the present invention as just described, there is, when the horn is excited, a single nodal point where no motion of any kind takes place. This point lies on the rotational axis and is located at the geometric center of the horn. It is a significant distinguishing feature of the horn of the present invention.

The configuration of the radial surface of the ultrasonic rotary horn of the present invention typically is described herein as having a given profile. As so used, the term "profile" has reference to the line describing the radial surface when viewed in cross-section through the rotational axis of the horn. Thus, when the radial surface is flat, e.g., every point on the radial surface is equidistant from the rotational axis of the horn, the profile of the radial surface is said to be linear. Similarly, if the radial surface has been roughened, such as by grit blasting, plasma spraying, or textured chromium coating, but is otherwise substantially flat, the profile of the radial surface is substantially linear. If the radial surface is not flat, e.g., the surface has one or more raised areas (lands) or depressions (grooves or valleys), the profile is nonlinear. The term "nonlinear" is intended to be broad in scope and not limited to specific embodiments mentioned herein by way of illustration. Thus, if the profile is nonlinear, the radial surface can have distinct features, such as one or more lands or groves, or a smoothly or gradually changing curved surface, or some combination of distinct features and a gradually changing curved surface.

As already indicated, the ultrasonic rotary horn of the present invention comprises a shaped, solid metal object. In general, any metal having suitable acoustical and mechanical properties can be used. As a practical matter, however, the most suitable metals are aluminum, monel, titanium, and some alloy steels. If desired, the horn can be coated or plated with another metal to reduce abrasive wear. For applications requiring high amplitude and higher stress, titanium is preferred.

In general, such variables as the diameter, mass, width, and thickness of the horn, and the configuration of the ends of the horn, are not critical, provided that such variables come within the ranges specified herein. Such variables are critical, however, if a horn is desired which will resonate in the gravest mode at a particular frequency and with a given amplitude. Stated differently, any horn coming within the specifications provided herein will vibrate in the gravest mode at a given frequency, but that given frequency may be lower than or higher than the frequency desired or considered optimum for a particular application. Vibration in the gravest mode at the desired frequency is achieved by adjusting the diameter of the horn. The amplitude ratio or gain primarily is dependent upon the thickness:width ratio.

In its simplest form, the ultrasonic rotary horn of the present invention is represented diagrammatically by FIG. 1A which shows a plan view and a cross-sectional view along line A—A, as does each of FIGS. 1-15, inclusive. In FIG. 1A, horn 10 has a radial surface 11, first end 12, second end 13, and a circular cross-section as represented by end 12. Ends 12 and 13 are flat, parallel, and normal to the rotational axis 14 of horn 10. End 12 has cylindrical hole 15 and end 13 has cylindrical hole 16, each of which holes 15 and 16 is centered about rotational axis 14. Thus, holes 15 and 16 and ends 12 and 13 are concentric.

If desired, holes 15 and 16 can be threaded to accept studs or axles or studs can be welded or otherwise attached to horn 10. Alternatively, and preferably, protruding threaded studs are machined in place during the process of machining horn 10. If studs for mounting or attaching axles are not machined as an integral part of the horn, the life of the horn during use is significantly reduced.

The use of the term "integral part" with respect to any feature or component of the ultrasonic rotary horn of the present invention means that such feature or component is formed from the same piece of material as the horn so that there are no structural discontinuities between such feature or component and the horn. Thus, any feature or component which subsequently must be attached to the horn by any means is not an integral part of the horn.

Figure 1B:
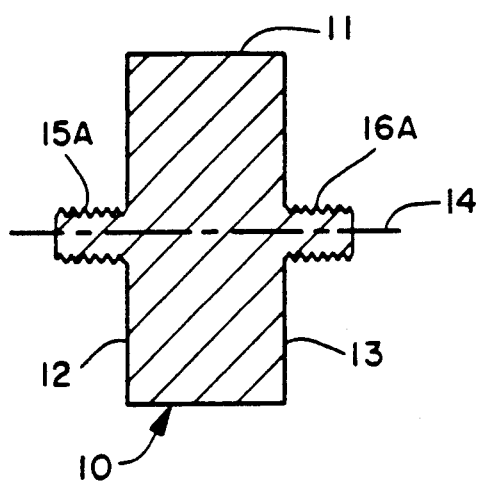

Such preferred embodiment is illustrated by FIG. 1B which is a cross-sectional view along line A—A of FIG. 1A. Horn 10 is identical with the horn of FIG. 1A, except that in place of holes 15 and 16, threaded studs 15A and 16A, respectively, are present as integral parts of horn 10. Such studs are concentric with ends 12 and 13.

Figure 1C:
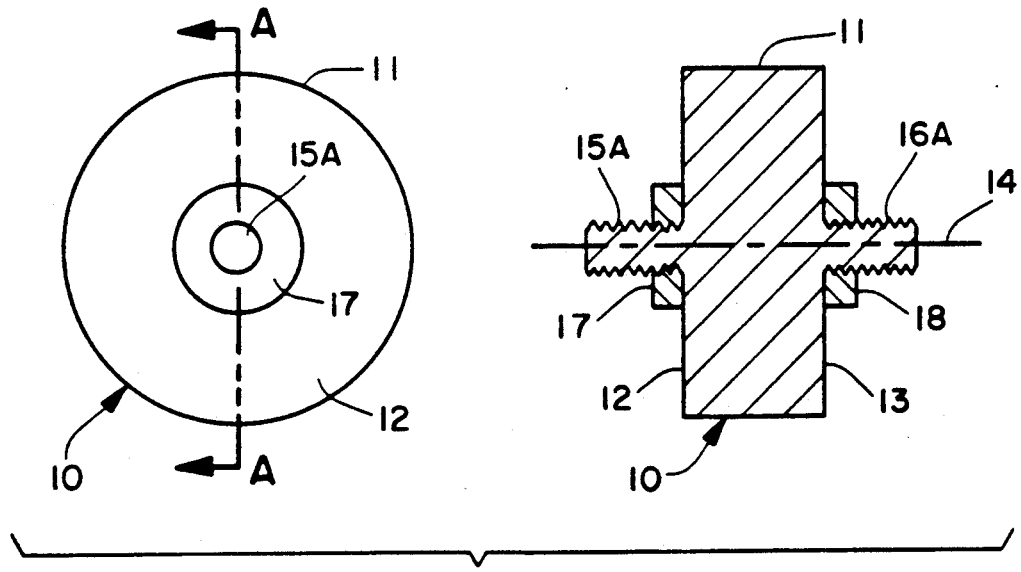

A variation of the horn shown in FIG. 1B is that illustrated by FIG. 1C which shows a plan view and a cross-sectional view along line A—A. Conceptually, horn 10 of FIG. 1C is horn 10 of FIG. 1B to which hubs 17 and 18 having a threaded hole through the thickness thereof are screwed onto studs 15A and 16A, respectively, to fit snugly against ends 12 and 13. Horn 10 and hubs 17 and 18 can be made from the same metal or different metals, although the use of the same metal is preferred.

It should be noted at this point that, although studs are preferred, they are shown only in FIGS. 1B, 1C, 2B, 2C, 7, and 8 in order to illustrate the variations which are possible with respect to the ultrasonic rotary horn of the present invention. The absence of studs in the other Figures, however, is not to be construed as in any way limiting the spirit or scope of the present invention.

Figure 2A:
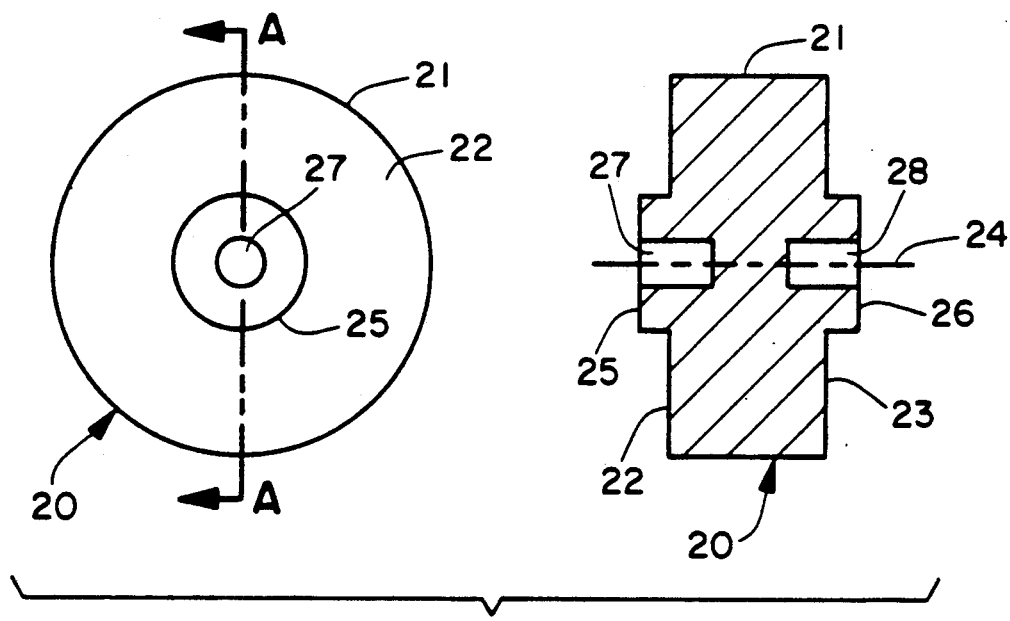

If a hub is included on each end as an integral part of horn 10 of FIG. 1A, the ultrasonic rotary horn of FIG. 2A results. Thus, horn 20 has a radial surface 21, first end 22, second end 23, and a circular cross-section as represented by end 22. Ends 22 and 23 are flat, parallel, and normal to the rotational axis 24 of horn 20. End 22 has hub 25 and end 23 has hub 26. Each hub is circular and concentric with ends 22 and 23. Cylindrical holes 27 and 28 are located in hubs 25 and 26, respectively, centered about rotational axis 24. Hence, holes 27 and 28 and hubs 25 and 26 are concentric with ends 22 and 23. Although hubs 25 and 26 can be machined separately from horn 20 and welded or otherwise attached to ends 22 and 23, respectively, it is preferred that the hubs are machined as an integral part of horn 20, as shown in FIG. 2A.

It should be noted at this point that the horn thickness includes the thicknesses of the hubs, if present, but does not include the distance studs, if present, protrude from the surfaces of either the ends of the horn or the external surfaces of the hubs.

Figure 2B:
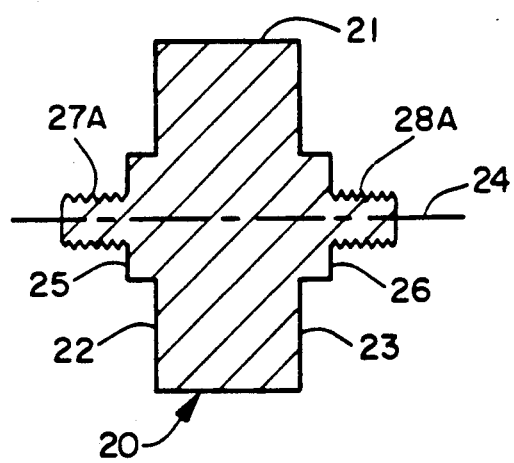
Figure 2C:
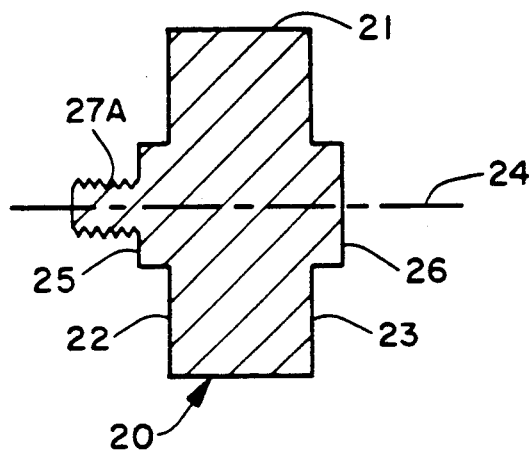

As with the horn of FIG. 1A, holes 27 and 28 can be threaded to accept studs or axles or studs can be welded or otherwise attached to hubs 25 and 26, respectively, of horn 20. Alternatively, and preferably, axles or studs are machined in place during the process of machining horn 20, an embodiment illustrated by FIG. 2B which is a cross-sectional view along line A—A of FIG. 2A. Horn 20 is identical with the horn of FIG. 2A, except that in place of holes 27 and 28, threaded studs 27A and 28A, respectively, are present as integral parts of horn 20. Such studs are concentric with ends 22 and 23. If neither hole 28 nor threaded stud 28A is present on end 23, the horn of FIG. 2C, shown in cross-section only, results.

Figure 3:
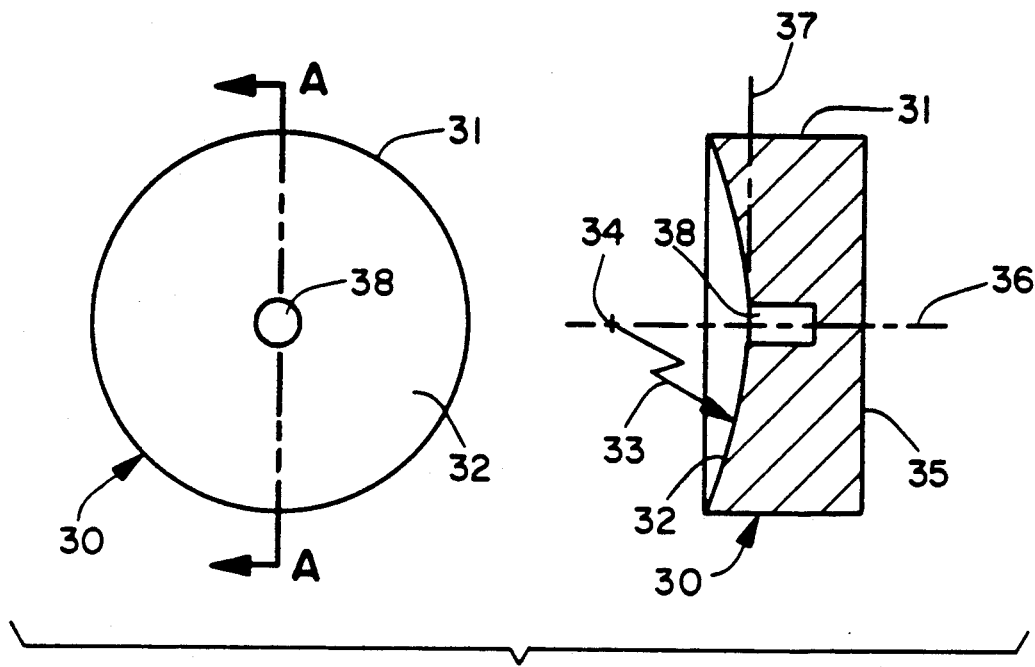

FIG. 3 illustrates an ultrasonic rotary horn in which one end of the horn of FIG. 1A is replaced with a concave end and the hole in the other end is eliminated. Hence, horn 30 has a radial surface 31, first end 32, second end 35, and a circular cross-section as represented by end 32. End 32 is concave, the surface of which is that of a segment of a sphere having radius 33 and center 34 located on rotational axis 36 of horn 30. The tangent 37 to end 32 at the point where end 32 meets rotational axis 36 of horn 30 is normal to rotational axis 36. End 35 is flat and normal to rotational axis 36 of horn 30 and parallel with tangent 37. End 32 has cylindrical hole 38 which is centered about rotational axis 36. Thus, hole 38 and ends 32 and 35 are concentric.

Of course, hole 38 can be located in end 35 rather than in end 32. Hubs and studs or axles also can be present, if desired, as described for horns 10 and 20 of FIGS. 1A and 2A, respectively.

Figure 4:
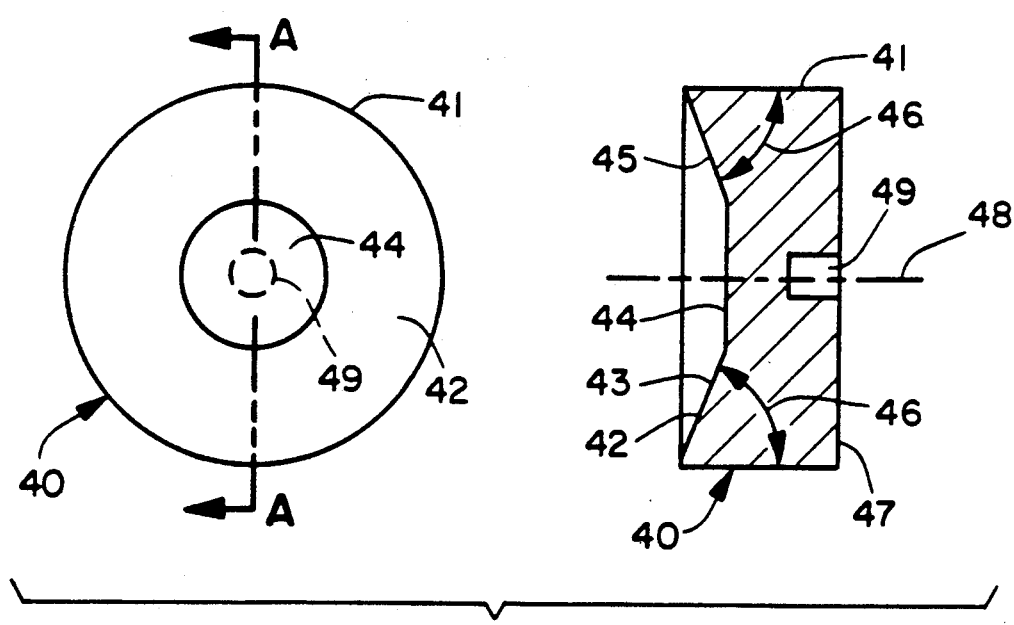

Horn 40 of FIG. 4 is a variation of the ultrasonic rotary horn of FIG. 3. Horn 40 has a radial surface 41, first end 42, second end 47, and a circular cross-section as represented by end 42. End 42 is concave, the surface of which in cross-section consists of planar segments 43, 44, and 45. Planar segments 43 and 45 are equal in width and are at angle 46 from radial surface 41 which is substantially parallel with rotational axis 48. Planar segment 44 is normal to rotational axis 48 and concentric with end 42. End 47 is flat and normal to rotational axis 48 of horn 40 and parallel with planar segment 44. End 47 has cylindrical hole 49 which is centered about rotational axis 48. Thus, hole 49, ends 42 and 47, and planar segment 44 are concentric.

Hole 49 can be located in end 42 rather than in end 47, and hubs or axles also can be present, if desired, as described for horns 10 and 20 of FIGS. 1A and 2A, respectively.

Figure 5:
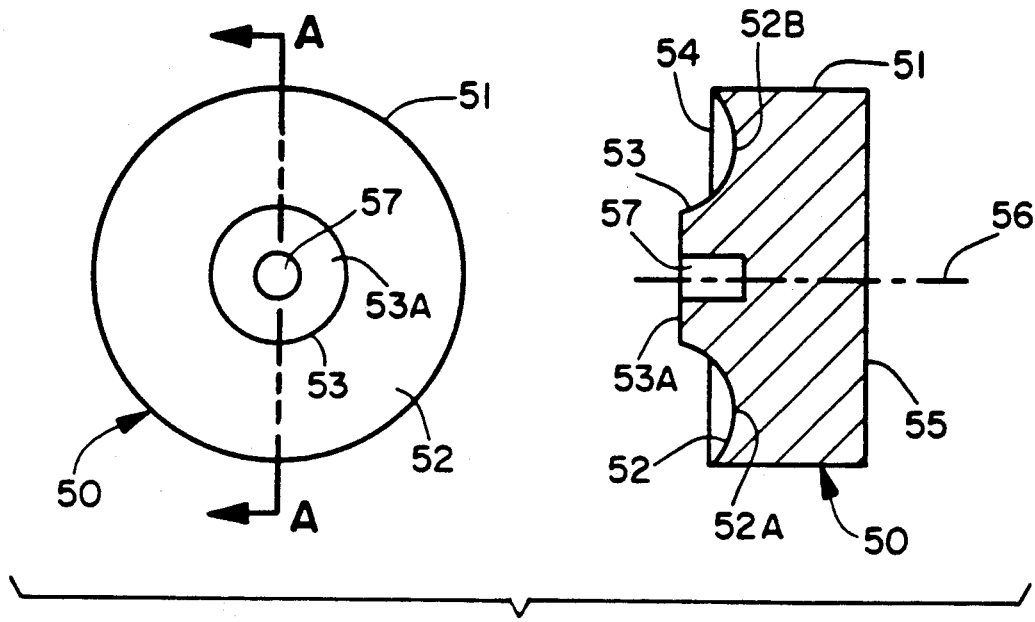

FIG. 5 illustrates an ultrasonic rotary horn which also is a variation of that of FIG. 3. In FIG. 5, horn 50 has a radial surface 51, first end 52, second end 55, and a circular cross-section as represented by end 52. End 52 is substantially concave, but has hub 53 which extends beyond edge 54 of radial surface 51. Hub 53 has face 53A which is flat and normal to rotational axis 56 of horn 50. In addition to hub 53, end 52 is defined in cross-section by curved lines 52A and 52B which are identical (i.e., mirror images of each other), such that end 52 is radially symmetrical. End 55 is flat and normal to rotational axis 56 of horn 50 and parallel with face 53A of hub 53. End 52 has cylindrical hole 57 which is centered about rotational axis 56. Thus, hole 57, hub 53, and ends 52 and 55 are concentric.

Variations such as those described in relation to the preceding figures are possible with the horn of FIG. 5, as well.

Figure 6:
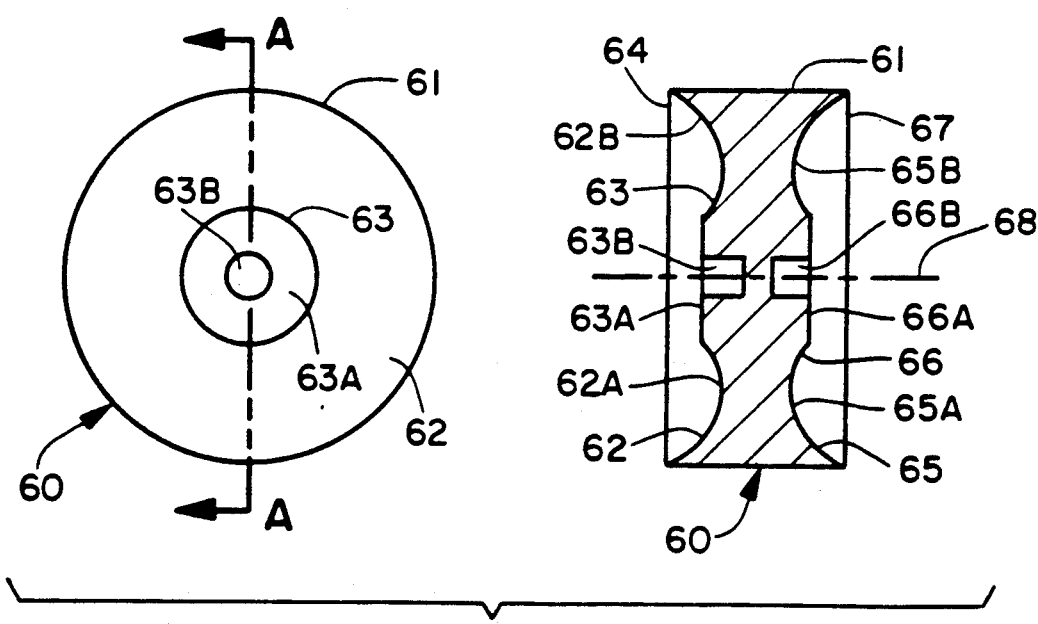

FIG. 6 illustrates an ultrasonic rotary horn of the present invention in which both ends are substantially concave and both ends have hubs. Hence, horn 60 has a radial surface 61, first end 62, second end 65, and a circular cross-section as represented by end 62. End 62 is substantially concave and has hub 63 which extends outwardly from end 62 but is recessed with respect to edge 64 of radial surface 61. Hub 63 has face 63A which is flat and normal to rotational axis 68 of horn 60. In addition to hub 63, end 62 is defined in cross-section by curved lines 62A and 62B which are identical, such that end 62 is radially symmetrical. End 62 has cylindrical hole 63B which is centered in face 63A of hub 63 about rotational axis 58. Similarly, end 65 is substantially concave and has hub 66 which extends outwardly from end 65 but is recessed with respect to edge 67 of radial surface 61. Hub 66 has face 66A which is flat and normal to rotational axis 68 of horn 60. In addition to hub 66, end 65 is defined in cross-section by curved lines 65A and 65B which are identical, such that end 65 is radially symmetrical. End 65 has cylindrical hole 66B which is centered in face 66A of hub 66 about rotational axis 68. Thus, holes 63B and 66B, hubs 63 and 66, and ends 62 and 65 are concentric.

To the extent not already described, variations such as those described in relation to the preceding figures are possible with the horn of FIG. 6.

Figure 7:
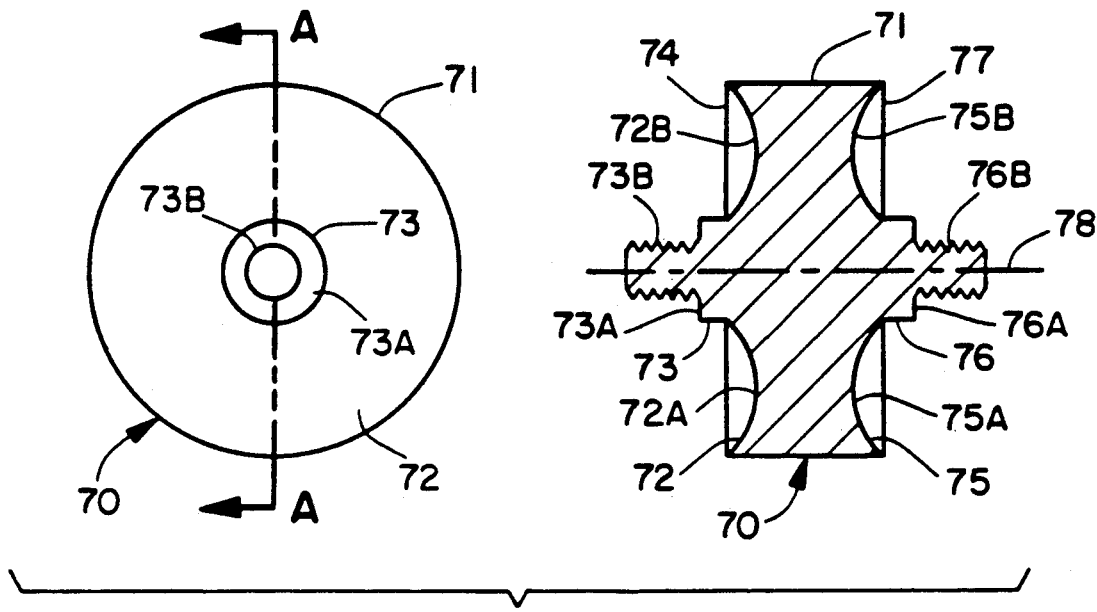

If the horn of FIG. 6 is made thicker in the central portion such that the hubs extend beyond the edges of the radial surface, the ultrasonic rotary horn of FIG. 7 results. In FIG. 7, horn 70 has a radial surface 71, first end 72, second end 75, and a circular cross-section as represented by end 72. End 72 is substantially concave and has hub 73 which extends outwardly from end 72 and extends beyond edge 74 of radial surface 71. Hub 73 has face 73A which is flat and normal to rotational axis 78 of horn 70. In addition to hub 73, end 72 is defined in cross-section by curved lines 72A and 72B which are identical, such that end 72 is radially symmetrical. End 72 has protruding threaded stud 73B which is centered in face 73A of hub 73 about rotational axis 78. Similarly, end 75 is substantially concave and has hub 76 which extends outwardly from end 75 and extends beyond edge 77 of radial surface 71. Hub 76 has face 76A which is flat and normal to rotational axis 78 of horn 70. In addition to hub 76, end 75 is defined in cross-section by curved lines 75A and 75B which are identical, such that end 75 is radially symmetrical. End 75 has protruding threaded stud 76B which is centered in face 76A of hub 76 about rotational axis 78. Thus, studs 73B and 76B, hubs 73 and 76, and ends 72 and 75 are concentric. Moreover, end 75 is a mirror image of end 72. Finally, it may be noted that hubs 73 and 76 and studs 73B and 76B are integral parts of horn 70.

To the extent not already described, variations such as those described in relation to the preceding figures also are possible with the horn of FIG. 7.

In the figures described thus far, hubs, when present, have extended outwardly from the ends of the horn. Hubs, however, may be inverted, as shown in FIG. 8.

Figure 8:
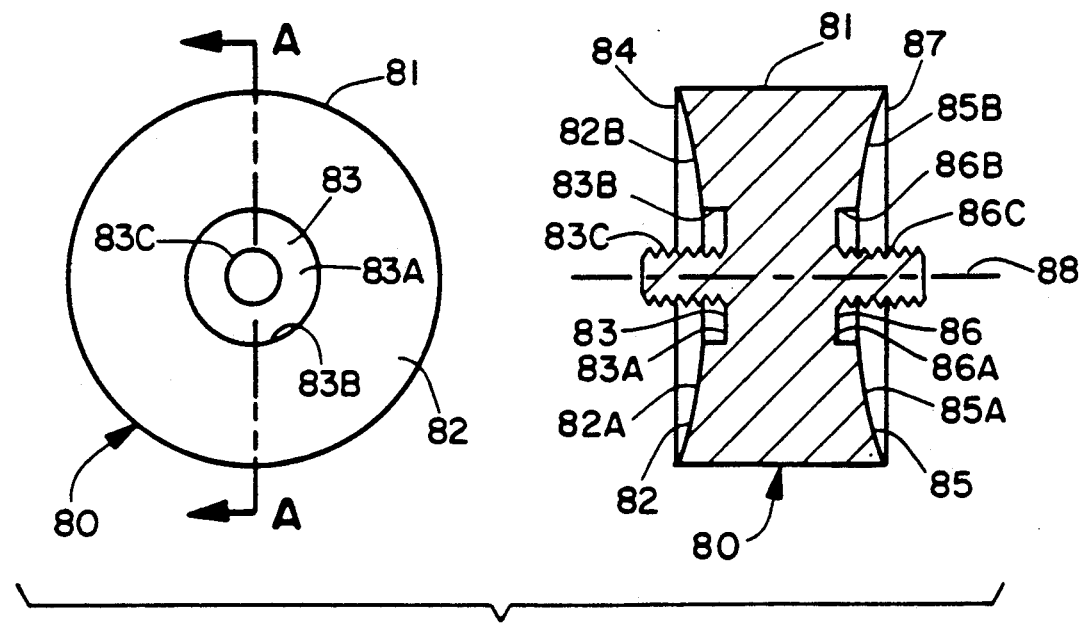

In FIG. 8, horn 80 has a radial surface 81, first end 82, second end 85, and a circular cross-section as represented by end 82. Radial surface 81 terminates at edges 84 and 87. End 82 is substantially concave and has hub 83 which extends inwardly from end 82. Hub 83 has face 83A which is flat and normal to rotational axis 88 of horn 80 and side wall 83B which is substantially equidistant from and concentric with rotational axis 88. In addition to hub 83, end 82 is defined in cross-section by curved lines 82A and 82B which are identical, such that end 82 is radially symmetrical. End 82 has protruding threaded stud 83C which is centered in face 83A of hub 83 about rotational axis 88. Similarly, end 85 is substantially concave and has hub 86 which extends inwardly from end 85. Hub 86 has face 86A which is flat and normal to rotational axis 88 of horn 80 and side wall 86B which is substantially equidistant from and concentric with rotational axis 88. In addition to hub 86, end 85 is defined in cross-section by curved lines 85A and 85B which are identical, such that end 85 is radially symmetrical. End 85 has protruding threaded stud 86C which is centered in face 86A of hub 86 about rotational axis 88. Thus, studs 83C and 86C, hubs 83 and 86, and ends 82 and 85 are concentric, and studs 83C and 86C protrude beyond edges 84 and 87 of radial surface 81. Moreover, end 85 is a mirror image of end 82. Finally, it may be noted that hubs 83 and 86 and studs 83C and 86C are integral parts of horn 80.

Figure 9:
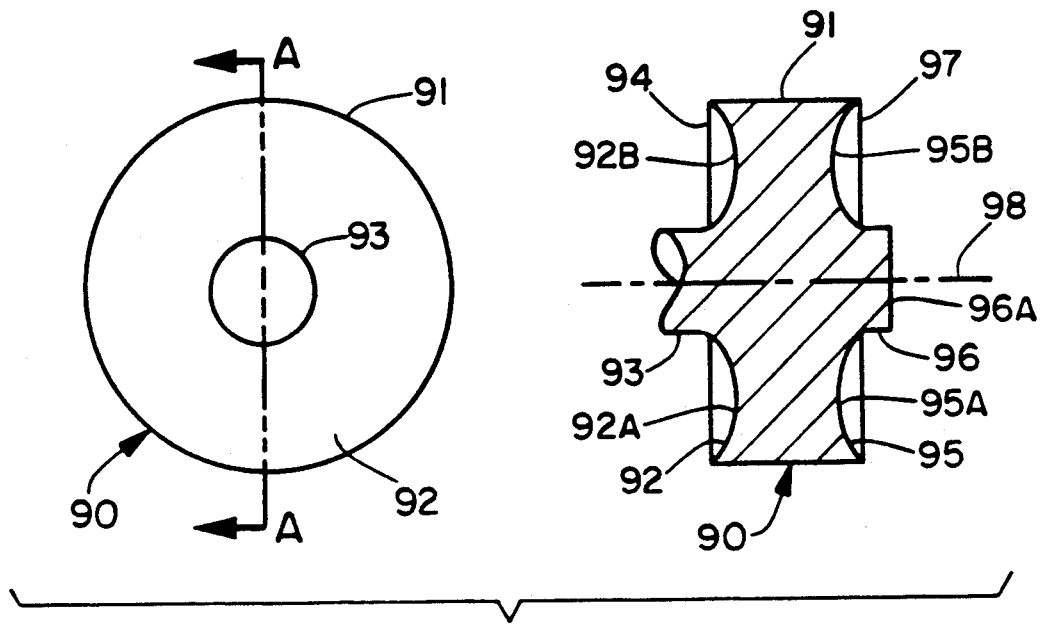

A preferred embodiment of the ultrasonic rotary horn of FIG. 7 is shown in FIG. 9. In FIG. 9, horn 90 has a radial surface 91, first end 92, second end 95, and a circular cross-section as represented by end 92. End 92 is substantially concave and has hub 93 which extends outwardly from end 92 and extends beyond edge 94 of radial surface 91. Hub 93 becomes an elongated waveguide of standard design (not shown) which is an integral part of the horn. In addition to hub 93, end 92 is defined in cross-section by curved lines 92A and 92B which are identical, such that end 92 is radially symmetrical. Similarly, end 95 is substantially concave and has hub 96 which extends outwardly from end 95 and extends beyond edge 97 of radial surface 91. Hub 96 has face 96A which is flat and normal to rotational axis 98 of horn 90. In addition to hub 96, end 95 is defined in cross-section by curved lines 95A and 95B which are identical, such that end 95 is radially symmetrical. Hub 93 and the integral elongated waveguide, hub 96, and ends 92 and 95 are concentric. Moreover, except for the absence of an elongated waveguide, end 95 is a mirror image of end 92. Finally, it may be noted that hubs 93 and 96 are integral parts of horn 90.

Figure 10:
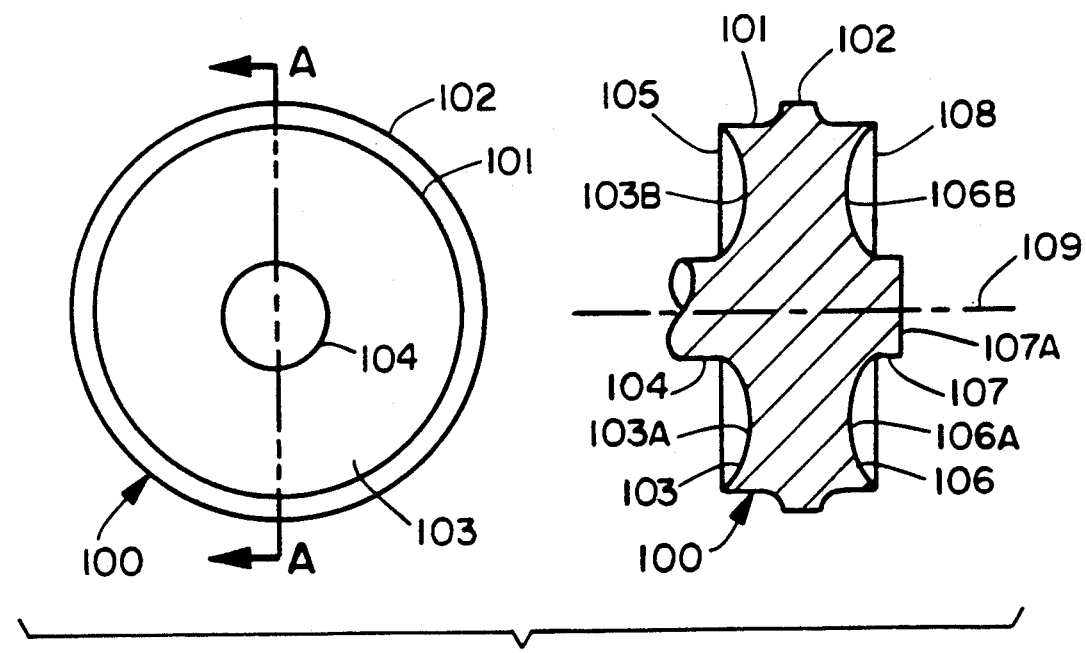

FIG. 10 illustrates a preferred embodiment of an ultrasonic rotary horn having a centrally located raised land. In FIG. 10, horn 100 has radial surface 101 having raised land 102, first end 103, second end 106, and a circular cross-section as represented by end 103. End 103 is substantially concave and has hub 104 which extends outwardly from end 103 and extends beyond edge 105 of horn 100. Hub 104 becomes an elongated waveguide of standard design (not shown) which is an integral part of the horn. In addition to hub 104, end 103 is defined in cross-section by curved lines 103A and 103B which are identical, such that end 103 is radially symmetrical. Similarly, end 106 is substantially concave and has hub 107 which extends outwardly from end 106 and extends beyond edge 108 of horn 100. Hub 107 has face 107A which is flat and normal to rotational axis 109 of horn 100. In addition to hub 107, end 106 is defined in cross-section by curved lines 106A and 106B which are identical, such that end 106 is radially symmetrical. Hub 104 and the integral elongated waveguide, hub 107, and ends 103 and 106 are concentric. Moreover, except for the absence of an elongated waveguide, end 106 is a mirror image of end 103. Finally, it may be noted that hubs 104 and 107 are integral parts of horn 100.

Figure 11:
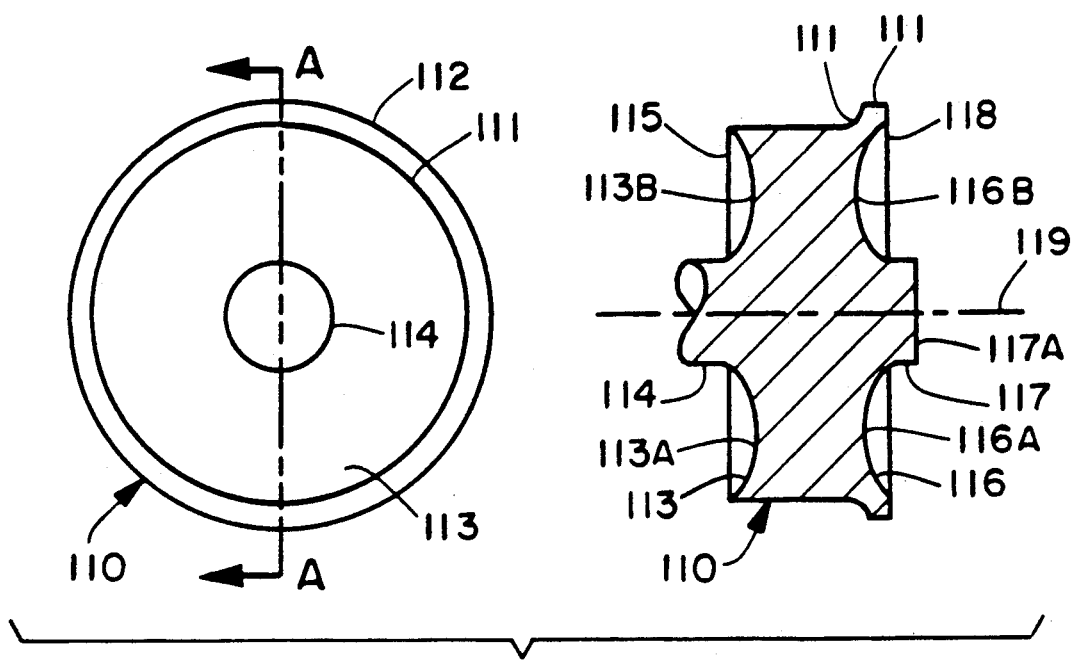

FIG. 11 illustrates a preferred embodiment of an ultrasonic rotary horn having a raised land at the nonexcited end. In FIG. 11, horn 110 has raised land 111 having radial surface 112, first end 113, second end 116, and a circular cross-section as represented by end 113. End 113 is substantially concave and has hub 114 which extends outwardly from end 113 and extends beyond edge 115 of horn 110. Hub 114 becomes an elongated waveguide of standard design (not shown) which is an integral part of the horn. In addition to hub 114, end 113 is defined in cross-section by curved lines 113A and 113B which are identical, such that end 113 is radially symmetrical. Similarly, end 116 is substantially concave and has hub 117 which extends outwardly from end 116 and extends beyond edge 118 of horn 110. Hub 117 has face 117A which is flat and normal to rotational axis 119 of horn 110. In addition to hub 117, end 116 is defined in cross-section by curved lines 116A and 116B which are identical, such that end 116 is radially symmetrical. Hub 114 and the integral elongated waveguide, hub 117, and ends 113 and 116 are concentric. Moreover, except for the absence of an elongated waveguide and the presence of the raised land, end 116 is a mirror image of end 113. Finally, it may be noted that hubs 114 and 117 are integral parts of horn 110.

Figure 12:
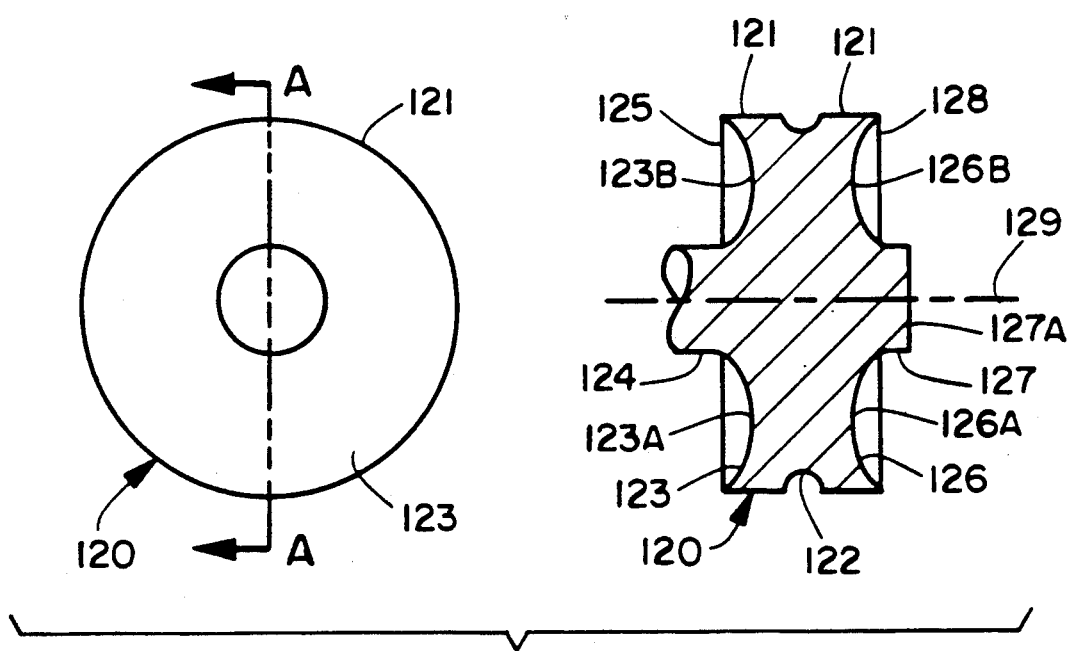

FIG. 12 illustrates a preferred embodiment of an ultrasonic rotary horn having a centrally located grove in the radial surface. In FIG. 12, horn 120 has radial surface 121 having centrally located grove 122, first end 123, second end 126, and a circular cross-section as represented by end 123. End 123 is substantially concave and has hub 124 which extends outwardly from end 123 and extends beyond edge 125 of radial surface 121. Hub 124 becomes an elongated waveguide of standard design (not shown) which is an integral part of the horn. In addition to hub 124, end 123 is defined in cross-section by curved lines 123A and 123B which are identical, such that end 123 is radially symmetrical. Similarly, end 126 is substantially concave and has hub 127 which extends outwardly from end 126 and extends beyond edge 128 of horn 120. Hub 127 has face 127A which is flat and normal to rotational axis 129 of horn 120. In addition to hub 127, end 126 is defined in cross-section by curved lines 126A and 126B which are identical, such that end 126 is radially symmetrical. Hub 124 and the integral elongated waveguide, hub 127, and ends 123 and 126 are concentric. Moreover, except for the absence of an elongated waveguide, end 126 is a mirror image of end 123. Finally, it may be noted that hubs 124 and 127 are integral parts of horn 120.

The ultrasonic rotary horns represented by FIGS. 10-12, inclusive, have nonlinear radial surface profiles with distinct components, i.e., a raised land or a groove. An example of a horn in which the radial surface profile is defined by a smoothly changing nonlinear line is illustrated by FIG. 13.

Figure 13:
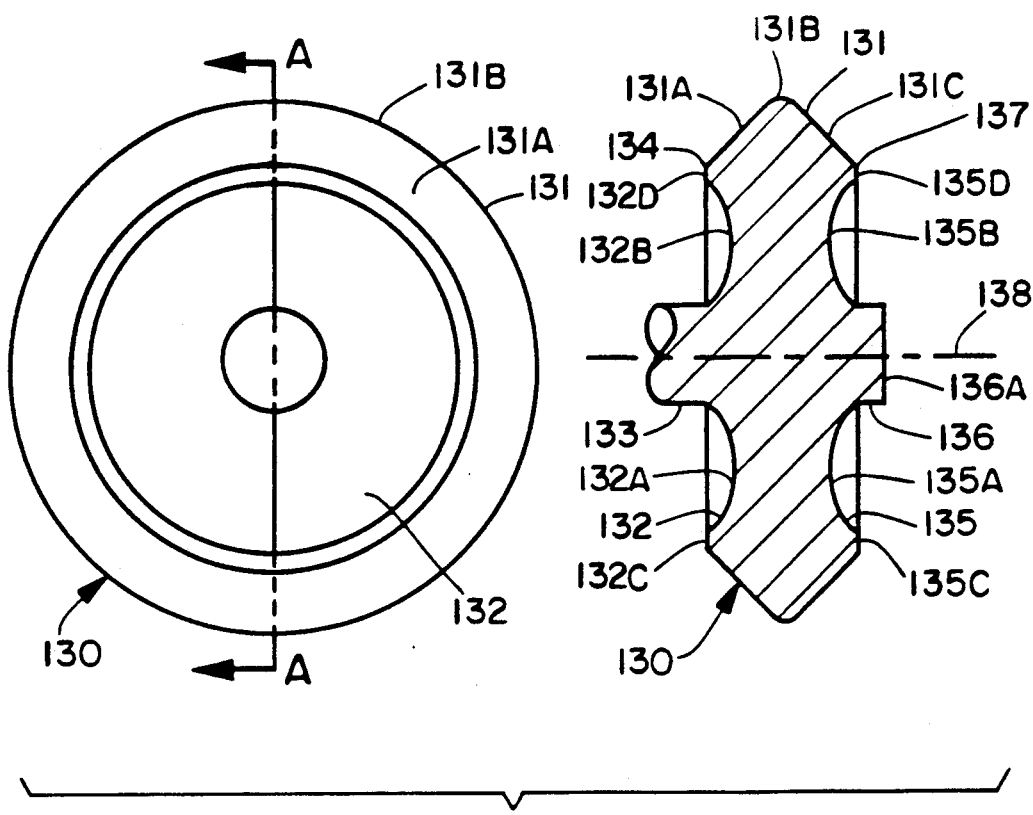

In FIG. 13, horn 130 has radial surface 131, first end 132, second end 135, and a circular cross-section as represented by end 132. Radial surface 131 has a nonlinear profile which has two relatively flat portions 131A and 131C on each side of centrally located rounded or curved portion 131B. End 132 is substantially concave and has hub 133 which extends outwardly from end 132 and extends beyond edge 134 of radial surface 131. Hub 133 becomes an elongated waveguide of standard design (not shown) which is an integral part of the horn. In addition to hub 133, end 132 is defined in cross-section by curved lines 132A and 132B which are identical, and flat surfaces 132C and 132D which are identical, such that end 132 is radially symmetrical. Similarly, end 135 is substantially concave and has hub 136 which extends outwardly from end 135 and extends beyond edge 137 of horn 130. Hub 136 has face 136A which is flat and normal to rotational axis 138 of horn 130. In addition to hub 136, end 135 is defined in cross-section by curved lines 135A and 135B which are identical, and flat surfaces 135C and 135D which are identical, such that end 135 is radially symmetrical. Hub 133 and the integral elongated waveguide, hub 136, and ends 132 and 135 are concentric. Moreover, except for the absence of an elongated waveguide, end 135 is a mirror image of end 132. Finally, it may be noted that hubs 133 and 136 are integral parts of horn 130.

Figure 14:
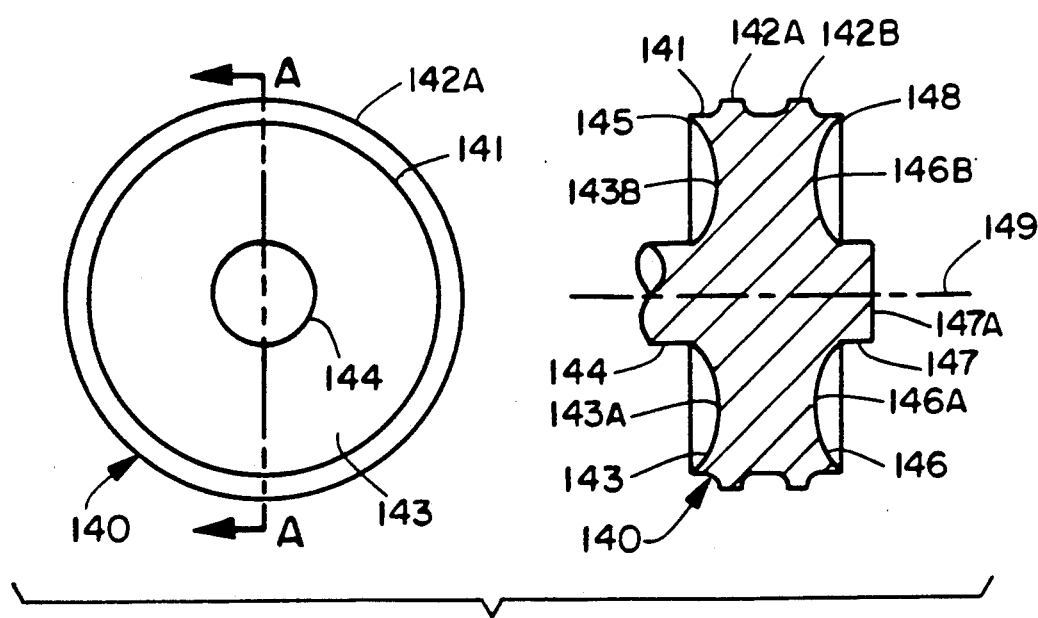

Finally, FIG. 14 illustrates a variation of the ultrasonic rotary horn of FIG. 10, i.e., a horn having two raised lands, neither of which is located at an edge of the horn. In FIG. 14, horn 140 has radial surface 141 having two inwardly located raised lands 142A and 142B, first end 143, second end 146, and a circular cross-section as represented by end 143. End 143 is substantially concave and has hub 144 which extends outwardly from end 143 and extends beyond edge 145 of horn 140. Hub 144 becomes an elongated waveguide of standard design (not shown) which is an integral part of the horn. In addition to hub 144, end 143 is defined in cross-section by curved lines 143A and 143B which are identical, such that end 143 is radially symmetrical. Similarly, end 146 is substantially concave and has hub 147 which extends outwardly from end 146 and extends beyond edge 148 of horn 140. Hub 147 has face 147A which is flat and normal to rotational axis 149 of horn 140. In addition to hub 147, end 146 is defined in cross-section by curved lines 146A and 146B which are identical, such that end 146 is radially symmetrical. Hub 144 and the integral elongated waveguide, hub 147, and ends 143 and 146 are concentric. Moreover, except for the absence of an elongated waveguide, end 146 is a mirror image of end 143. Finally, it may be noted that hubs 144 and 147 are integral parts of horn 140.

It should be apparent from the description thus far that the presence or absence of hubs is optional and depends upon the desired performance characteristics of the horn. While the presence of hubs affects the performance of the horn and must be taken into account when designing the horn, the dimensions of the hubs are not known to be critical. Typically, hubs will have a diameter of the order of 5 cm and a shoulder height of up to about 1.8 cm.

When a horn having ends which are substantially concave is desired, the profile of the substantially concave surface of each end is described by various methods known to those having ordinary skill in the art of the geometry of surfaces. For example, the profile can be circular, second order, inverse second order, exponential, inverse exponential, catenary, inverse catenary, gaussian, inverse gaussian, combinations thereof, and the like. Formulas useful for the more common profiles, i.e., circular, second order, and exponential, are given below, with reference to FIG. 15. In each case, x and y or x, and y, are the Cartesian values of the points defining the concave surface.

---

Circular Profile $$y = \{[(L/2)^2 + (r-d)^2)/2(r-d)]^2 - (x - L/2)^2\}^{\frac{1}{2}} - \{[(L/2)^2 + (r-d)^2)/2(r-d)] - (L/2)^2\}^{\frac{1}{2}} \quad (1)$$

in which L is the length of the profile, r is the radius of the circle defining the concave surface, and d is the depth of the concave surface relative to the edge of the work-contacting surface. Typical values for L and r − d are 5.8 cm and 6.4 cm, respectively.

Second order profile $$y' = a(x')^2 - b(x') \quad (2)$$

Typical values for a and b are 0.5356 and −0.1289, respectively.

Exponential profile $$y' = ae^{bx'} - a \quad (3)$$

Typical values for a and b are 1.1535 and 0.5408, respectively.

---

In general, L and r, or the coefficients a and b, are chosen to yield a desired value for d which typically will be in the range from about 0.1 cm to about 4.5 cm, depending upon the width of the work-contacting surface and the characteristics desired for the horn.

Figure 15:
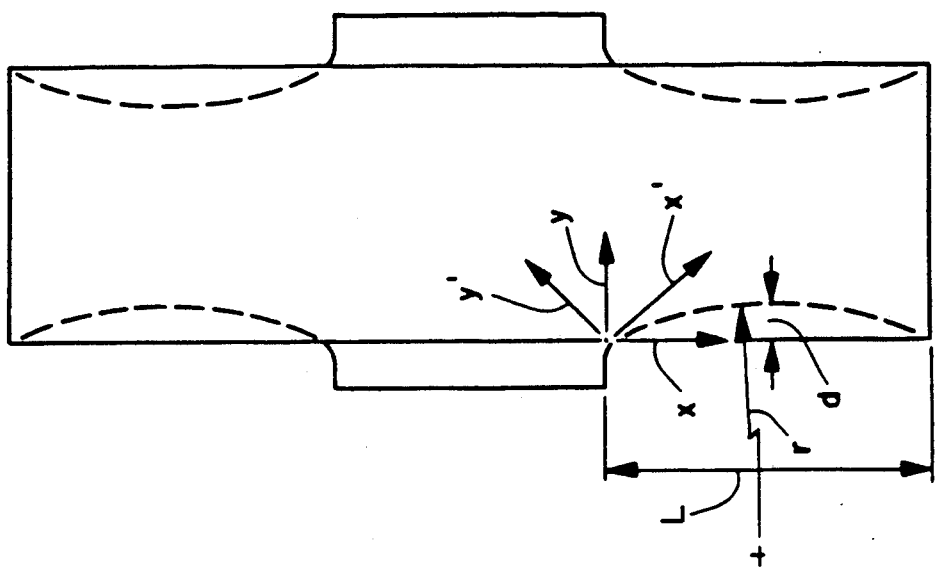
FIG. 15 is a diagrammatic end view representation of one embodiment of the ultrasonic rotary horn of the present invention illustrating the variables of three different equations which can be used to determine the curvature of the substantially concave ends.

The axes x, x', y, and y' and the dimensions r, d, and L from the foregoing equations are shown in FIG. 15 which is a diagrammatic end view representation of the ultrasonic rotary horn of the present invention used to make measurements of acoustical and mechanical properties as described hereinafter.

As a practical matter, second order profiles are preferred since they seem to give the best performance of the three. For a concave end having a second order profile, the appropriate values for a and b are placed in the equation which is solved graphically. However, for machining the horn, the resulting plot of the equation must be rotated 45° in order to make the x'-axis contiguous with the edge of the horn or the x-axis. In order to do this, each point on the graph is converted to a vector which is rotated the required 45° and then reconverted to a point.

Finally, it should be noted that the ends of the ultrasonic rotary horn of the present invention can be flat. That is, excluding hubs and studs, if present, the two ends can be parallel to each other and perpendicular to the rotational axis of the horn. However, horns having flat ends, while easier and less expensive to machine, typically do not provide the performance characteristics of horns having either concave or convex ends. Thus, horns having flat ends are less preferred than the other permitted configurations.

The present invention is further described by the examples which follow. Such examples, however, are not to be construed as limiting in any way either the spirit or scope of the present invention.

EXAMPLE 1

Evaluation of a 20 kHz Horn of the Present Invention and its Comparison with a Commercially Available Horn In order to measure the acoustical and mechanical properties of an ultrasonic rotary horn of the present invention, a horn similar to that shown in FIG. 7, including the hubs and studs, was machined from a solid piece of titanium. The horn was intended to be excited at a frequency of about 20 kHz. The radial surface was about 5.1 cm wide and the horn had a diameter of about 17.1 cm. The ends of the horn were identical (i.e., they were mirror images of each other). Each end had a cylindrical hub, the face of which was about 5.1 cm in diameter. The hub had a shoulder which was parallel with both the radial surface and the rotational axis of the horn; the shoulder had a length of about 7 mm. Protruding from each hub concentric with the rotational axis of the horn was a threaded stud having a diameter of about 13 mm.

Figure 16:
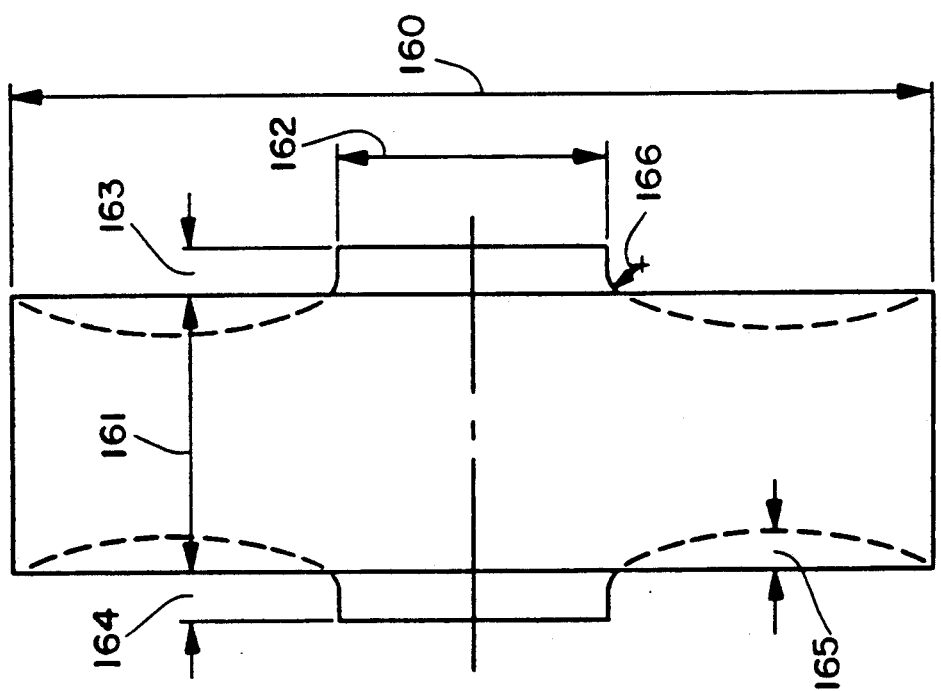
FIG. 16 is a diagrammatic representation of an ultrasonic rotary horn similar to that of FIG. 7 and illustrates the dimensional parameters of the horn.

The actual dimensions in mm of the horn are shown in Table 1 with reference to FIG. 16 which is an end view representation of the horn, except for the studs which are not shown. In addition, the concave portions of the ends of the horn of FIG. 16 actually had a second order profile which is not shown, the coefficients a and b having the values 0.5356 and −0.1289, respectively (for convenience, the concave portions of the ends in the drawings have circular profiles). The horn had a mass of 4.640 kg (all mass measurements were made with a Mettler Model PE16 electronic balance, Mettler Instrument Corp., Hightstown, N.J.).

TABLE 1

| Dimensions of the 20 kHz Horn of FIG. 16 | |
| --- | --- |
| Dimension | Value (mm) |
| 160 | 170.69 |
| 161 | 50.80 |
| 162 | 50.80 |
| 163 | 8.89 |
| 164 | 8.89 |
| 165 | 6[a] |
| 166 | 2.54 |

[a]Approximate value.

Figure 17:
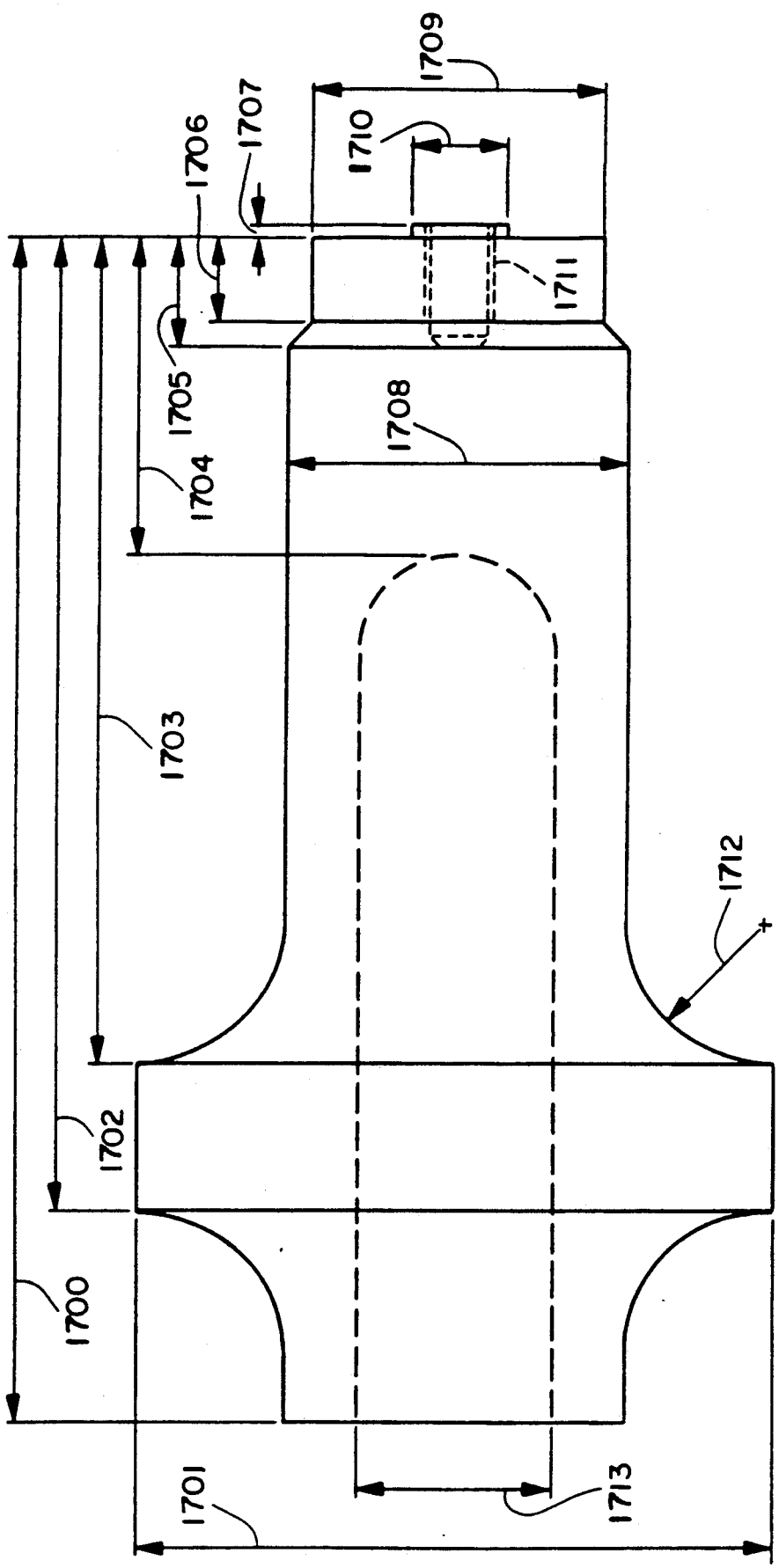
FIG. 17 is a diagrammatic representation of a commercially available ultrasonic rotary horn which identifies the dimensional parameters of the horn.

Because similar measurements were desired for the Mecasonic horn, the horn employed (Model No. 2994) is represented by FIG. 17 which is a side view representation of the Mecasonic horn illustrating the dimensional parameters. The actual dimensions in mm are shown in Table 2. The horn had a mass of 4.668 kg.

TABLE 2

| Dimensions of the Mecasonic Horn of FIG. 17 | |
| --- | --- |
| Dimension | Value (mm) |
| 1700 | 242.14 |
| 1701 | 130.18 |
| 1702 | 199.87 |
| 1703 | 170.03 |
| 1704 | 63.58 |
| 1705 | 22.71 |
| 1706 | 17.30 |
| 1707 | 2.01 |
| 1708 | 69.95 |
| 1709 | 59.84 |
| 1710 | 21.95 |
| 1711 | —[a] |
| 1712 | 30.07 |
| 1713 | 41.99 |

[a]M16 × 2 tap, 22.73 mm deep.

Figure 18:
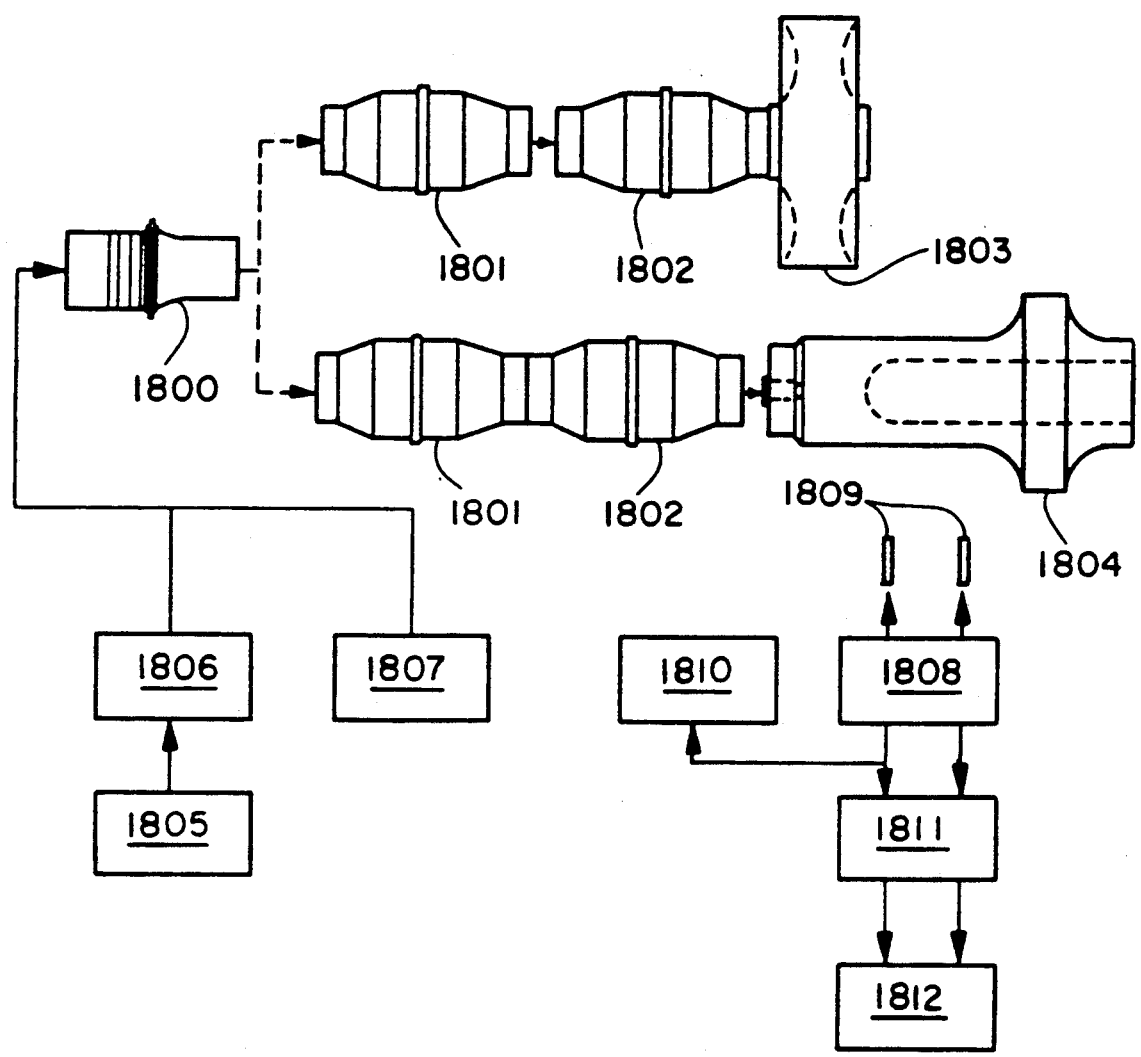
FIG. 18 is a diagrammatic representation of the experimental set-up and equipment required to measure the acoustical and mechanical properties of the horns represented by FIGS. 16 and 17.

The experimental set-up for such measurements is shown in FIG. 18 which includes a diagrammatic representation of the arrangement of the driver assembly, boosters, and horns. In each case, rotational displacement of a horn was accomplished by means of a piezoelectric transducer consisting of barium titanate ceramic in the conventional form of a halfwave resonator, i.e., Dukane driver assembly 1800 (Part No. 110-3123, Dukane Corporation, St. Charles, Ill.). Driver assembly 1800 was attached to a 1:1 booster 1801, such as the Dukane booster (Part No. 2177T) or its equivalent. Booster 1801 in turn was attached to a 2:1 booster 1802, such as the Dukane booster (Part No. 2181T) or its equivalent. Booster 1802 was attached to either the rotary horn of the present invention 1803 or the Mecasonic horn 1804.

In addition, FIG. 18 also shows schematically the auxiliary equipment required by the test procedure. Generator 1805 (a Dukane 1800-watt, 20-KHz generator, Part No. 20A1800) was connected to power meter 1806 (Sonic Systems Model M1/SC3 Wattmeter, Sonic Systems, Inc., Newtown, Pa.). Power meter 1806 was connected to driver assembly 1800. Also connected to driver assembly 1800 was horn analyzer 1807 (Dukane Horn Analyzer, Part No. 40A350). Displacement measuring system 1808 having probes 1809 (Kaman Model KD4200-1S1/1S2 SPL Displacement Measuring System, Kaman Instrumentation Corp., Colorado Springs, Colo.) was used to measure displacements at various points on each horn as described hereinafter. System 1808 was connected to frequency counter 1810 (B & K Precision Model 1822 Universal Counter, B & K Dynascan Corp., Chicago, Ill.) and to analog filter 1811

(wavetek Model 452 Dual Channel Hi/Lo Analog Filter, Wavetek San Diego, Inc., San Diego, Calif.). Filter 1811 in turn was connected to oscilloscope 1812 (Tektronix Model 5223 Digitizing Oscilloscope, Tektronix, Inc., Beaverton, Oreg.).

In some of the later experiments, some of the components shown in FIG. 18 were replaced with equivalent equipment from Branson Sonic Power Company (Danbury, Conn.), i.e., DuKane driver assembly 1800, generator 1805, and either or both of boosters 1801 and 1802. Such replacements, however, did not significantly affect either the method or the results obtained.

Figure 19:
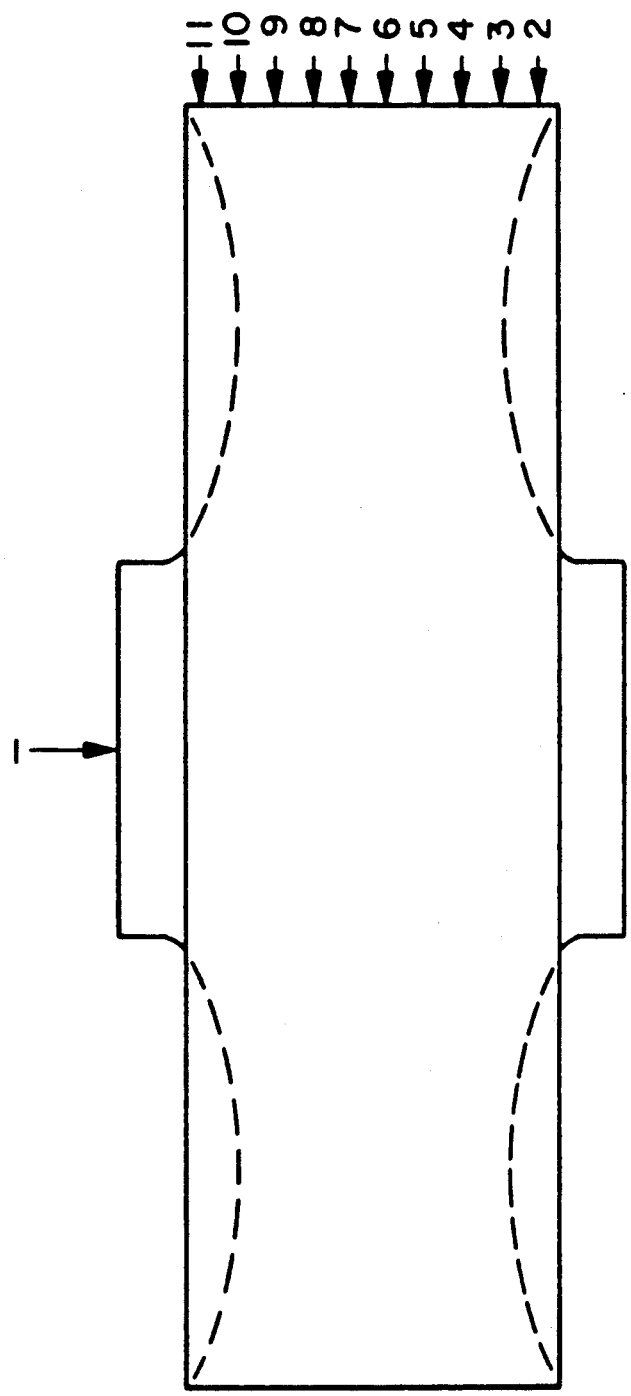
FIGS. 19 and 20 illustrate the points at which measurements were taken to determine the acoustical and mechanical properties of the horns represented by FIGS. 16 and 17, respectively.
Figure 20:
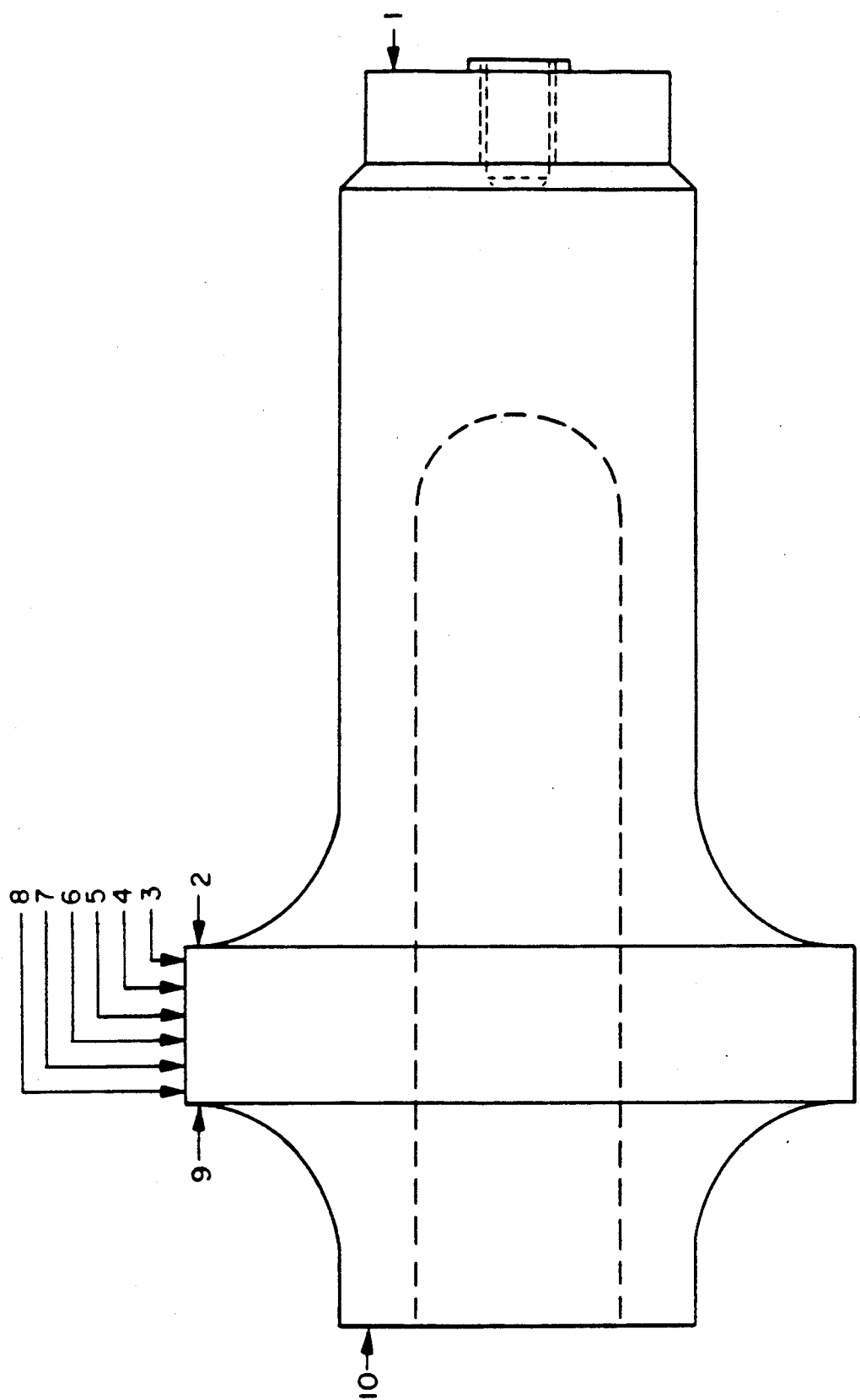

The driver assembly, boosters, and horn under test were configured as shown in FIG. 18. The system was excited by means of the horn analyzer to determine the resonant frequency of the system. The generator then was activated and the system excited for one minute to allow the system to stabilize. After the stabilization period, one displacement measuring probe was placed at the excitation input to the horn and the other probe was placed at appropriate consecutive points, primarily along the radial surface of the horn. The locations of the displacement measuring probes are shown diagrammatically in FIGS. 19 and 20 for the 20 kHz horn of the present invention and the Mecasonic horn, respectively. In each case, point represents the point of excitation input. With the generator on, the amplitude level, amplitude phase relative to point 1, power consumption, and frequency were recorded at each of points 2-11, inclusive, with the 20 kHz horn of the present invention (FIG. 19) and points 2-10, inclusive, with the Mecasonic horn (FIG. 20). Each of points 2 and 11 with the horn of the present invention and points 3 and 8 of the Mecasonic horn were located approximately 2.5 mm from the nearest edge of the radial surface, i.e., the edge nearest the excitation source. In addition, each point on the radial surface of each horn was about 5 mm from adjacent points. The data obtained with the 20 kHz horn of the present invention are summarized in Table 3 and the data for the Mecasonic horn are summarized in Table 4. The resonant or horn analyzer frequencies for the two horns were 20,003 and 19,928 Hz, respectively.

TABLE 3

Summary of data for the
20 kHz Horn of the Present Invention
at an Excitation Power of 150 Watts

| Point | Phase[a] | Amplitude (microns) | Horn Gain[b] | Effic.[c] | Frequency (Hz) |
|---|---|---|---|---|---|
| 1 | — | 34.0 | — | 0.23 | 20,003 |
| 2 | Out | 40.6 | 1.19 | 0.27 | 20,003 |
| 3 | Out | 40.6 | 1.19 | 0.27 | 20,002 |
| 4 | Out | 40.6 | 1.19 | 0.27 | 20,001 |
| 5 | Out | 40.6 | 1.19 | 0.27 | 20,001 |
| 6 | Out | 40.6 | 1.19 | 0.27 | 20,001 |
| 7 | Out | 40.6 | 1.19 | 0.27 | 20,000 |
| 8 | Out | 40.6 | 1.19 | 0.27 | 20,000 |
| 9 | Out | 40.4 | 1.19 | 0.27 | 19,999 |
| 10 | Out | 39.9 | 1.17 | 0.27 | 19,999 |
| 11 | Out | 39.6 | 1.16 | 0.26 | 19,998 |

[a]Phase, relative to point 1.
[b]The ratio of radial amplitude to longitudinal amplitude, the latter being represented by the amplitude value of point 1.
[c]Efficiency, in microns per watt.

TABLE 4

Summary of data for the
Mecasonic Horn
at an Excitation Power of 220 Watts

| Point | Phase[a] | Amplitude (microns) | Horn Gain[b] | Effic.[c] | Frequency (Hz) |
|---|---|---|---|---|---|
| 1 | — | 31.2 | — | 0.14 | 19,907 |
| 2 | In | 3.8 | 0.12 | 0.02 | 19,907 |
| 3 | In | 36.8 | 1.18 | 0.17 | 19,902 |
| 4 | In | 38.6 | 1.24 | 0.18 | 19,901 |
| 5 | In | 39.6 | 1.27 | 0.18 | 19,901 |
| 6 | In | 40.1 | 1.29 | 0.18 | 19,899 |
| 7 | In | 38.1 | 1.22 | 0.17 | 19,898 |
| 8 | In | 37.1 | 1.19 | 0.17 | 19,898 |
| 9 | —[d] | —[d] | — | — | 19,906 |
| 10 | In | 47.2 | 1.51 | 0.21 | 19,901 |

[a]Phase, relative to point 1.
[b]The ratio of radial amplitude to longitudinal amplitude, the latter being represented by the amplitude value of point 1.
[c]Efficiency, in microns per watt.
[d]Measurements were below instrument sensitivity.

Figure 21:
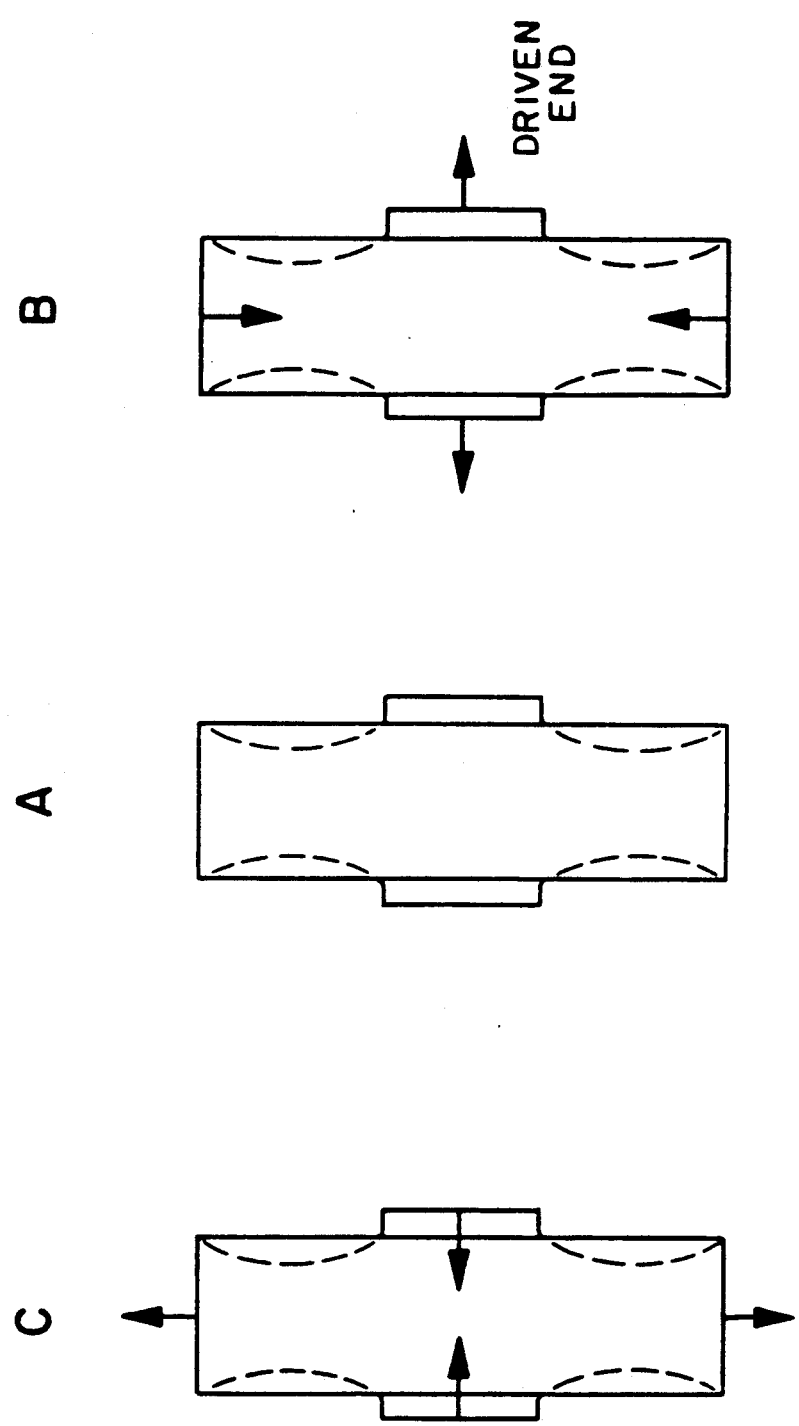
FIGS. 21 and 22 illustrate the definitions for "in phase" and "out of phase" for the horns represented by FIGS. 16 and 17, respectively, which definitions are employed in the descriptions of the acoustical and mechanical properties of the two horns.
Figure 22:
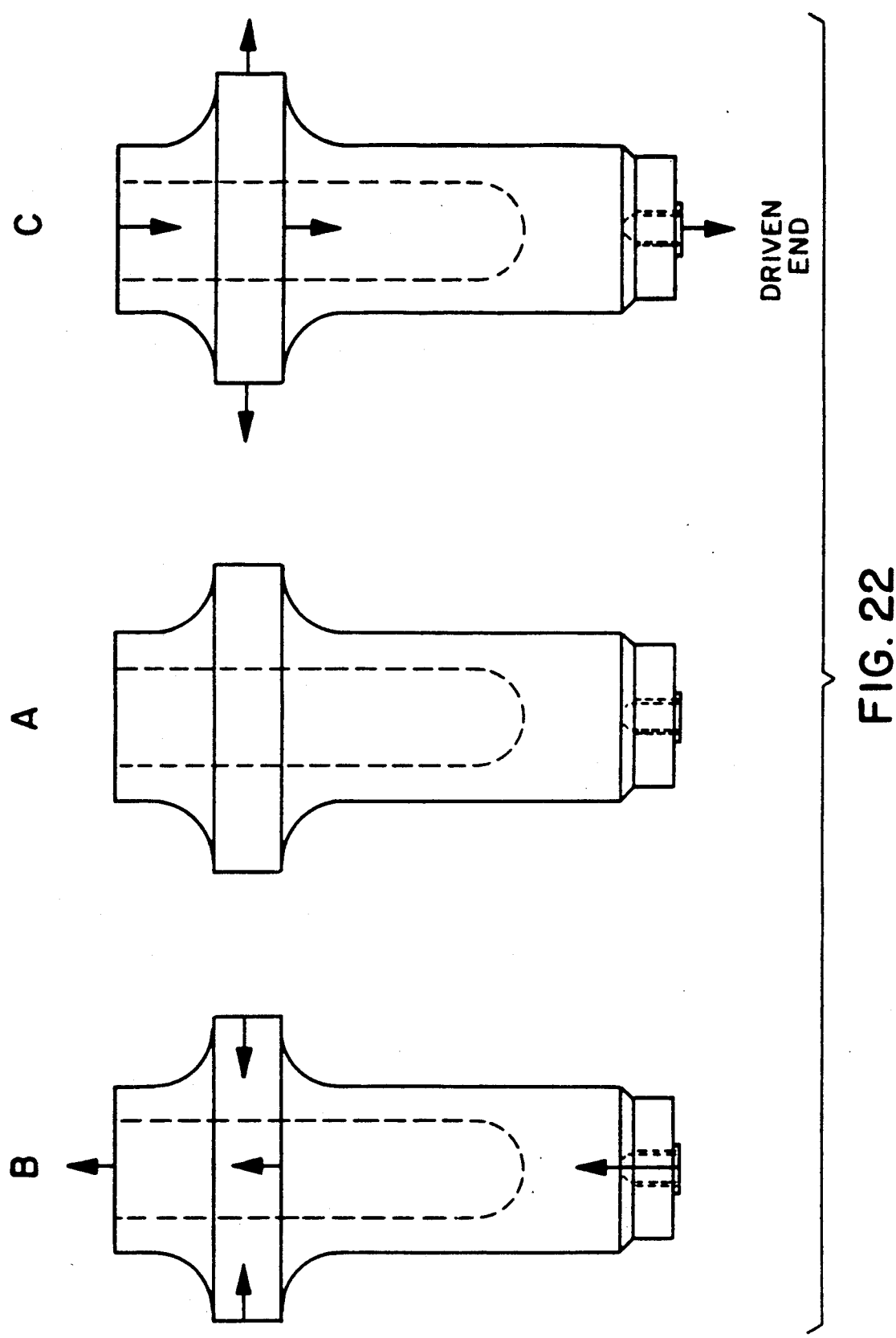

It should be noted that the "Phase" column in Tables 3 and 4 indicates the direction of the radial motion with respect to the longitudinal motion at the driven end, particularly with reference to FIGS. 21 and 22.

The terms "in phase" and "out of phase", already defined, will be more readily understood by referring to FIGS. 21 and 22. FIG. 21 consists of three separate views of a horn of the present invention. When the horn in an unexcited state (view A) is excited and the surface of the driven end moves away from the horn, as shown in view B, the other end also moves away from the horn and the radial surface moves inwardly toward the rotational axis or the interior of the horn. When the driven end moves inwardly toward the interior of the horn, as shown in view C, the radial surface moves outwardly away from the rotational axis. These movements will be described again in relation to FIGS. 27 and 29.

Similarly, FIG. 22 consists of three separate views of the Mecasonic horn. As with FIG. 21, views B and C show the movements of the end and radial surfaces relative to each other when the horn is excited. When the horn in an unexcited state (view A) is excited and the surface of the driven end moves away from the horn, as shown in view C, the radial surface moves away from the rotational axis. When the driven end moves inwardly toward the interior of the horn, the radial surface also moves inwardly toward the interior of the horn, or towards the rotational axis (view B). The arrow at one edge of the radial surface in views B and C shows that the radial surface also moves longitudinally in the same direction as the driven end. In fact, the entire horn moves longitudinally in the same direction as the driven end. These movements will be described again in relation to FIGS. 28 and 30.

In view of Tables 3 and 4, the following points may be noted, of which the first is by far the most significant:

(1) when subjected to longitudinal mechanical excitation at the resonant frequency, the 20 kHz horn of the present invention displayed radial displacement which acted symmetrically about the median plane of the horn, while that of the Mecasonic horn decreased significantly on either side of the radial antinode plane, and the radial displacement along the entire width of the radial surface of the horn of the present invention was out of phase with the longitudinal displacement, whereas the radial displacement along the width of the radial surface of the Mecasonic horn was in phase with the longitudinal displacement;

(2) the power requirement for the 20 kHz horn of the present invention was lower than that for the Mecasonic horn; and (3) the amplitude profile across the width of the radial surface of the 20 kHz horn of the present invention was more constant than that of the Mecasonic horn.

To more easily visualize point 3 above, the amplitude values obtained (see Tables 3 and 4) were plotted versus the distance of each point from the driven end of the horn, i.e., the end to which the boosters and driver assembly were attached. These plots are shown in FIG. 23, in which curve A is for the 20 kHz horn of the present invention (the horn of FIG. 16) and curve B is for the Mecasonic horn (the horn of FIG. 17).

Figure 23:
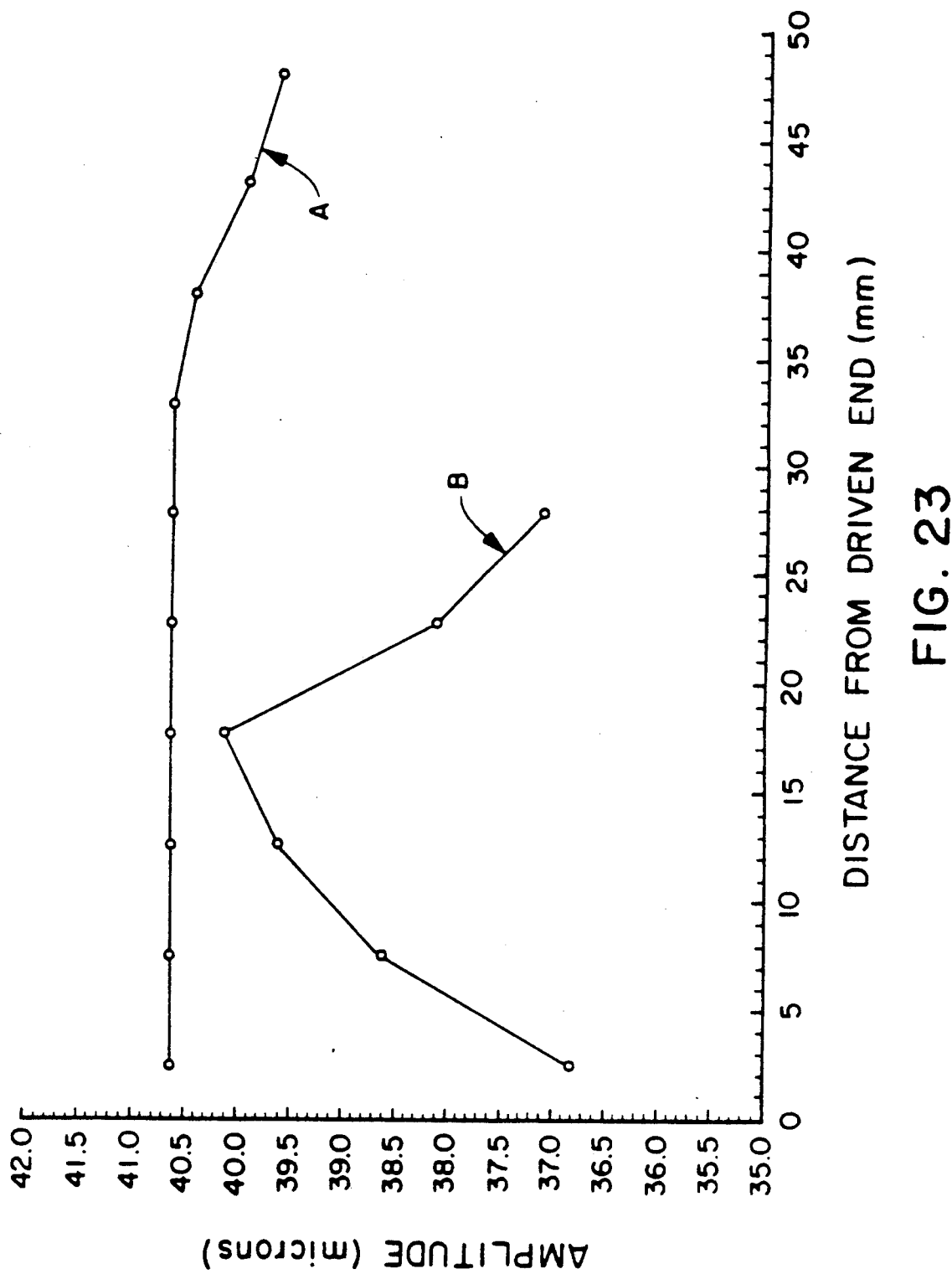
FIG. 23 consists of the plots of the radial amplitude profiles of the work-contacting surfaces of the ultrasonic rotary horns represented by FIGS. 16 and 17.

FIG. 23 dramatically demonstrates the difference in amplitude profile across the face of the radial surface between the two horns. The amplitude profile of the 20 kHz horn of the present invention is relatively flat across the width of the radial surface. That is, the lowest amplitude measured across the radial surface was never less than about 97 percent of the maximum amplitude measurement. The amplitude profile of the Mecasonic horn, on the other hand, shows a peak at about 28 mm from the driven end, with the amplitude decreasing significantly on either side of the peak, especially on the side farthest from the driven end. Based on the data in Tables 3 and 4, the percent variance values for the horn of the present invention of Example 1 and the Mecasonic horn are 2.5 and 8.2, respectively.

It may be noted from Tables 3 and 4 that the amplitude values for the Mecasonic horn generally were not significantly different from those for the 20 kHz horn of the present invention. However, the amplitudes observed with the Mecasonic horn were the result of a higher excitation power. The excitation power used with the Mecasonic horn actually was 1.49 times that used with the horn of the present invention. If the Mecasonic horn performed as well as the 20 kHz horn of the present invention, the amplitude values for the Mecasonic horn should have been 1.49 times the amplitude values for the horn of the present invention, i.e., around 1.75. Because the excitation power plays such a significant role in the amplitude values measured, efficiency values are more significant than amplitude values because the former are a function of both radial amplitude and excitation power.

In order to simplify the comparison of horns run at different power levels, a power-related gain term is used throughout this specification. The term, designated PRG, is equal to horn gain divided by excitation power. In order to avoid small decimal numbers, the quotient is multiplied by $10^3$. Thus, $$\text{PRG} = (\text{Horn Gain/Power}) \text{ watts}^{-1} \times 10^3$$

To illustrate the use of the term, PRG values have been calculated for both the 20 kHz horn of the present invention and the Mecasonic horn and are summarized in Table 5.

TABLE 5

| Summary of PRG Values | | | | | |
|---|---|---|---|---|---|
| Horn of Present Invention | | | Mecasonic Horn | | |
| Point | Gain | PRG[a] | Point | Gain | PRG[b] |
| 1 | — | — | 1 | — | — |
| 2 | 1.19 | 7.9 | 2 | 0.12 | 0.5 |
| 3 | 1.19 | 7.9 | 3 | 1.18 | 5.4 |
| 4 | 1.19 | 7.9 | 4 | 1.24 | 5.6 |
| 5 | 1.19 | 7.9 | 5 | 1.27 | 5.8 |

TABLE 5-continued

| Summary of PRG Values | | | | | |
|---|---|---|---|---|---|
| Horn of Present Invention | | | Mecasonic Horn | | |
| Point | Gain | PRG[a] | Point | Gain | PRG[b] |
| 6 | 1.19 | 7.9 | 6 | 1.29 | 5.9 |
| 7 | 1.19 | 7.9 | 7 | 1.22 | 5.5 |
| 8 | 1.19 | 7.9 | 8 | 1.19 | 5.4 |
| 9 | 1.19 | 7.9 | 9 | — | — |
| 10 | 1.17 | 7.8 | 10 | 1.51 | 6.7 |
| 11 | 1.16 | 7.7 | | | |

[a]Power-related gain, in watts$^{-1}$ × $10^3$, at 150 Watts excitation power.
[b]Power-related gain, in watts$^{-1}$ × $10^3$, at 220 watts excitation power.

From an inspection of Table 5 and the respective PRG values, it is more clearly evident that the 20 kHz horn of the present invention performs significantly better than the Mecasonic horn. Note that a horn gain of 1.19 with the 20 10 kHz horn of the present invention gives a PRG of 7.9 watts$^{-1}$×$10^3$, whereas the same gain value for the Mecasonic horn gives a PRG of only 5.4 watts$^{-1}$×$10^3$.

Further comparison of the performances of the two horns requires the compilation of some average values, as well as some additional information. In each case, the amplitude value at point 1 was taken as the input amplitude. An average radial amplitude, i.e., the average amplitude across the radial surface, was calculated from the amplitude values at points 2-11, inclusive, for the 20 kHz horn of the present invention and points 3-8, inclusive, for the Mecasonic horn. That is, the average radial amplitude was the quotient of the sum of amplitude values for each point across the radial surface divided by the number of points. The average horn gain in each case was the ratio of the average radial amplitude to the input amplitude. These average values, along with the average power and the width of the radial surface, average PRG value, and a calculated "performance factor" (PF) for each horn, are summarized in Table 6. The PF, a summary index of performance, is a convenient means for comparing the efficiency of rotary bonding horns. The PF, as employed herein, is defined as the average radial amplitude divided by the average electrical power consumed per unit radial surface width. Thus, the PF is the average radial amplitude divided by the power per unit radial surface width and will have the units, microns watts$^{-1}$ mm. It is equivalent to efficiency per unit radial surface width. It should be apparent that the larger the value of the PF, the greater the potential for a horn to bond greater thicknesses of materials over a larger area for the power consumed.

TABLE 6

| Summary of Average Values and Other Information | | |
|---|---|---|
| Item | Horn of the Present Invention | Mecasonic Horn |
| Input amplitude (microns) | 34.0 | 31.2 |
| Average radial amplitude (microns) | 40.4 | 38.4 |
| Average horn gain | 1.19 | 1.23 |
| Average power (watts) | 150 | 220 |
| Average PRG (watts$^{-1}$ × $10^3$) | 7.9 | 5.6 |
| Radial surface width (mm) | 50.8 | 29.8 |
| Performance factor (microns watts$^{-1}$ mm) | 13.7 | 5.2 |

As shown by Table 6, the 20 kHz rotary horn of the present invention had a PF of 13.7 microns watts$^{-1}$ mm, whereas the Mecasonic horn exhibited a PF of 5.2 microns watts$^{-1}$ mm. This represents a significant improvement in performance by the horn of the present invention over the Mecasonic horn, even though both horns had approximately equivalent horn gains. Such improvement also is shown by the average PRG values of 7.9 watts$^{-1} \times 10^3$ and 5.6 watts$^{-1} \times 10^3$ for the horn of the present invention and the Mecasonic horn, respectively.

EXAMPLE 2

Variation of Acoustical Performance with Changes in Horn Dimensions and Mass for Horns Similar to the Horn of Example 1

In order to determine how the acoustical performance of an ultrasonic rotary horn of the present invention varies with changes in horn dimensions and mass, seven horns patterned after the horn of FIG. 1, having different diameters and masses, but similar end configurations and constant widths at the radial surface and constant thicknesses at the center of the horn, were machined from aluminum; each horn had 50.80-mm diameter hubs having a height of 2.54 mm, each hub having a 12.7-mm diameter tapped hole in the center thereof. Two additional horns were made which had diameters the same as one of the seven horns, but different widths and thicknesses. The widths, diameters, and masses of these horns are given in Table 7.

TABLE 7

| | Horn Dimensions and Masses | | |
|---|---|---|---|
| Horn | Horn Width (mm) | Horn Diameter (mm) | Horn Mass (kg) |
| A | 50.80 | 187.96 | 3.970 |
| B | 50.80 | 182.88 | 3.770 |
| C | 50.80 | 177.80 | 3.564 |
| D | 50.80 | 172.72 | 3.369 |
| E | 50.80 | 165.10 | 3.073 |
| F | 50.80 | 158.75 | 2.836 |
| G | 50.80 | 152.40 | 2.629 |
| H | 44.45 | 177.80 | 3.118 |
| J | 38.10 | 177.80 | 2.680 |

The acoustical properties of the horns were measured as already described. The results of these measurements are shown as FIGS. 24 and 25.

Figure 24:
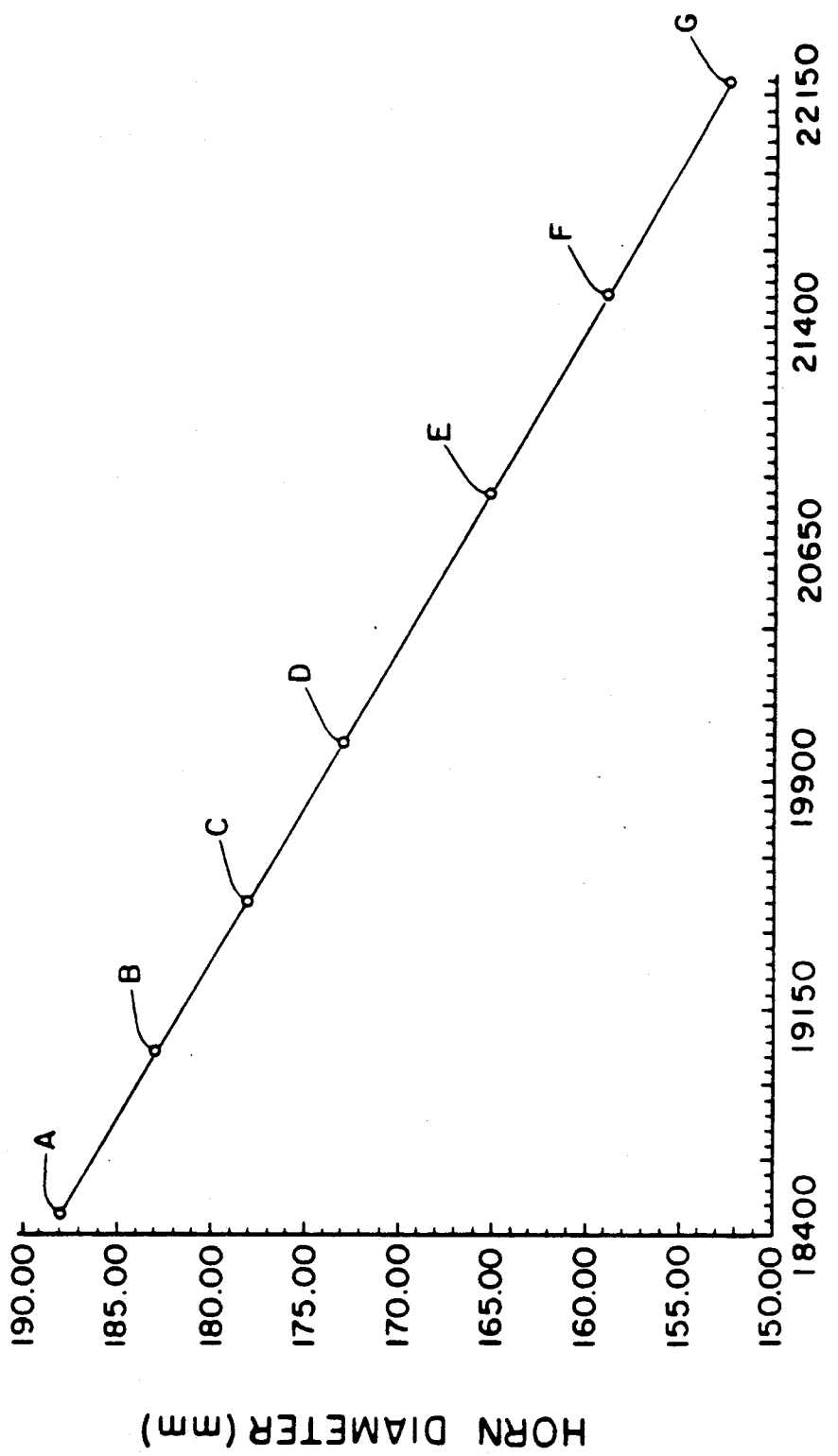
FIG. 24 is a plot of the gravest mode resonant frequency of a 20 kHz ultrasonic rotary horn of the present invention versus the diameter of the horn and illustrates the parametric dependence of frequency upon horn diameter.

FIG. 24 is a plot of resonant frequency versus horn diameter in mm for seven horns having a constant width at the radial surface of 50.80 mm and varying diameters.

Figure 25:
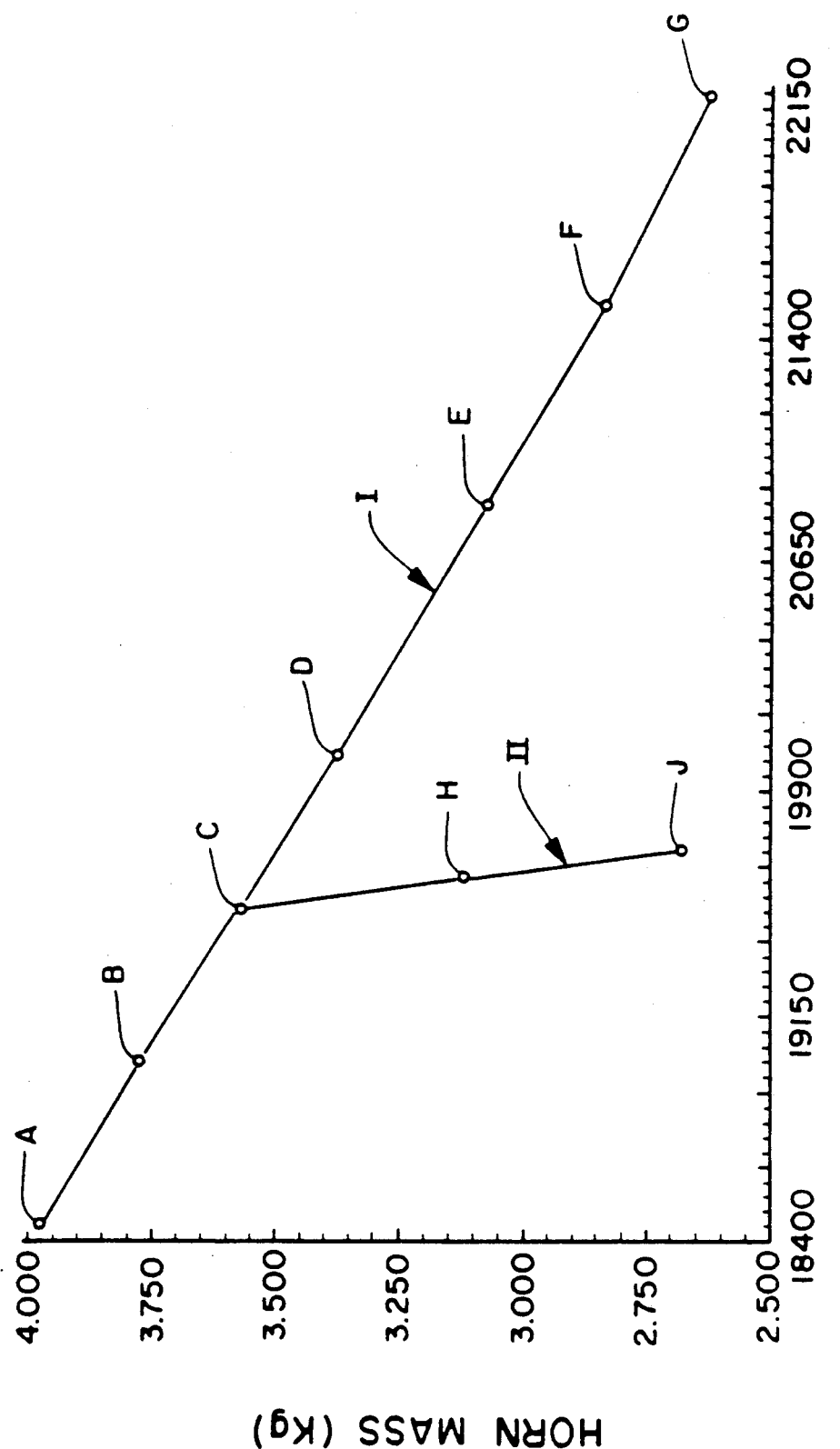
FIG. 25 is a plot similar to that of FIG. 24, except that the variables are resonant frequency and horn mass; the figure illustrates the relative effect on frequency when varying mass by changing either horn diameter or horn width.

FIG. 25 consists of two plots. The first, curve I, is a plot of resonant frequency versus horn mass in kg for seven horns having a constant width at the radial surface of 50.80 mm and varying diameters. These seven horns are the same horns which were used to obtain the data for FIG. 24; in this case, it was only necessary to determine the mass of each horn and plot the resonant frequency values versus mass instead of horn diameter. The second curve of FIG. 25 (curve II) is a plot of resonant frequency versus horn mass at a constant horn diameter and varying widths at the radial surface.

From FIG. 24, it is seen that the resonant frequency is inversely proportional to horn diameter. Such frequency also is inversely proportional to horn mass, as shown by FIG. 25. However, the frequency is much more sensitive to changes in horn diameter than to changes in either horn mass, which were accomplished at a constant diameter by varying horn thicknesses, or in horn width.

EXAMPLE 3

Determination of the Mode Shapes of the Horns of Example 1

From the discussion thus far, it is evident that the horn of the present invention functions in a manner which is different from that of the Mecasonic horn. In order to more fully understand the operating characteristics of the two horns, their mode shapes were determined experimentally.

Figure 26:
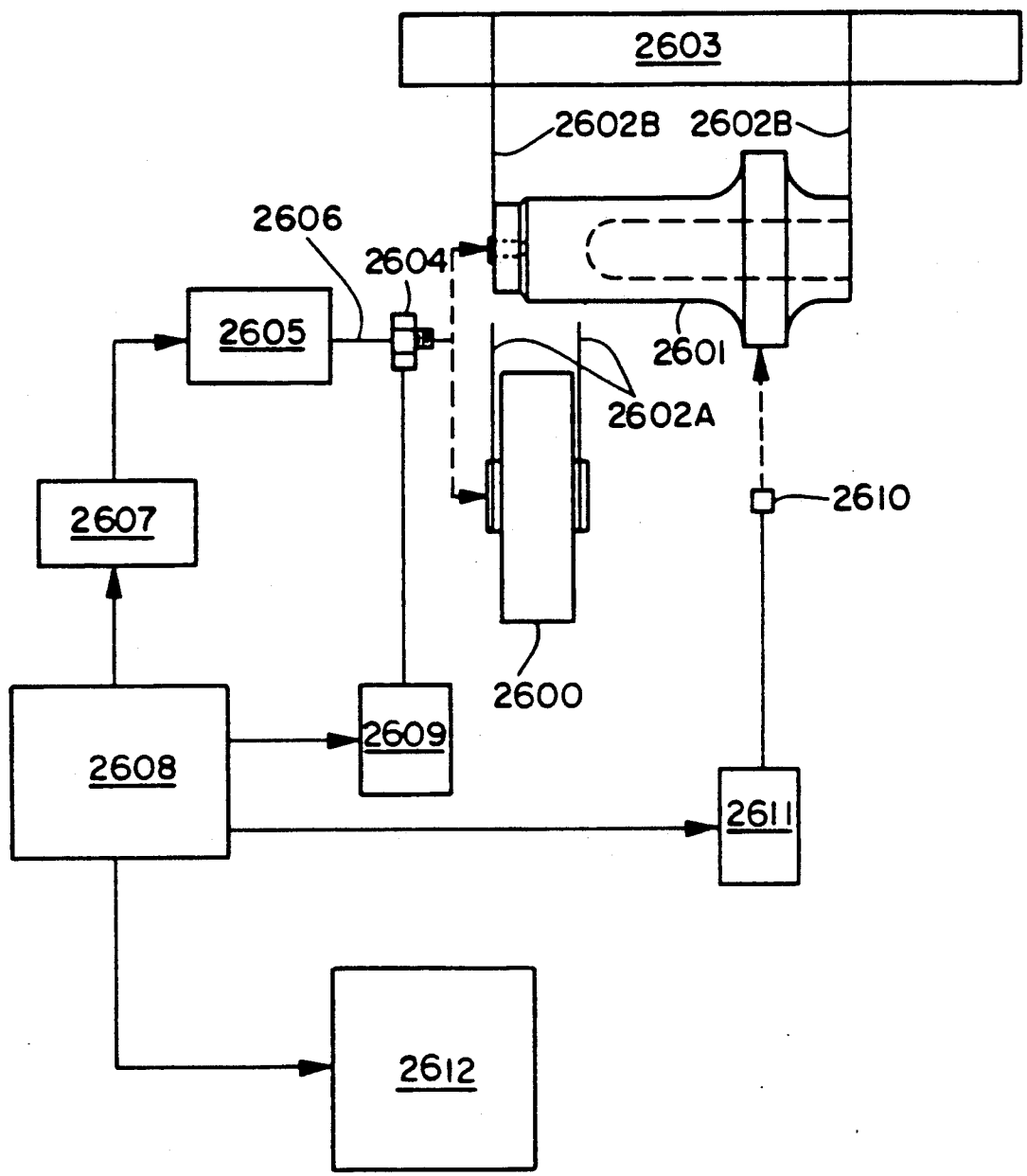
FIG. 26 is a diagrammatic representation of the experimental set-up and equipment required to determine the mode shapes of the horns of FIGS. 16 and 17.

In order to carry out the modal analysis, the experimental set-up illustrated by FIG. 26 was employed. Depending upon the horn to be tested, the 20 kHz horn of the present invention 2600, or the Mecasonic horn 2601, was suspended by wires 2602A or wires 2602B, respectively, from support 2603. The equipment consisted of a Bruel and Kjaer Modal Analysis System (Bruel and Kjaer Instruments, Inc., Hoffman Estates, Ill.) in conjunction with a Hewlett-Packard HP9000-217 computer (Hewlett-Packard Company, Ft. Collins, Colo.). Specifically, Bruel and Kjaer Type 8200 Force Transducer 2604 was bolted to the horn under test at the input face. Force Transducer 2604 was connected to Bruel and Kjaer Type 4809 Vibration Exciter 2605 by means of 7.6-cm long, 3.2-mm diameter nylon rod 2606. Vibration Exciter 2605 was driven by Bruel and Kjaer Type 2606 Power Amplifier 2607 which in turn received its signal from Bruel and Kjaer Type 2032 Dual Channel Signal Analyzer 2608. Force Transducer 2604 also was connected to a first Bruel and Kjaer Type 2635 Charge Amplifier 2609 which in turn was connected to Signal Analyzer 2608. Just as the Force Transducer 2604 measured the frequency and force amplitude of the excitation energy being applied to the horn, the output acceleration amplitude and frequency at the radial surface of the horn were measured by Bruel and Kjaer Type 4374 Accelerometer 2610 which was connected to a second Bruel and Kjaer Type 2635 Charge Amplifier 2611. Finally, Signal Analyzer 2608 was connected to the Hewlett-Packard computer 2612.

Figure 27:
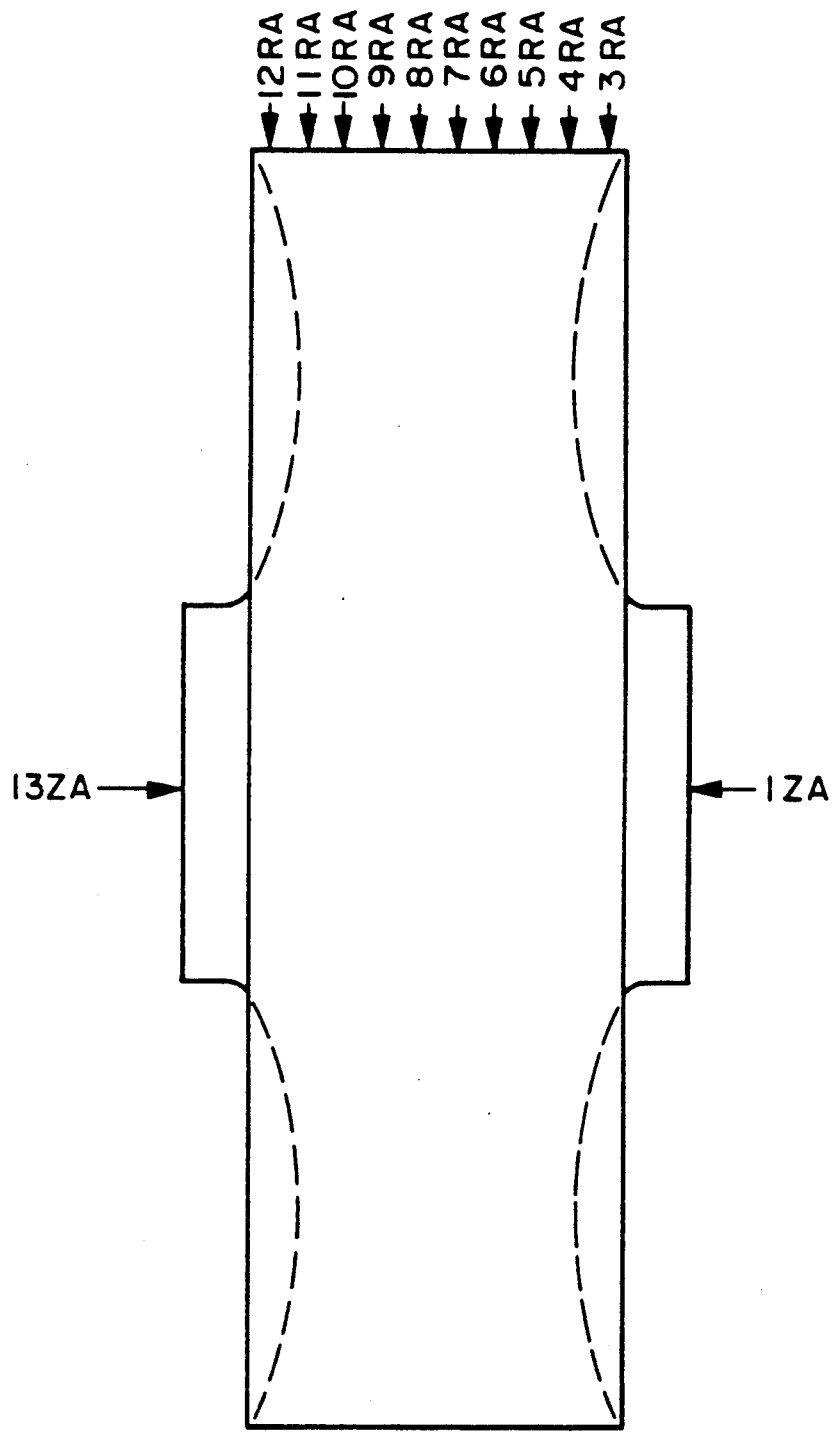
FIGS. 27 and 28 illustrate the points at which measurements were taken to determine the mode shapes of the horns represented by FIGS. 16 and 17, respectively.
Figure 28:
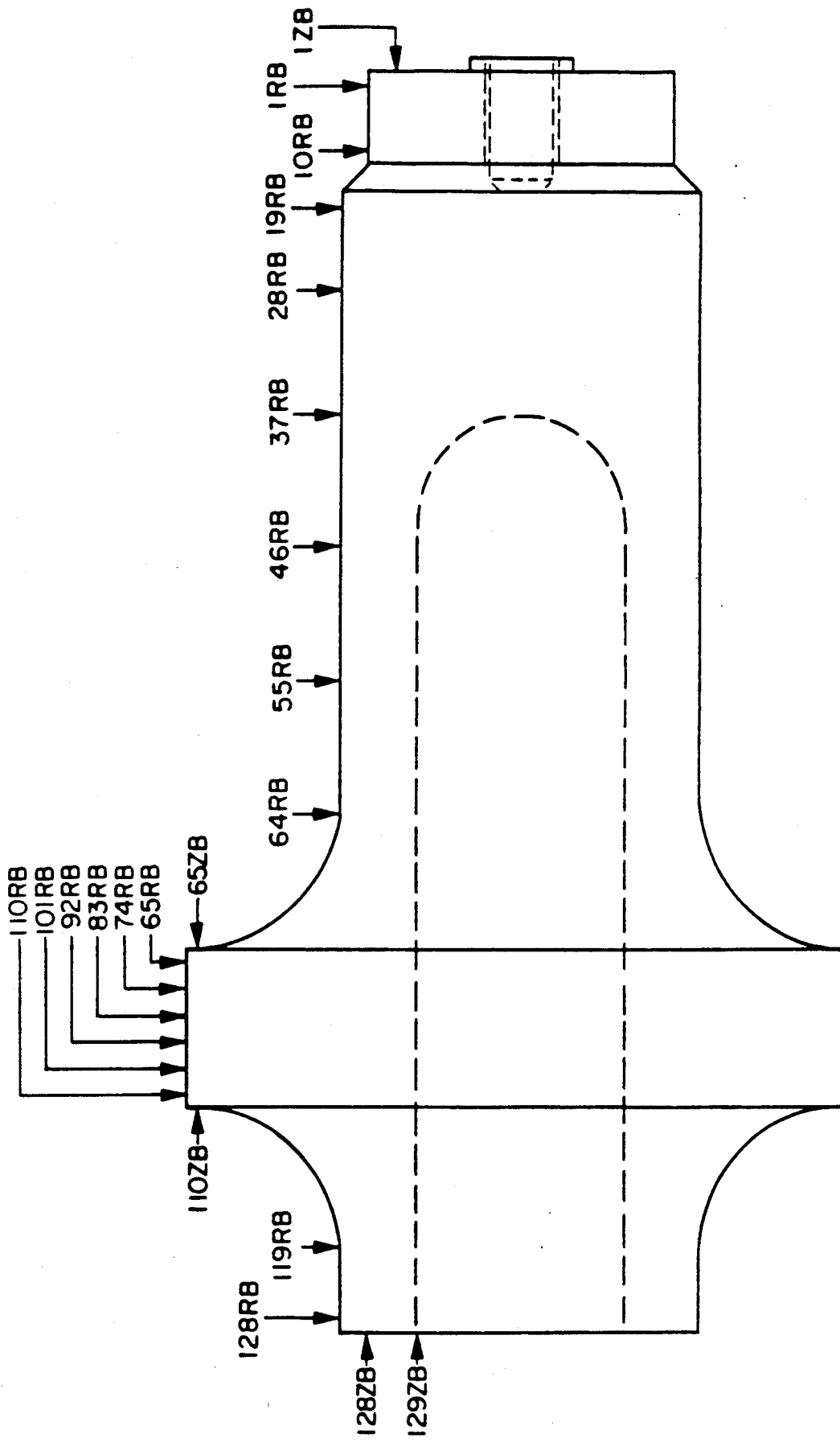

Referring now to FIGS. 27 and 28, the Accelerometer 2610 was placed on the horn at the input. The input is represented by point 1ZA in FIG. 27 for the 20 kHz horn of the present invention and point 1ZB in FIG. 28 for the Mecasonic horn. A measurement was taken at that point for each horn while exciting the horn with random noise. Subsequent measurements then were taken at the other points indicated in FIGS. 27 and 28 for the horn of the present invention and the Mecasonic horn, respectively. As measurements were taken, the data obtained were transferred to Hewlett-Packard computer 2612 which, upon completion of the measurement process, was used to calculate and illustrate the mode shapes of the two horns.

Figure 29:
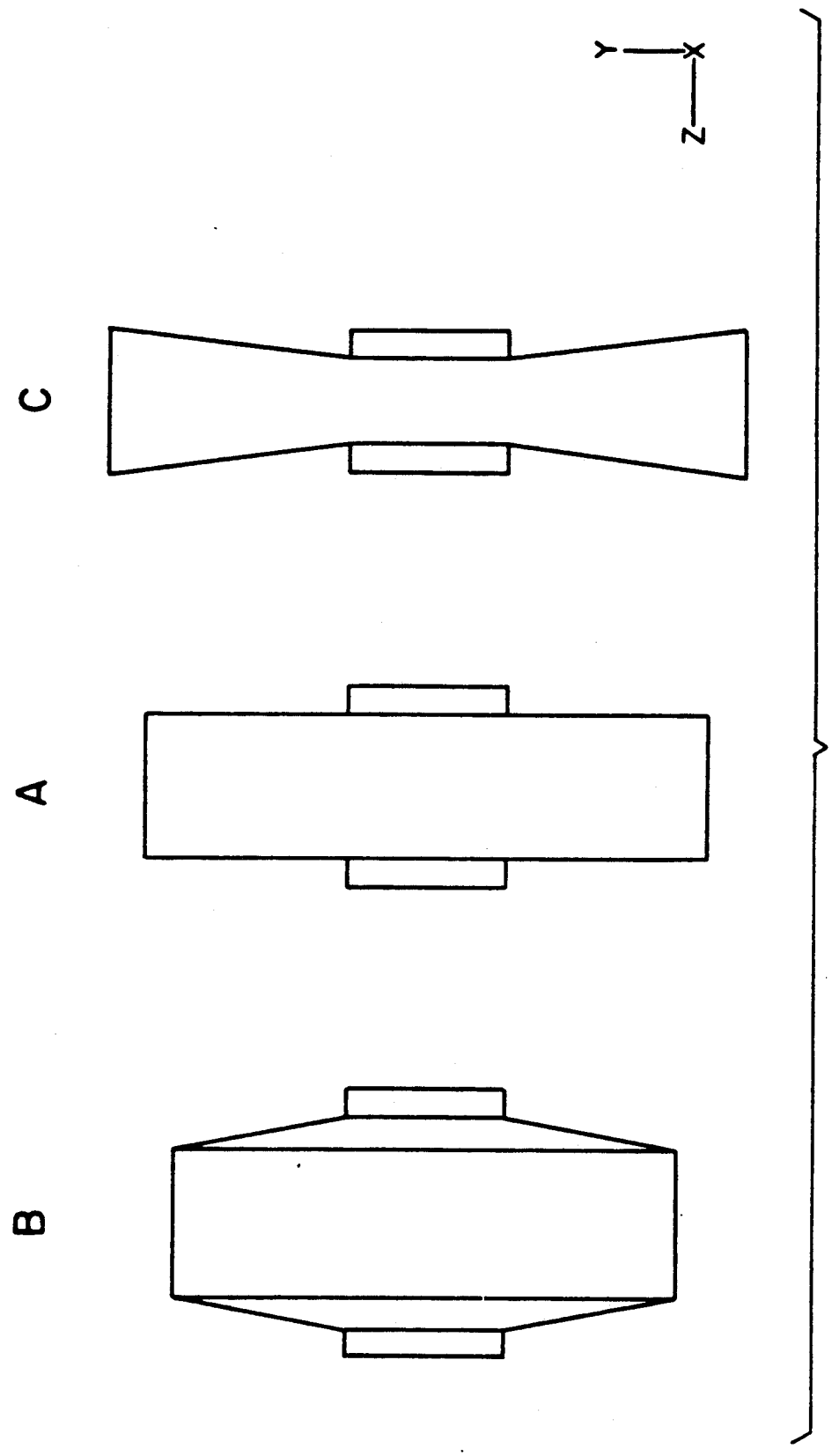
FIG. 29 is a two-dimensional, diagrammatic representation of the mode shape of a horn of the present invention, i.e., the horn represented by FIG. 16.
Figure 30:
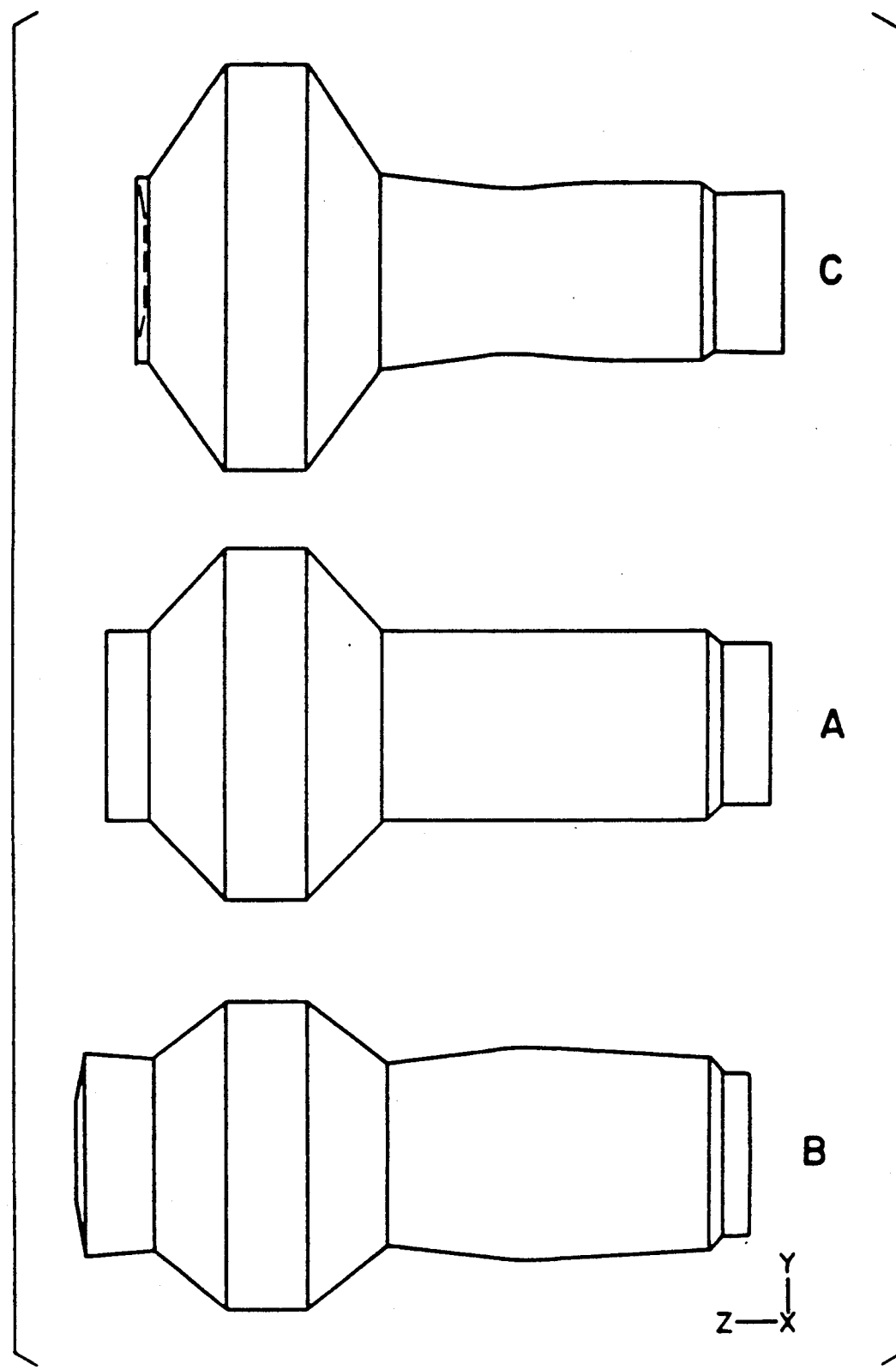
FIG. 30 is a two-dimensional, diagrammatic representation of the mode shape of a commercially available horn, i.e., the horn represented by FIG. 17.

The mode shapes of the 20 kHz horn of the present invention and the Mecasonic horn are illustrated by FIGS. 29 and 30, respectively. In each Figure, view A represents the undeformed or unexcited horn. Views B and C represent the deformed horn where the radial amplitude at the radial surface is at a minimum and a maximum, respectively. Under the influence of longitudinal excitation, the horn of the present invention expands and contracts in concertina or accordion fashion, with the ends moving away from and toward each other along the longitudinal or rotational axis. As the ends move away from each other, the diameter of the horn at the radial surface contracts. As the ends move toward each other, the diameter of the horn at the radial surface expands. Recalling FIG. 21, it will be noted that the motions of both the other end and the radial surface are out of phase with respect to the motion of the driven end. The practical consequence of such motions is a more uniform amplitude across the radial surface.

The Mecasonic horn, however, behaves very differently under the influence of longitudinal excitation. From FIGS. 22 and 30, it is seen that the motions of both the other end and the radial surface are in phase with respect to the motion of the driven end. As already noted, the radial amplitude decreases significantly on either side of the antinodal plane.

In viewing FIGS. 29 and 30, however, it should be kept in mind that the representations are not exact because of the limited number of points at which measurements were made. In addition, a straight-line relationship was assumed to exist between adjacent points, an assumption which may or may not be correct. While the figures are of value, no attempt should be made to interpret them as being precise representations of complete horn geometry.

EXAMPLE 4

Relationship Between Horn Thickness and Gain for Horns Similar to the Horn of Example 2

Experiments then were carried out to determine the relationship between horn thickness and gain with 20 kHz horns of the present invention patterned after the horn of Example 2. Such experiments utilized the set-up and equipment depicted by FIG. 18 for the horn of the present invention, except that horn analyzer 1107 was not required. Nine horns similar to those already described were prepared from solid aluminum (these horns had dimensions and masses different from the horns used in conjunction with FIGS. 24 and 25, i.e., the horns of Example 2). The horns had thicknesses which varied from 38.10 to 95.25 mm. The horns were excited essentially as described above, except that the second probe 1109 was placed approximately in the center of the radial surface. The diameter of each horn was selected so that the horn would vibrate at about 20 kHz. Horn dimensions are summarized in Table 8, while the data obtained are summarized in Tables 9 and 10. With respect to both Tables 7 and 8, it should be noted that horn width is the width of the horn at the radial surface and horn diameter is the diameter of the radial surface.

TABLE 8

Summary of Dimensions of 20 kHz Horns of the Present Invention for Gain Experiments

| Horn | Horn Width (mm) | Horn Diameter (mm) | Horn Mass (kg) |
|---|---|---|---|
| A | 38.12 | 175.36 | 2.606 |
| B | 44.45 | 174.40 | 2.998 |
| C | 45.67 | 173.94 | 3.063 |
| D | 50.77 | 173.25 | 3.376 |
| E | 63.47 | 169.54 | 4.041 |
| F | 76.20 | 164.06 | 4.530 |
| G | 82.55 | 159.97 | 4.666 |
| H | 88.87 | 154.33 | 4.677 |
| J | 95.25 | 148.34 | 4.630 |

TABLE 9

Summary of Amplitude Data from Gain Experiments with 20 kHz Horns of the Present Invention[a]

| Horn | Radial Amplitude | Long. Amplitude | Ave. Horn Gain[b] | Ave. PRG[c] |
|---|---|---|---|---|
| A | 35 | 14 | 2.5 | 10 |
| B | 30 | 15 | 2.0 | 10 |
| C | 30 | 15 | 2.0 | 10 |
| D | 30 | 18 | 1.7 | 10 |
| E | 22 | 17 | 1.3 | 14 |
| F | 18 | 18 | 1.0 | 13 |
| G | 16 | 18 | 0.9 | 13 |
| H | 14 | 17 | 0.8 | 14 |
| J | 14 | 19 | 0.7 | 12 |

[a]Amplitude values are given in microns, while the gain values are dimensionless.
[b]The ratio of radial amplitude to longitudinal amplitude.
[c]Power-related gain, in watts$^{-1}$ × $10^3$.

TABLE 10

Summary of Remaining Data from Gain Experiments with 20 kHz Horns of the Present Invention

| Horn | Power (watts) | Frequency (Hz) | Efficiency[a] |
|---|---|---|---|
| A | 240 | 20,033 | 0.14 |
| B | 200 | 20,060 | 0.15 |
| C | 195 | 20,048 | 0.16 |
| D | 170 | 20,021 | 0.18 |
| E | 95 | 20,063 | 0.23 |
| F | 75 | 20,044 | 0.24 |
| G | 70 | 20,052 | 0.23 |
| H | 60 | 20,072 | 0.24 |
| J | 60 | 20,024 | 0.24 |

[a]In microns of radial amplitude per watt.

Figure 31:
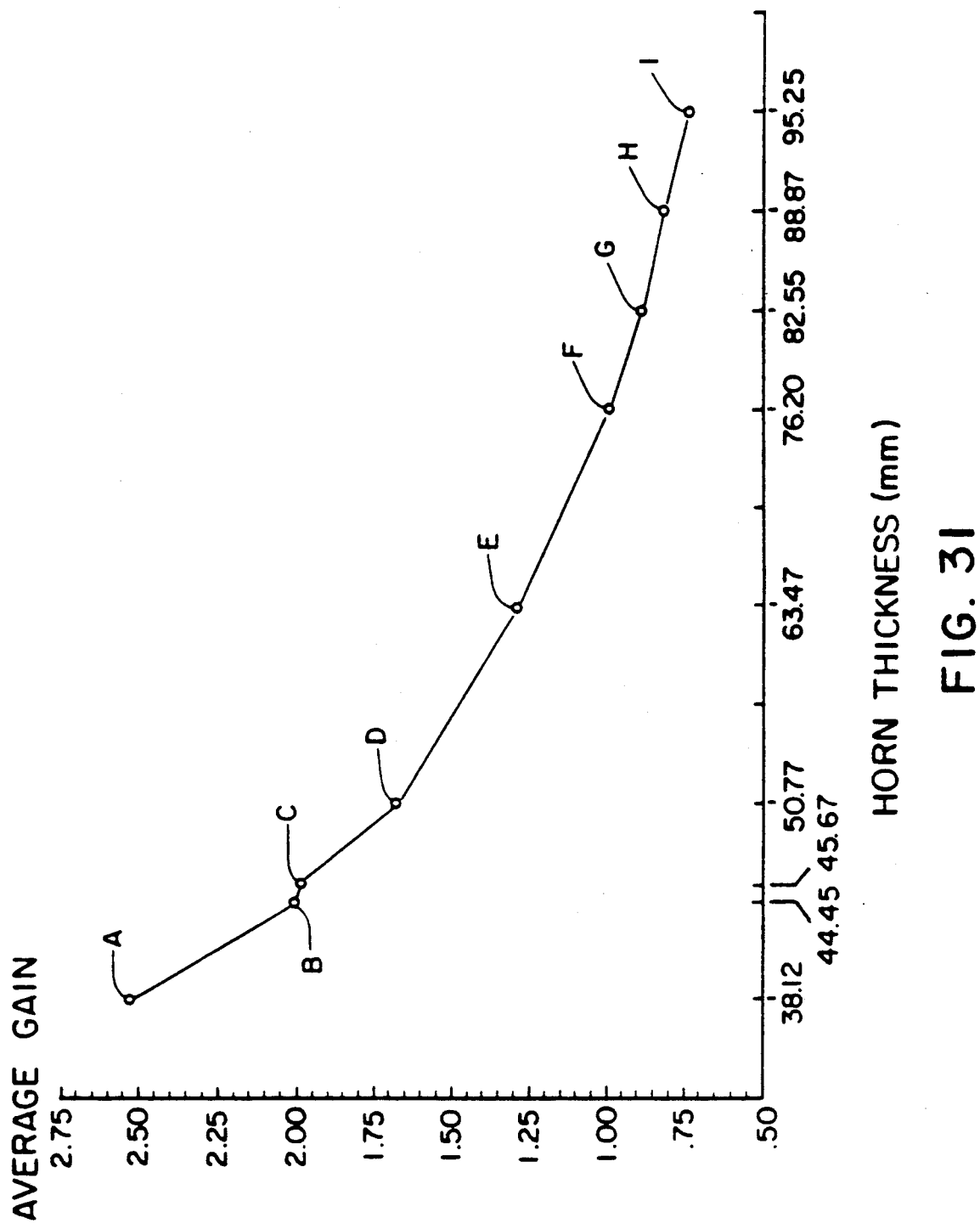
FIG. 31 is a plot of the average gain versus horn width for a series of horns similar to that of FIG. 16, i.e., horns of the present invention.

The horn gain values from Table 9 were plotted versus the horn width values from Table 8 as shown in FIG. 31. From FIG. 31 and the data in Tables 9 and 10, it is evident that horn gain varies inversely with horn width. Additionally, until horn width exceeds about 76 mm, the horn gain is equal to or greater than unity for horns of this configuration. On the other hand, horn efficiency, defined as radial amplitude microns per watt, increases with increasing horn width.

EXAMPLE 5

Evaluation of a 20 kHz Horn Having a Centrally Located Raised Land

Performance data also were obtained for a 20 kHz ultrasonic rotary horn of the type illustrated by FIG. 10, i.e., a horn having a centrally located raised land on the work-contacting radial surface, except that the horn did not have an integral elongated waveguide. Again, the horn was machined from a solid piece of titanium. The actual horn dimensions are given in Table 11 with reference to FIG. 32 which is an end view representation of the horn. The curved portions of the ends had a second order profile; the second order equation employed was the same as was used for the ends of the horn of FIG. 16. The mass of the horn was 4.574 kg, including a threaded integral stud (not shown in FIG. 32) having a diameter of 0.75 inch (19.05 mm), a length of 0.5 inch (12.70 mm), and 20 threads per inch (25.4 mm), National Extra Fine.

TABLE 11

Figure 34:
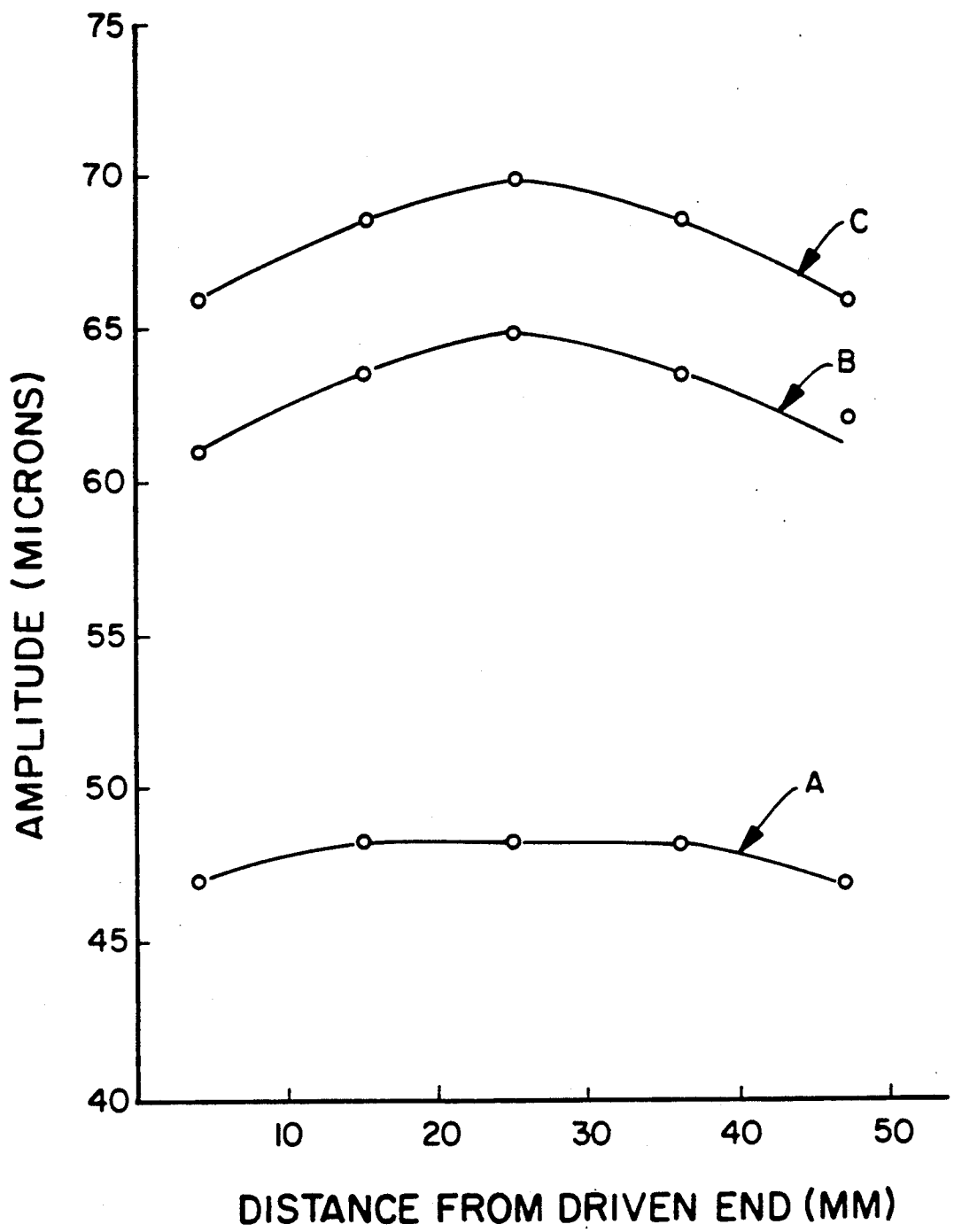
FIG. 34 consists of the plots of the radial amplitude profile of the work-contacting surface of the ultrasonic rotary horn represented by FIG. 32 at each of three separate booster combinations.

| Dimensions of the 20 kHz Horn of FIG. 34 | |
|---|---|
| Dimension | Value (mm) |
| 340 | 187.96 |
| 341 | 50.80 |
| 342 | 50.80 |

TABLE 11-continued

| Dimensions of the 20 kHz Horn of FIG. 34 | |
|---|---|
| Dimension | Value (mm) |
| 343 | 22.22 |
| 344 | 6.35 |
| 345 | 6.35 |
| 346 | 7.62 |
| 347 | 5.08 |
| 348 | 2.54 |
| 349 | 6.35 |

Figure 32:
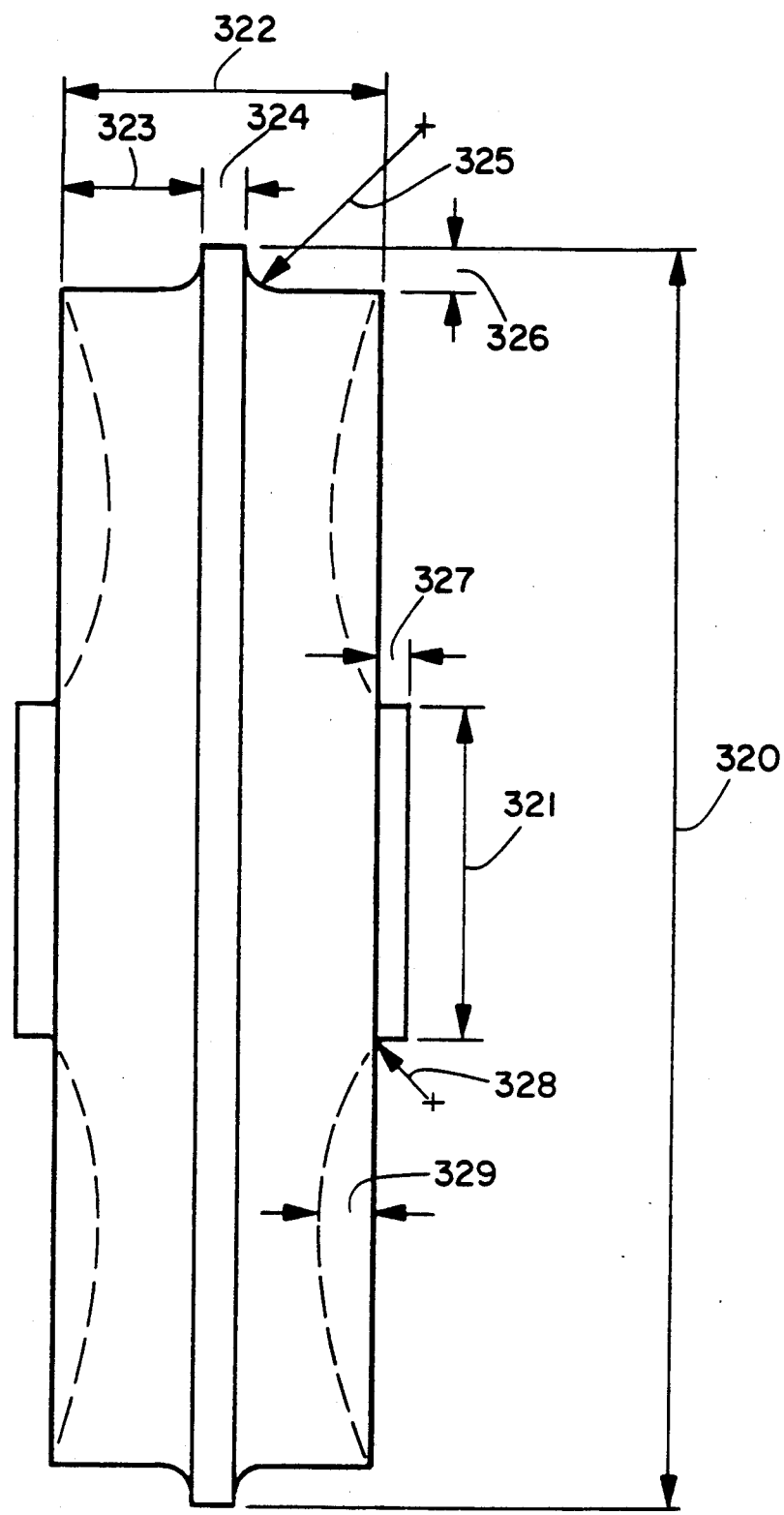
FIG. 32 is a diagrammatic representation of an ultrasonic rotary horn similar to that of FIG. 10 and illustrates the dimensional parameters of the horn.
Figure 33:
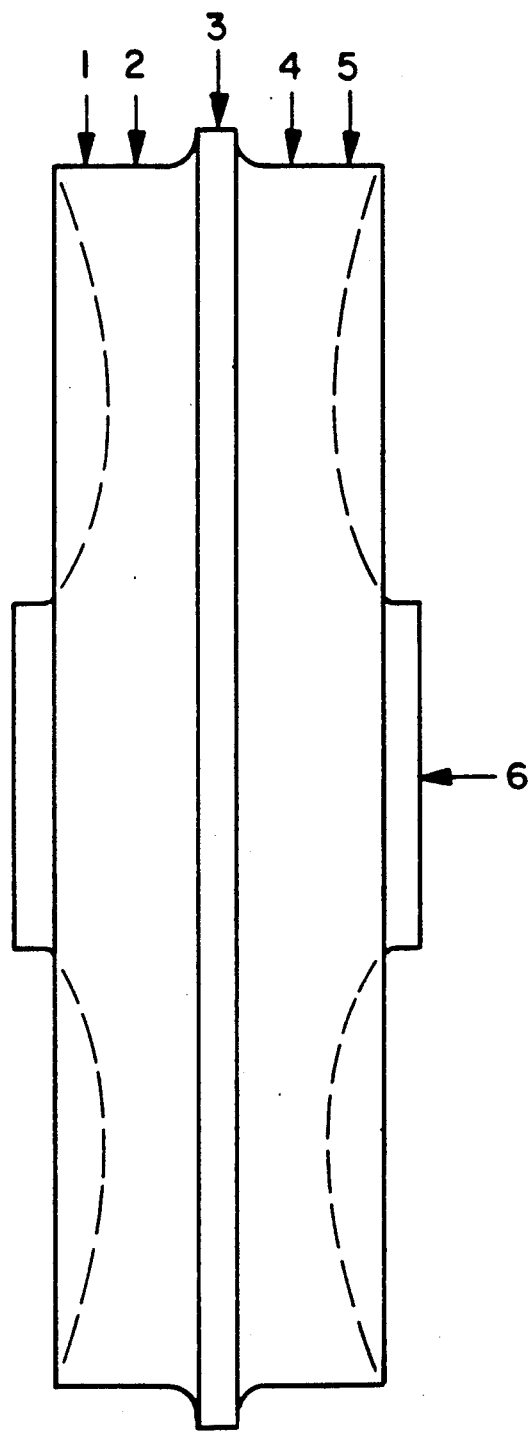
FIG. 33 illustrates the points at which measurements were taken to determine the acoustical and mechanical properties of the horn represented by FIG. 32.

The measurements described in relation to FIG. 18 were repeated with the horn of FIG. 32. Briefly, the driver assembly, boosters, and horn were configured as shown in FIG. 18. The system was excited by means of the horn analyzer to determine the resonant frequency of the system. The generator then was activated and the system excited for one minute to allow the system to stabilize. After the stabilization period, one displacement measuring probe was placed at the excitation input to the horn and the other probe was placed at appropriate consecutive points, primarily along the radial surface of the horn. The locations of the displacement measuring probes are shown diagrammatically in FIG. 33. Point 6 represents the point of excitation input. With the generator on, the amplitude level, power consumption, and frequency were recorded at each of points 1-5, inclusive (FIG. 33). Each of points 1 and 5 was located approximately 4 mm from the nearest edge of the radial surface. In addition, each point on the radial surface of the horn was about 7-8 mm from adjacent points. Point 3 was in the center of the raised land. Data were obtained with three different combinations of first and second boosters in order to give three different total booster gain values, as shown in Table 12. The data for the ,three combinations of boosters are summarized in Tables 13-15, respectively.

TABLE 12

| Summary of Booster Combinations with the 20 kHz Horn of FIG. 32 | | | |
|---|---|---|---|
| Combination | Total Gain | Power (watts) | Frequency (Hz) |
| 1 | 2.0 | 160 | 19,974 |
| 2 | 2.5 | 215 | 19,969 |
| 3 | 3.0 | 260 | 19,965 |

TABLE 13

| Summary of Data for the First Booster Combination with the 20 kHz Horn of FIG. 32 | | | | |
|---|---|---|---|---|
| Point | Amplitude (microns) | Horn Gain$^a$ | PRG$^b$ | Effic.$^c$ |
| 1 | 47.0 | 1.48 | 9.2 | 0.29 |
| 2 | 48.3 | 1.52 | 9.5 | 0.30 |
| 3 | 48.3 | 1.52 | 9.5 | 0.30 |
| 4 | 48.3 | 1.52 | 9.5 | 0.30 |
| 5 | 47.0 | 1.48 | 9.2 | 0.29 |
| 6 | 31.8 | — | — | — |

$^a$The ratio of radial amplitude to longitudinal amplitude, the latter being represented by the amplitude value of point 6.
$^b$Power-related gain, in watts$^{-1} \times 10^3$.
$^c$In microns per watt.

TABLE 14

| Summary of Data for the Second Booster Combination with the 20 kHz Horn of FIG. 32 | | | | |
|---|---|---|---|---|
| Point | Amplitude (microns) | Horn Gain$^a$ | PRG$^b$ | Effic.$^c$ |
| 1 | 61.0 | 1.50 | 7.0 | 0.28 |

TABLE 14-continued

| Summary of Data for the Second Booster Combination with the 20 kHz Horn of FIG. 32 | | | | |
|---|---|---|---|---|
| Point | Amplitude (microns) | Horn Gain$^a$ | PRG$^b$ | Effic.$^c$ |
| 2 | 63.5 | 1.56 | 7.3 | 0.30 |
| 3 | 64.8 | 1.60 | 7.4 | 0.30 |
| 4 | 63.5 | 1.56 | 7.3 | 0.30 |
| 5 | 62.2 | 1.53 | 7.1 | 0.29 |
| 6 | 40.6 | — | — | — |

$^a$The ratio of radial amplitude to longitudinal amplitude, the latter being represented by the amplitude value of point 6.
$^b$Power-related gain, in watts$^{-1} \times 10^3$.
$^c$In microns per watt.

TABLE 15

| Summary of Data for the Third Booster Combination with the 20 kHz Horn of FIG. 32 | | | | |
|---|---|---|---|---|
| Point | Amplitude (microns) | Horn Gain$^a$ | PRG$^b$ | Effic.$^c$ |
| 1 | 66.0 | 1.53 | 5.9 | 0.25 |
| 2 | 68.6 | 1.59 | 6.1 | 0.26 |
| 3 | 69.8 | 1.60 | 6.2 | 0.27 |
| 4 | 68.6 | 1.59 | 6.1 | 0.26 |
| 5 | 66.0 | 1.53 | 5.9 | 0.25 |
| 6 | 43.2 | — | — | — |

$^a$The ratio of radial amplitude to longitudinal amplitude, the latter being represented by the amplitude value of point 6.
$^b$Power-related gain, in watts$^{-1} \times 10^3$.
$^c$In microns per watt.

As the data in Tables 13-15, inclusive, demonstrate, the amplitude profile across the face of the radial surface is not flat. The amplitude profile plateaus in the central portion of the radial surface at the lowest power rating, but peaks at the center of the radial surface at the two highest power ratings. For convenience, the amplitude values obtained at each power rating were plotted versus the distance of each point from the driven end of the horn. These plots are shown in FIG. 34, in which curves A, B, and C represent the amplitude profiles at power ratings of 160, 215, and 260 watts, respectively (i.e., booster combinations 1-3).

EXAMPLE 6

Evaluation of a 20 kHz Horn Having a Raised Land at the Opposing End

The measurements just described were repeated with a 20 kHz ultrasonic rotary horn of the type illustrated by FIG. 11, i.e., a horn having a raised land at the opposing end. The horn and the integral elongated waveguide were machined from a solid piece of titanium. The actual horn dimensions are given in Table 16 with reference to FIG. 35 which is an end view representation of the horn (the integral waveguide is not shown). The curved portions of the ends had a second order profile; the second order equation employed was the same as was used for the ends of the horn of FIG. 16 (again, for convenience, the concave portions of the ends in the drawings have circular profiles).

TABLE 16

Figure 35:
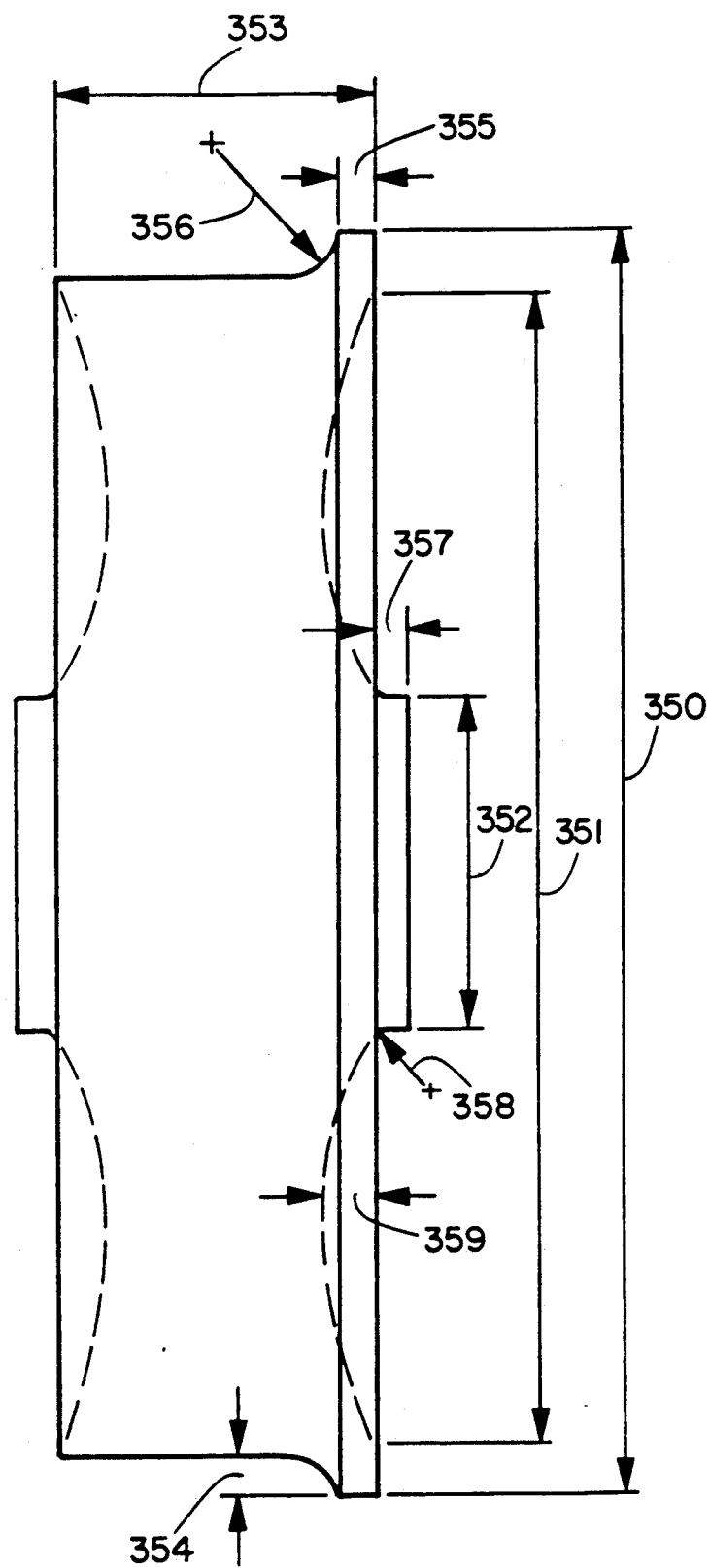
FIG. 35 is a diagrammatic representation of an ultrasonic rotary horn similar to that of FIG. 11 and illustrates the dimensional parameters of the horn.

| Dimensions of the 20 kHz Horn of FIG. 35 | |
|---|---|
| Dimension | Value (mm) |
| 370 | 189.23 |
| 371 | 172.72 |
| 372 | 50.80 |
| 373 | 50.80 |
| 374 | 7.62 |
| 375 | 6.35 |
| 376 | 6.35 |

TABLE 16-continued

| Dimensions of the 20 kHz Horn of FIG. 35 | |
|---|---|
| Dimension | Value (mm) |
| 377 | 5.08 |
| 378 | 2.54 |
| 379 | 6.35 |

Figure 36:
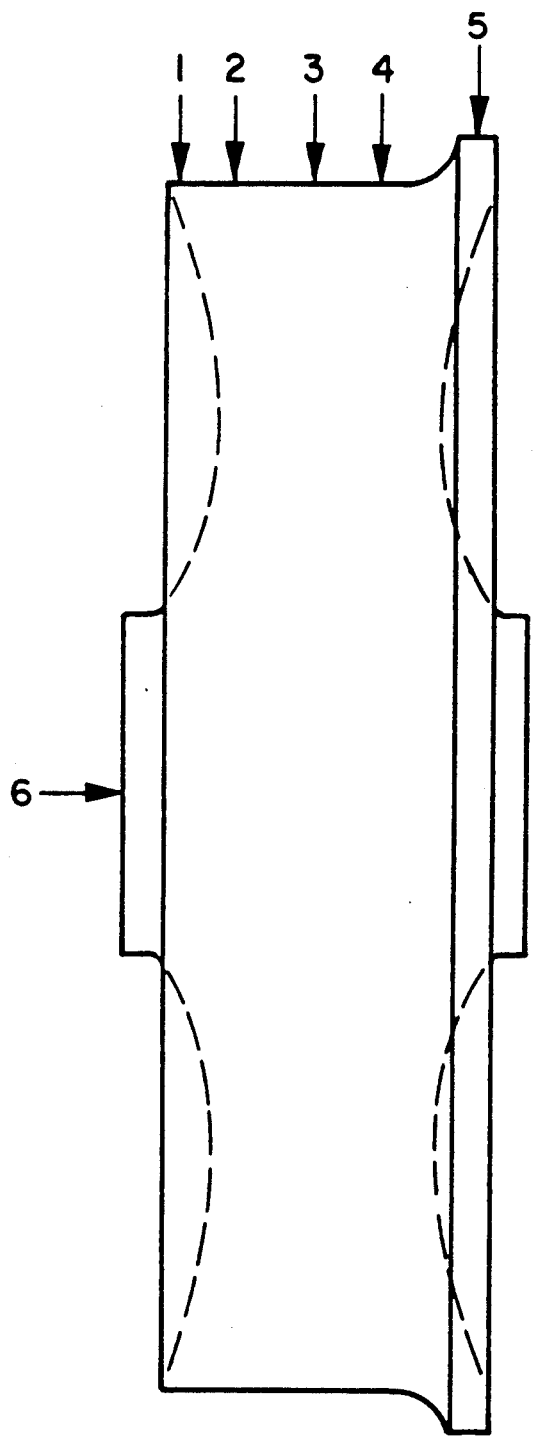
FIG. 36 illustrates the points at which measurements were taken to determine the acoustical and mechanical properties of the horn represented by FIG. 35.

The measurements described in relation to FIG. 18 were repeated with the 20 kHz horn of FIG. 35, following the procedure just described for the horn of FIG. 32. In the present case, the horn had an integral elongated waveguide having a gain of 2.5:1, equivalent to the booster represented by 1802 of FIG. 18, and only one booster combination was employed. The drive booster (1801 of FIG. 18) was a DuKane 1.5:1 booster. Thus, the total gain of the system was 3.75. The locations of the measurement points are shown diagrammatically in FIG. 36; actual locations of the points are given in Table 17. Point 6 represents the point of excitation input. With the generator on, the amplitude level, power consumption, and frequency were recorded at each of points 1-5, inclusive (FIG. 36). The data obtained are summarized in Tables 18 and 19.

TABLE 17

| Distances of Measurement Points from the Driven End | |
|---|---|
| Point | (Distance from Driven End (mm)) |
| 1 | 4 |
| 2 | 14 |
| 3 | 24 |
| 4 | 34 |
| 5 | 48 |

TABLE 18

| Summary of Data for the 20 kHz Horn of FIG. 35 | | |
|---|---|---|
| Point | Power (watts) | Frequency (Hz) |
| 1 | 855 | 19,980 |
| 2 | 855 | 19,963 |
| 3 | 855 | 19,964 |
| 4 | 855 | 19,965 |
| 5 | 855 | 19,959 |

TABLE 19

| Summary of Data for the 20 kHz Horn of FIG. 35 (Cont'd.) | | | | |
|---|---|---|---|---|
| Point | Amplitude (microns) | Horn Gain$^a$ | PRG$^b$ | Effic.$^c$ |
| 1 | 119 | 1.17 | 1.4 | 0.14 |
| 2 | 122 | 1.20 | 1.4 | 0.14 |
| 3 | 124 | 1.22 | 1.4 | 0.15 |
| 4 | 127 | 1.25 | 1.5 | 0.15 |
| 5 | 152 | 1.49 | 1.7 | 0.18 |
| 6 | 102 | — | — | — |

$^a$The ratio of radial amplitude to longitudinal amplitude, the latter being represented by the amplitude value of point 6.
$^b$Power-related gain, in watts$^{-1}$ × 10$^3$.
$^c$In microns per watt.

EXAMPLE 7

Evaluation of a 40 kHz Horn Similar to the Horn of Example 1

As noted from the foregoing description, all of the horns described thus far were designed to operate at a nominal frequency of 20 kHz. Accordingly, a smaller version of the horn of FIG. 16 was designed which would operate at a frequency of about 40 kHz; the horn was machined from titanium. The dimensions in mm of this horn are shown in Table 20 with reference to FIG. 16. In addition, the concave portions of the ends of the 40 kHz horn had a second order profile which is not shown in FIG. 16, the coefficients a and b having the values 0.2678 and −0.0644, respectively (for convenience, as already noted, the concave portions of the ends in the drawings have circular profiles). The estimated mass of the horn was 0.590 kg.

TABLE 20

| Dimensions of the 40 kHz Horn of FIG. 16 | |
|---|---|
| Dimension | Value (mm) |
| 170 | 87.10 |
| 171 | 25.40 |
| 172 | 25.40 |
| 173 | 2.54 |
| 174 | 2.54 |
| 175 | 3$^a$ |
| 176 | 1.27 |

$^a$Approximate value.

The acoustical and mechanical properties of the 40 kHz horn were measured as already described. It was not possible to measure actual power consumption because the wattmeter was designed to operate at a frequency of about 20 kHz. However, power consumption was estimated to be about 160 watts at a total gain of 3.75. The integral (second) booster had a gain of 2.5:1, and four different drive (first) boosters were employed to give four different booster combinations as summarized in Table 21. The measurement data are summarized in Table 22.

TABLE 21

| Summary of Booster Combinations for the 40 kHz Horn of FIG. 16 | | | |
|---|---|---|---|
| | Booster Gain | | |
| Combin. | First Booster | Second Booster | Total |
| 1 | 1.0 | 2.5 | 2.5 |
| 2 | 1.5 | 2.5 | 3.75 |
| 3 | 2.0 | 2.5 | 5.0 |
| 4 | 2.5 | 2.5 | 6.25 |

TABLE 22

| Summary of Displacement Data for the 40 kHz Horn of FIG. 16 | | | |
|---|---|---|---|
| | Amplitude (microns) | | Horn |
| Combin. | Radial | Longitudinal | Gain$^a$ |
| 1 | 10.2 | 6.6 | 1.5 |
| 2 | 14.5 | 9.7 | 1.5 |
| 3 | 18.3 | 12.4 | 1.5 |
| 4 | 20.3 | 14.2 | 1.4 |

$^a$The ratio of radial amplitude to longitudinal amplitude.

EXAMPLE 8

Variation of Acoustical Performance with Changes in Horn Dimensions and Mass for Horns Similar to the Horn of Example 7

In order to determine how the acoustical performance of the 40 kHz horn varies with changes in horn dimensions and mass, eight horns having different diameters and masses, but similar end configurations and constant widths at the radial surface and constant thicknesses at the center of the horn, were made. Because the horns all had integral boosters, mass measurements were not made. The widths and diameters of these horns are given in Table 23.

TABLE 23

40 kHz Horn Dimensions

| Horn | Horn Width (mm) | Horn Diameter (mm) |
|---|---|---|
| K | 25.40 | 96.52 |
| L | 25.40 | 95.55 |
| M | 25.40 | 94.54 |
| N | 25.40 | 92.58 |
| P | 25.40 | 89.74 |
| Q | 25.40 | 87.93 |
| R | 25.40 | 87.68 |
| S | 25.40 | 87.10 |

The acoustical properties of the horns were measured as already described. The horn frequency at each diameter is given in Table 24.

TABLE 24

Frequency Values for 40 kHz Horns Having Varying Diameters

| Horn | Horn Diameter (mm) | Horn Frequency (Hz) |
|---|---|---|
| K | 96.52 | 35,485 |
| L | 95.55 | 35,866 |
| M | 94.54 | 36,285 |
| N | 92.58 | 37,123 |
| P | 89.74 | 38,454 |
| Q | 87.93 | 39,354 |
| R | 87.68 | 39,485 |
| S | 87.10 | 39,767 |

Figure 37:
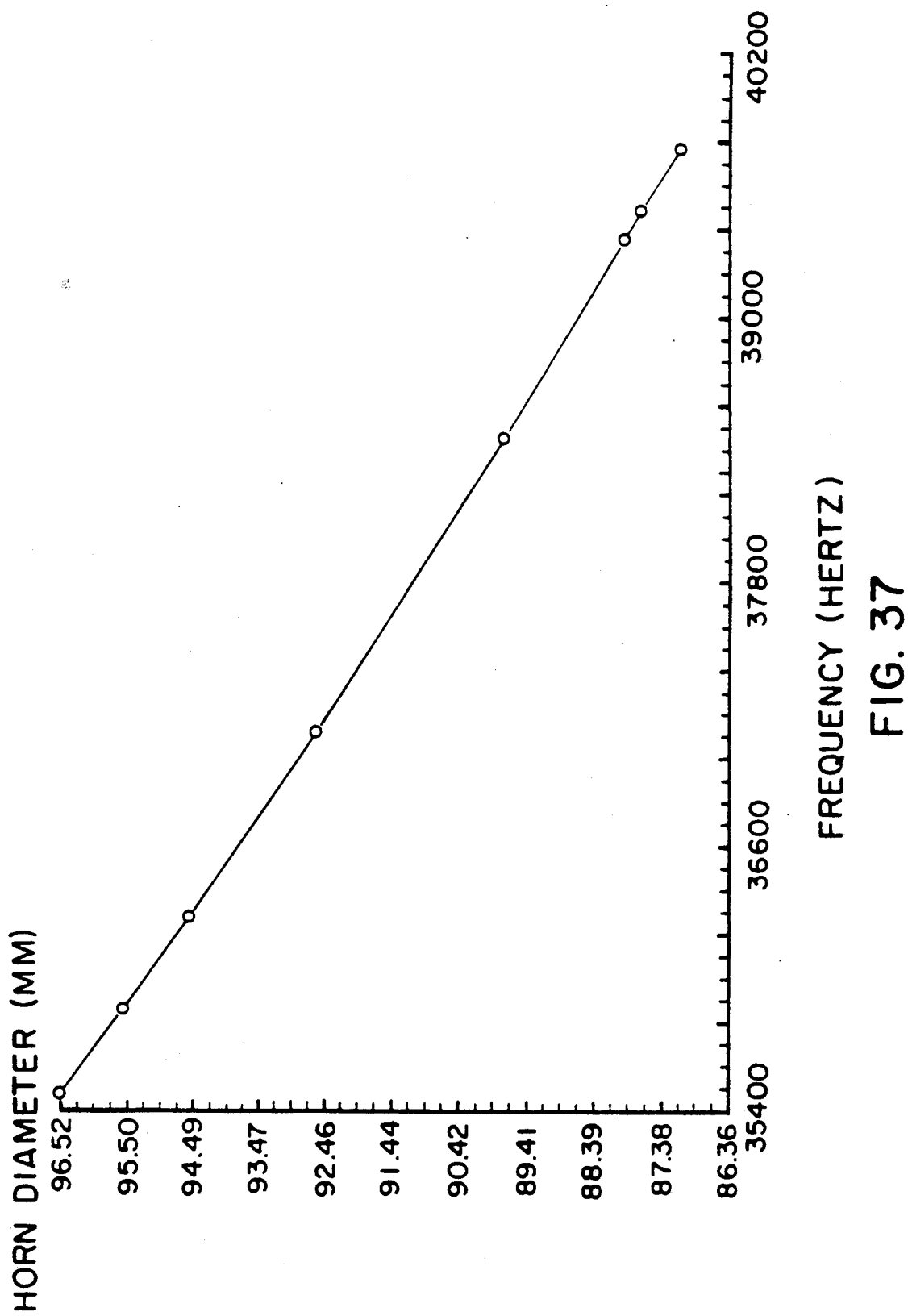
FIG. 37 is a plot of the gravest mode resonant frequency of a 40 kHz ultrasonic rotary horn of the present invention versus the diameter of the horn and illustrates the parametric dependence of frequency upon horn diameter.

The data in Table 24 were plotted as diameter (y-axis) versus frequency (x-axis); the plot is shown in FIG. 37. By extrapolation from the plot, it is seen that to have a resonant frequency of exactly 40,000 Hz, the horn diameter should be 86.74 mm.

EXAMPLE 9

Evaluation of a Four-Inch Wide 20 kHz Horn of the Present Invention

All of the horns studied in the preceding examples had widths at the radial work-contacting surfaces of no more than 50.80 mm. Accordingly, a horn similar to the horn of Example 1 and intended to be run at about 20 kHz was machined from titanium; the horn had a width of 101.60 mm at the work-contacting surface before being tuned to operate at about 20 kHz. The thickness of the horn at the longitudinal axis was less than the width. The ends of the horn were identical, except that the end to be excited was drilled and tapped with a ⅝-18NF tap 0.63-inch (about 16 mm) deep in the center to accept a threaded stud. The horn had a mass of 4.640 kg.

Figure 38:
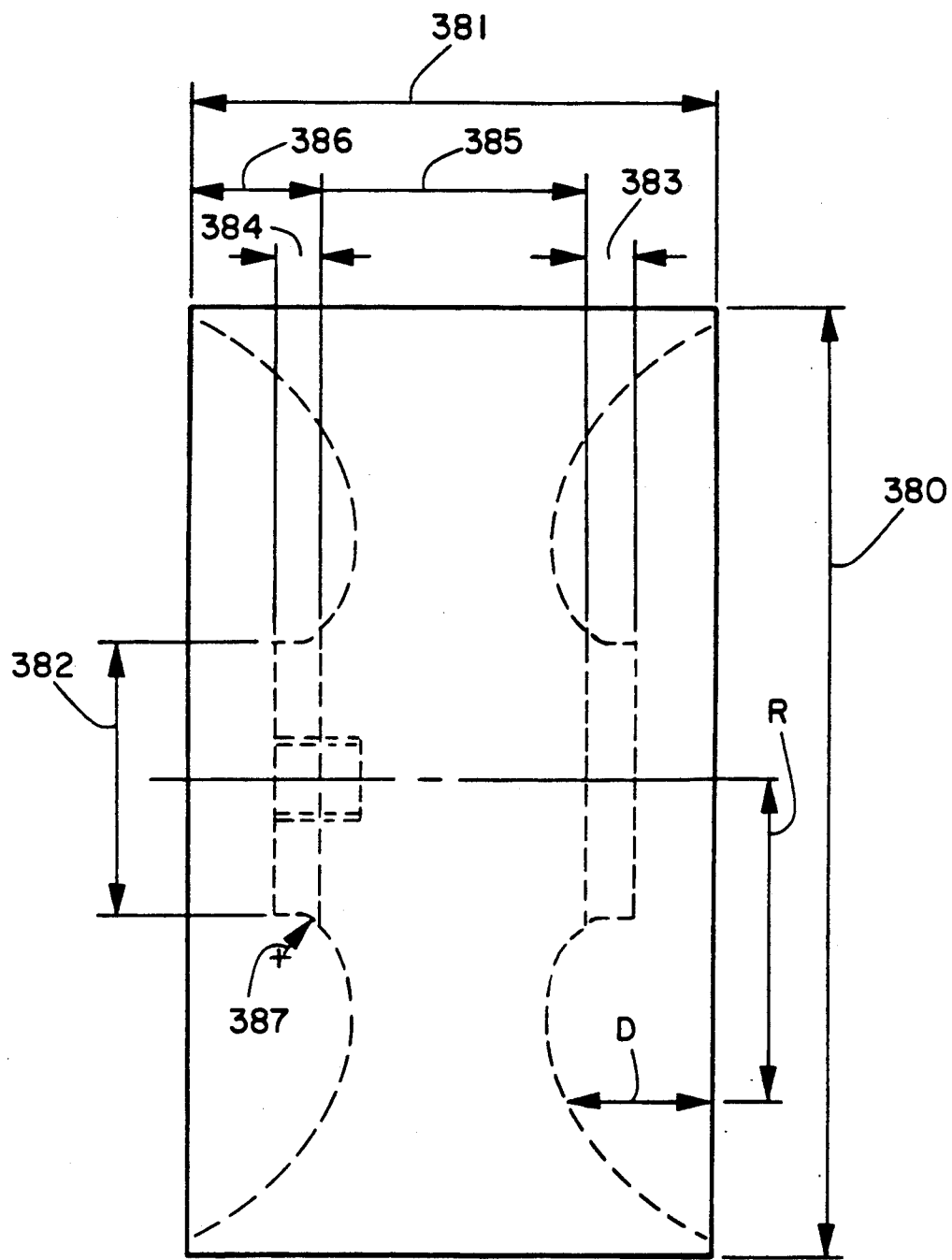
FIG. 38 is a diagrammatic representation of an ultrasonic rotary horn similar to that of FIG. 6 and illustrates the dimensional parameters of the horn.

The dimensions in mm of the horn are given in Table 25 with reference to FIG. 38 which is an end view representation of the horn, except for the threaded stud which is not shown. The concave portions of the ends were identical and had a second order profile. It may be noted that the tuning process resulted in a reduction of the horn width from the original 101.60 mm (4 inches) to 79.38 mm (3.125 inches). For convenience, however, the horn will be referred to herein as a four-inch horn.

TABLE 25

Dimensions of the Four-Inch Wide 20 kHz Horn of FIG. 38

| Dimension | Value (mm) |
|---|---|
| 400 | 158.00 |
| 401 | 79.38 |
| 402 | 50.80 |
| 403 | 8.89 |
| 404 | 8.89 |
| 405 | 50.80 |
| 406 | 25.40 |
| 407 | 2.54 |

The values "R" and "D" in FIG. 38 are variable and define the concave portion of the ends. Thus, the value of D depends on the value of R. These profile dimensions are given in Table 26.

TABLE 26

Concave End Profile Dimensions for the Four-Inch Wide 20 kHz Horn of FIG. 38

| Value (mm) of R | Value (mm) of D |
|---|---|
| 27.94 | 14.60 |
| 30.48 | 16.25 |
| 33.02 | 17.67 |
| 35.56 | 18.84 |
| 38.10 | 19.73 |
| 40.64 | 20.39 |
| 43.18 | 20.80 |
| 45.72 | 20.95 |
| 48.26 | 20.85 |
| 50.80 | 20.49 |
| 53.34 | 19.91 |
| 55.88 | 19.04 |
| 58.42 | 17.95 |
| 60.96 | 16.58 |
| 63.50 | 14.98 |
| 66.04 | 13.13 |
| 68.58 | 11.02 |
| 71.12 | 8.66 |
| 73.66 | 5.28 |
| 76.20 | 3.17 |
| 78.74 | 0.05 |
| 79.00 | 0.00 |

Figure 39:
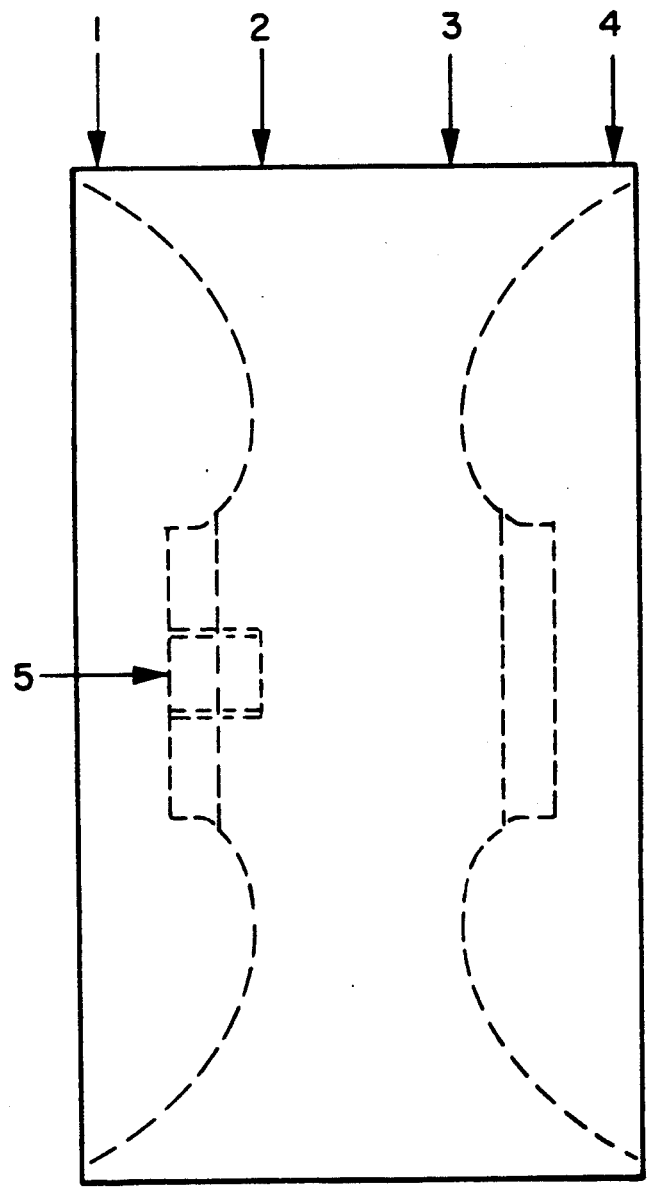
FIG. 39 illustrates the points at which measurements were taken to determine the acoustical and mechanical properties of the horn represented by FIG. 38

The measurements described in relation to FIG. 18 (Example 1) were repeated with the horn of FIG. 38. Briefly, the driver assembly, boosters, and horn were configured as shown in FIG. 18. The system was excited by means of the horn analyzer to determine the resonant frequency of the system. The generator then was activated and the system excited for one minute to allow the system to stabilize. After the stabilization period, one displacement measuring probe was placed at the excitation input to the horn and the other probe was placed at appropriate consecutive points along the radial surface of the horn. The locations of the displacement measuring probes are shown diagrammatically in FIG. 39. Point 5 represents the point of excitation input. With the generator on, the amplitude level, power consumption, and frequency were recorded at each of points 1-4, inclusive (FIG. 39). Each of points 1 and 4 was located approximately 6 mm from the nearest edge of the radial surface. In addition, each measurement point on the radial surface of the horn was about 22-23 mm from adjacent points. Data were obtained with three different combinations of first and second boosters in order to give three different total booster gain values. Each combination differed only in the gain of the second booster, identified in FIG. 18 as 1802. The gain of the second booster was 1:1, 1.5:1, and 2:1, respectively, for combinations 1, 2, and 3. In each case, the gain of the first booster, equivalent to 1801 in FIG. 18, was 1:1. Thus, the total gain from both boosters in each of combinations 1, 2, and 3 was 1, 1.5, and 2, respectively. The data for the three combinations of boosters are summarized in Tables 28 and 29.

TABLE 27

Summary of Booster Combinations with the Four-Inch Wide 20 kHz Horn of FIG. 38

| Combination | Total Gain | Power (watts) | Frequency (Hz) |
|---|---|---|---|
| 1 | 1.0 | 190 | 20,036 |
| 2 | 1.5 | 295 | 20,020 |
| 3 | 2.0 | 470 | 20,013 |

TABLE 28

Summary of Data for the First Booster Combination with the Four-Inch Wide 20 kHz Horn of FIG. 38

| Point | Amplitude (microns) | Horn Gain[a] | PRG[b] | Effic.[c] |
|---|---|---|---|---|
| 1 | 38.6 | 1.83 | 9.6 | 0.20 |
| 2 | 25.4 | 1.20 | 6.3 | 0.13 |
| 3 | 25.4 | 1.20 | 6.3 | 0.13 |
| 4 | 36.8 | 1.74 | 9.2 | 0.19 |
| 5 | 21.1 | — | — | — |

[a]The ratio of radial amplitude to longitudinal amplitude, the latter being represented by the amplitude value of point 5.
[b]Power-related gain, in watts$^{-1}$ × $10^3$.
[c]In microns per watt.

TABLE 29

Summary of Data for the Second Booster Combination with the Four-Inch Wide 20 kHz Horn of FIG. 38

| Point | Amplitude (microns) | Horn Gain[a] | PRG[b] | Effic.[c] |
|---|---|---|---|---|
| 1 | 51.8 | 1.82 | 6.2 | 0.18 |
| 2 | 33.5 | 1.18 | 4.0 | 0.11 |
| 3 | 33.5 | 1.18 | 4.0 | 0.11 |
| 4 | 48.8 | 1.72 | 5.8 | 0.17 |
| 5 | 28.4 | — | — | — |

[a]The ratio of radial amplitude to longitudinal amplitude, the latter being represented by the amplitude value of point 5.
[b]Power-related gain, in watts$^{-1}$ × $10^3$.
[c]In microns per watt.

TABLE 30

Summary of Data for the Third Booster Combination with the Four-Inch Wide 20 kHz Horn of FIG. 38

| Point | Amplitude (microns) | Horn Gain[a] | PRG[b] | Effic.[c] |
|---|---|---|---|---|
| 1 | 63.0 | 1.75 | 3.7 | 0.13 |
| 2 | 42.7 | 1.18 | 2.5 | 0.09 |
| 3 | 42.7 | 1.18 | 2.5 | 0.09 |
| 4 | 67.3 | 1.86 | 4.0 | 0.14 |
| 5 | 36.1 | — | — | — |

[a]The ratio of radial amplitude to longitudinal amplitude, the latter being represented by the amplitude value of point 6.
[b]Power-related gain, in watts$^{-1}$ × $10^3$.
[c]In microns per watt.

EXAMPLE 10

Evaluation of a Two-Inch Wide 20 kHz Aluminum Horn of the Present Invention

Another two-inch wide horn was machined from a solid piece of aluminum. The horn was essentially the same as the horn of Example 1, except that it was machined with an integral elongated waveguide having a gain of 2.5:1 and the horn diameter was 174.68 mm instead of 170.6 mm. The horn was intended to operate at a frequency of about 20 kHz.

Two different drive or first boosters were employed to give two different booster combinations. In the first combination, the first booster had a gain of 1:1, and in the second the first booster had a gain of 1.5:1. The booster combinations are summarized in Table 31. Horn performance was measured for each combination as already described and is summarized in Table 32.

TABLE 31

Summary of Booster Combinations with the Two-Inch Wide 20 kHz Aluminum Horn

| Combination | Total Gain | Power (watts) | Frequency (Hz) |
|---|---|---|---|
| 1 | 2.5 | 100 | 19,987 |
| 2 | 3.75 | 260 | 19,931 |

TABLE 32

Summary of Displacement Data for the Two-Inch Wide 20 kHz Aluminum Horn

| Combin. | Amplitude (microns) | | Horn Gain[a] | PRG[b] | Effic.[c] |
|---|---|---|---|---|---|
| | Radial | Longitudinal | | | |
| 1 | 48.3 | 36.8 | 1.3 | 13.0 | 0.48 |
| 2 | 66.0 | 50.8 | 1.3 | 5.0 | 0.25 |

[a]The ratio of radial amplitude to longitudinal amplitude.
[b]Power-related gain, in watts$^{-1}$ × $10^3$.
[c]Efficiency, in microns of radial amplitude per watt.

While the invention has been described in connection with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. In an ultrasonic rotary horn intended to be excited at a frequency of from about 18 to about 60 kHz, which horn comprises a shaped, solid metal object having a radial surface terminated by a first end and a second end, and a rotational axis, in which each of said ends is defined by a surface and said object is axially symmetrical, the improvement which comprises:

(A) the diameter of said horn is in the range of from about 4 cm to about 19 cm;

(B) the width of said horn at said radial surface is from about 0.6 cm to about 13 cm;

(C) the thickness of said horn at the rotational axis thereof is from about 0.6 cm to about 15 cm and is independent of the width of said horn at said radial surface;

(D) said horn has a mass in the range of from about 0.06 kg to about 30 kg; and (E) said diameter, width, and thickness are selected for a desired frequency so that said horn, upon being excited by ultrasonic energy at such frequency which is input at the rotational axis at, and substantially perpendicular to, one or both of said ends, is adapted to resonate in a manner such that:

(1) the first end is excited and moves substantially in phase with the movement of the source of excitation;

(2) the second end, whether or not it is actively excited, moves substantially out of phase with the movement of the excited first end;

(3) said radial surface also moves substantially out of phase with the movement of the excited first end; and (4) said horn exhibits a single nodal point at its geometric center.

2. The ultrasonic rotary horn of claim 1, in which said first end of said horn has a hub.

3. The ultrasonic rotary horn of claim 2, in which said hub extends outwardly from said first end.

4. The ultrasonic rotary horn of claim 3, in which said hub extends beyond an edge of said radial surface of said horn.

5. The ultrasonic rotary horn of claim 3, in which said hub is an integral part of said horn.

6. The ultrasonic rotary horn of claim 5, in which a stud protrudes from and is concentric with said hub.

7. The ultrasonic rotary horn of claim 6, in which said stud is threaded.

8. The ultrasonic rotary horn of claim 5, in which a stud protrudes from and is concentric with said hub and is an integral part of said horn.

9. The ultrasonic rotary horn of claim 8, in which said stud is threaded.

10. The ultrasonic rotary horn of claim 1, in which a stud protrudes from and is concentric with said first end and is an integral part of said horn.

11. The ultrasonic rotary horn of claim 10, in which said stud is threaded.

12. The ultrasonic rotary horn of claim 1, in which said radial surface has a linear profile.

13. The ultrasonic rotary horn of claim 1, in which said radial surface has a nonlinear profile.

14. The ultrasonic rotary horn of claim 13, in which said radial surface has a centrally located raised land.

15. The ultrasonic rotary horn of claim 13, in which said radial surface has a raised land located at one edge thereof.

16. The ultrasonic rotary horn of claim 1, in which said horn diameter, width, and thickness, and the configuration of the end surfaces, are selected so that the average ratio of radial amplitude across said radial surface to longitudinal amplitude is at least about 1 and the average value of radial amplitude across said radial surface per watt of excitation power is at least about 0.14 microns.

17. The ultrasonic rotary horn of claim 1, in which a stud protrudes from and is concentric with each of said ends and each stud is an integral part of said horn.

18. The ultrasonic rotary horn of claim 17, in which each of said studs is threaded.

19. The ultrasonic rotary horn of claim 1, in which each of said first end and said second end has a hub.

20. The ultrasonic rotary horn of claim 19, in which each of said hubs extends outwardly from said first and second ends, respectively.

21. The ultrasonic rotary horn of claim 20, in which each of said hubs extends beyond the termination of said radial surface by said first and second ends, respectively.

22. The ultrasonic rotary horn of claim 20, in which each of said hubs is an integral part of said horn.

23. The ultrasonic rotary horn of claim 22, in which a stud protrudes from and is concentric with each of said hubs.

24. The ultrasonic rotary horn of claim 23, in which each of said studs is threaded.

25. The ultrasonic rotary horn of claim 22, in which a stud protrudes from and is concentric with each of said hubs and each stud is an integral part of said horn.

26. The ultrasonic rotary horn of claim 25, in which each of said studs is threaded.

27. In an apparatus for ultrasonically bonding two or more materials together, or otherwise ultrasonically processing a material, which apparatus comprises an ultrasonic rotary horn intended to be excited at a frequency of from about 18 to about 60 kHz, a vibrator means for providing a source of longitudinal mechanical vibration coupled to one or both ends of said horn, optionally through an elongated waveguide, support means for said ultrasonic rotary horn, drive means for rotating said ultrasonic rotary horn, and a rotatable anvil in close proximity to said ultrasonic rotary horn, the improvement which comprises employing as said ultrasonic rotary horn a shaped, solid metal object having a radial surface terminated by a first end and a second end, and a rotational axis, in which each of said ends is defined by a surface and said object is axially symmetrical, in which:

(A) the diameter of said horn is in the range of from about 4 cm to about 19 cm;

(B) the width of said horn at said radial surface is from about 0.6 cm to about 13 cm;

(C) the thickness of said horn at the rotational axis thereof is from about 0.6 cm to about 15 cm and is independent of the width of said horn at said radial surface;

(D) said horn has a mass in the range of from about 0.06 kg to about 0 kg; and (E) said diameter, width, and thickness are selected for a desired frequency so that said horn, upon being excited by ultrasonic energy at such frequency which is input at the rotational axis at, and substantially perpendicular to, one or both of said ends, is adapted to resonate in a manner such that:

(1) the first and is excited and moves substantially in phase with the movement of the source of excitation;

(2) the second end, whether or not it is actively excited, moves substantially out of phase with the movement of the excited first end;

(3) said radial surface also moves substantially out of phase with the movement of the excited first end; and (4) said horn exhibits a single nodal point at its geometric center.

28. The ultrasonic rotary horn of claim 27, in which said horn diameter, width, and thickness, and the configuration of the end surfaces, are selected so that average ratio of radial amplitude across said radial surface to longitudinal amplitude is at least about 1 and the average value of radial amplitude across said radial surface per watt of excitation power is at least about 0.14 microns.

* * * * *

UNITED STATES PATENT AND TRADEMARK OFFICE
CERTIFICATE OF CORRECTION

PATENT NO. : 5,096,532
DATED : March 17, 1992
INVENTOR(S) : Joseph G. Neuwirth, Thomas D. Ehlert, Norman R. Stegelmann It is certified that error appears in the above-identified patent and that said Letters Patent is hereby corrected as shown below:

Column 16, line 44 "or x, and y," should read --or x' and y'--;

Column 19, line 28 "point represents" should read --point 1 represents--;

Column 21, line 30 "may noted" should read --may be noted--;

Column 22, line 18 "20 10 kHz" should read --20 kHz--;

Column 33, line 63 "the horn" should read --the tuned horn--;

Column 36, line 41 "first and is excited and" should read --first end is excited and--;

Signed and Sealed this

Fourth Day of January, 1994

BRUCE LEHMAN

Attest:

Attesting Officer    Commissioner of Patents and Trademarks